(12) United States Patent
Tiramani et al.

(10) Patent No.: US 12,209,403 B2
(45) Date of Patent: Jan. 28, 2025

(54) PERIMETER STRUCTURES FOR JOINING ABUTTING ENCLOSURE COMPONENTS

(71) Applicant: Boxabl Inc., North Las Vegas, NV (US)

(72) Inventors: Paolo Tiramani, Las Vegas, NV (US); Galiano Tiramani, Las Vegas, NV (US); Kyle Denman, North Las Vegas, NV (US)

(73) Assignee: Boxabl Inc., North Las Vegas, NV (US)

( * ) Notice: Subject to any disclaimer, the term of this patent is extended or adjusted under 35 U.S.C. 154(b) by 19 days.

(21) Appl. No.: 17/971,230

(22) Filed: Oct. 21, 2022

(65) Prior Publication Data

US 2023/0038048 A1 Feb. 9, 2023

Related U.S. Application Data

(63) Continuation of application No. 16/786,202, filed on Feb. 10, 2020, now Pat. No. 11,560,707.

(Continued)

(51) Int. Cl.
*E04H 1/00* (2006.01)
*B32B 5/02* (2006.01)
(Continued)

(52) U.S. Cl.
CPC .............. *E04B 1/344* (2013.01); *B32B 5/024* (2013.01); *B32B 5/18* (2013.01); *B32B 5/20* (2013.01);
(Continued)

(58) Field of Classification Search
CPC .......... E04C 2/284; B32B 5/32; B32B 5/245; B32B 5/20
See application file for complete search history.

(56) References Cited

U.S. PATENT DOCUMENTS 1,498,173 A 6/1924 Kelley
2,063,052 A 12/1936 Washington
(Continued)

FOREIGN PATENT DOCUMENTS

AU 2013200386 A1 2/2013
CA 2227003 A1 7/1999
(Continued)

OTHER PUBLICATIONS

International Search Report and Written Opinion from related International Patent Application No. PCT/US2020/017527 issued Jun. 4, 2020.

(Continued)

*Primary Examiner* — Basil S Katcheves
(74) *Attorney, Agent, or Firm* — McCarter & English, LLP

(57) ABSTRACT

An enclosure member for a building structure comprising a planar laminate having a first facing layer; a layer of foam having a first face and a second opposing face; and a second facing layer; where the first facing layer is fastened to the first face of the layer of foam, and the second facing layer is fastened to the second opposing face of the layer of foam. An edge of the enclosure is provided with a perimeter structure that can perform one or more of a sealing function, an edge reinforcement function and a pivotable joining function with another enclosure, in accordance with the particular embodiment.

18 Claims, 32 Drawing Sheets

Related U.S. Application Data

(60) Provisional application No. 62/960,991, filed on Jan. 14, 2020, provisional application No. 62/805,710, filed on Feb. 14, 2019.

(51) Int. Cl.
| | |
|---|---|
| *B32B 5/18* | (2006.01) |
| *B32B 5/20* | (2006.01) |
| *B32B 5/24* | (2006.01) |
| *B32B 5/32* | (2006.01) |
| *B32B 15/04* | (2006.01) |
| *E04B 1/343* | (2006.01) |
| *E04B 1/344* | (2006.01) |
| *E04B 1/348* | (2006.01) |
| *E04C 2/284* | (2006.01) |

(52) U.S. Cl.
CPC ............... *B32B 5/245* (2013.01); *B32B 5/32* (2013.01); *B32B 15/046* (2013.01); *E04B 1/343* (2013.01); *E04B 1/34384* (2013.01); *E04B 1/3442* (2013.01); *E04B 1/34853* (2013.01); *E04C 2/284* (2013.01); *B32B 2262/101* (2013.01); *B32B 2419/00* (2013.01); *E04B 1/34317* (2023.08)

(56) References Cited

U.S. PATENT DOCUMENTS

| | | | |
|---|---|---|---|
| 2,070,924 A | 2/1937 | Derman | |
| 2,126,511 A | 8/1938 | Soule | |
| 2,302,101 A | 11/1942 | Boydstun | |
| 2,644,203 A | 7/1953 | Donahue | |
| 2,704,223 A | 3/1955 | Houdart | |
| 2,780,843 A | 2/1957 | Sherbinin | |
| 2,832,637 A | 4/1958 | Decosse | |
| 2,883,713 A | 4/1959 | Zug | |
| 2,896,271 A * | 7/1959 | Kloote | B62D 33/048 |
| | | | 296/181.6 |
| 2,904,849 A | 9/1959 | Bergstrom | |
| 2,904,850 A | 9/1959 | Whitman et al. | |
| 2,920,920 A | 1/1960 | Whitman et al. | |
| 2,933,055 A | 4/1960 | Whitman et al. | |
| 3,044,129 A | 7/1962 | Bigelow | |
| 3,097,400 A | 7/1963 | Davis et al. | |
| 3,107,116 A | 10/1963 | Meaker | |
| 3,147,024 A | 9/1964 | Brockman | |
| 3,206,903 A | 9/1965 | Johnson | |
| 3,280,796 A | 10/1966 | Hatcher | |
| 3,292,331 A | 12/1966 | Sams | |
| 3,305,993 A | 2/1967 | Nels | |
| 3,313,073 A * | 4/1967 | Mathews | F16L 59/04 |
| | | | 52/307.7 |
| 3,315,974 A | 4/1967 | Weaver et al. | |
| 3,324,831 A | 6/1967 | Onge | |
| 3,341,987 A | 9/1967 | Ragnhill | |
| 3,372,520 A * | 3/1968 | Hensel | E04F 13/0826 |
| | | | 52/489.1 |
| 3,378,276 A | 4/1968 | Fulmer | |
| 3,465,488 A | 9/1969 | Miller | |
| 3,468,081 A | 9/1969 | Saarinen | |
| 3,469,356 A | 9/1969 | White | |
| 3,497,231 A | 2/1970 | Fulmer et al. | |
| 3,500,596 A | 3/1970 | Andersson | |
| 3,550,334 A | 12/1970 | Van Der Lely | |
| 3,611,659 A | 10/1971 | Greenlaugh | |
| 3,623,290 A * | 11/1971 | Downing | E04B 2/7854 |
| | | | 52/762 |
| 3,624,786 A | 11/1971 | Lundahl | |
| 3,631,999 A | 1/1972 | Walerowski | |
| 3,694,977 A | 10/1972 | Verman | |
| 3,711,363 A | 1/1973 | Jarema et al. | |
| 3,712,007 A | 1/1973 | Kump | |
| 3,720,022 A | 3/1973 | Dattner | |
| 3,722,168 A | 3/1973 | Comm | |
| 3,750,366 A | 8/1973 | Rich, Jr. et al. | |
| 3,793,796 A | 2/1974 | Hughes | |
| 3,816,199 A * | 6/1974 | Dawdy | E04F 13/0889 |
| | | | 52/483.1 |
| 3,828,502 A | 8/1974 | Carlsson | |
| 3,844,063 A | 10/1974 | Jackson | |
| 3,863,404 A | 2/1975 | Wahlquist | |
| 3,866,365 A | 2/1975 | Honigman | |
| 3,866,672 A | 2/1975 | Rich, Jr. et al. | |
| RE28,367 E | 3/1975 | Rich, Jr. et al. | |
| 3,922,764 A * | 12/1975 | Downing, Jr. | E04B 2/74 |
| | | | 24/350 |
| 3,983,665 A | 10/1976 | Burton | |
| 3,984,949 A | 10/1976 | Wahlquist | |
| 3,990,193 A | 11/1976 | Ray et al. | |
| 4,035,964 A | 7/1977 | Robinson | |
| 4,050,215 A | 9/1977 | Fisher | |
| 4,068,434 A | 1/1978 | Day et al. | |
| 4,074,475 A | 2/1978 | Wahlquist | |
| 4,114,333 A * | 9/1978 | Jones | E04B 2/7411 |
| | | | 52/745.1 |
| 4,118,901 A | 10/1978 | Johnson | |
| 4,155,204 A | 5/1979 | Prozinski | |
| 4,165,591 A | 8/1979 | Fitzgibbon | |
| 4,186,539 A | 2/1980 | Harmon et al. | |
| 4,235,054 A | 11/1980 | Cable et al. | |
| 4,360,553 A | 11/1982 | Landheer | |
| 4,376,593 A | 3/1983 | Schaefer | |
| 4,415,184 A | 11/1983 | Stephenson et al. | |
| 4,423,913 A | 1/1984 | Lee | |
| 4,435,935 A * | 3/1984 | Larrea | E04F 13/0889 |
| | | | 52/471 |
| 4,441,286 A | 4/1984 | Skvaril | |
| 4,464,877 A | 8/1984 | Gebhardt et al. | |
| 4,534,141 A | 8/1985 | Fagnoni | |
| 4,546,584 A * | 10/1985 | Mieyal | E04B 2/7457 |
| | | | 52/481.1 |
| 4,567,699 A | 2/1986 | McClellan | |
| 4,570,959 A | 2/1986 | Grinwald | |
| 4,589,240 A * | 5/1986 | Kendall | E06B 3/827 |
| | | | 49/501 |
| 4,592,175 A | 6/1986 | Werner | |
| 4,599,829 A | 7/1986 | DiMartino, Sr. | |
| 4,603,518 A | 8/1986 | Fennes | |
| 4,603,658 A | 8/1986 | Garnsey | |
| 4,628,656 A * | 12/1986 | Menchetti | E04B 2/56 |
| | | | 52/762 |
| 4,633,626 A | 1/1987 | Freeman et al. | |
| 4,635,412 A | 1/1987 | Le Poittevin | |
| 4,641,468 A | 2/1987 | Slater | |
| 4,644,708 A | 2/1987 | Baudot et al. | |
| 4,674,250 A | 6/1987 | Altizer | |
| 4,689,924 A | 9/1987 | Jurgensen | |
| 4,744,182 A | 5/1988 | Shacket et al. | |
| 4,766,708 A | 8/1988 | Sing | |
| 4,779,390 A * | 10/1988 | Repper | B60R 13/02 |
| | | | 296/70 |
| 4,779,514 A | 10/1988 | Prigmore et al. | |
| 4,780,996 A | 11/1988 | Julien, Jr. | |
| 4,856,244 A | 8/1989 | Clapp | |
| 4,890,437 A | 1/1990 | Quaile | |
| 4,891,919 A | 1/1990 | Palibroda | |
| 4,958,874 A | 9/1990 | Hegedus | |
| 4,958,974 A | 9/1990 | Schenk | |
| 4,989,379 A | 2/1991 | Suzuki | |
| 5,062,250 A * | 11/1991 | Buzzella | E04D 3/362 |
| | | | 52/468 |
| 5,070,667 A | 12/1991 | Schulte | |
| 5,107,639 A | 4/1992 | Morin et al. | |
| 5,160,567 A | 11/1992 | Konicek et al. | |
| 5,185,973 A | 2/1993 | Oldani et al. | |
| 5,185,981 A * | 2/1993 | Martinez | E04F 13/0878 |
| | | | 52/584.1 |
| 5,218,803 A | 6/1993 | Wright | |
| 5,265,394 A | 11/1993 | Gardner | |
| 5,345,730 A | 9/1994 | Jurgensen | |

(56) References Cited

U.S. PATENT DOCUMENTS

| | | | |
|---|---|---|---|
| 5,426,130 A * | 6/1995 | Thurber | C09J 4/00 522/170 |
| 5,461,832 A | 10/1995 | Smith | |
| 5,486,391 A * | 1/1996 | Tyner | B32B 27/065 428/319.3 |
| 5,491,934 A | 2/1996 | Bigelow, Jr. et al. | |
| 5,497,593 A | 3/1996 | Riesberg | |
| 5,596,844 A | 1/1997 | Kalinowski | |
| 5,657,606 A | 8/1997 | Ressel et al. | |
| 5,664,388 A | 9/1997 | Chapman et al. | |
| 5,678,369 A * | 10/1997 | Ishikawa | B32B 27/42 52/592.1 |
| 5,732,839 A | 3/1998 | Schimmang et al. | |
| 5,755,063 A | 5/1998 | Ohnishi et al. | |
| 5,761,854 A | 6/1998 | Johnson et al. | |
| 5,765,330 A | 6/1998 | Richard | |
| 5,775,046 A | 7/1998 | Fanger et al. | |
| 5,845,441 A | 12/1998 | Swartz | |
| 5,867,963 A | 2/1999 | Hershey | |
| 5,899,037 A | 5/1999 | Josey | |
| 5,906,075 A | 5/1999 | Sowers | |
| 5,930,962 A | 8/1999 | Sokolean | |
| 5,950,373 A | 9/1999 | von Hoff et al. | |
| 5,966,956 A | 10/1999 | Morris et al. | |
| 6,003,278 A | 12/1999 | Weaver et al. | |
| 6,003,919 A | 12/1999 | Shook | |
| 6,047,519 A | 4/2000 | Bagn | |
| 6,054,194 A | 4/2000 | Kane | |
| 6,073,413 A | 6/2000 | Tongiatama | |
| 6,096,416 A * | 8/2000 | Altenberg | B32B 5/18 428/317.1 |
| 6,158,184 A | 12/2000 | Timmerman, Sr. et al. | |
| 6,185,898 B1 | 2/2001 | Pratt | |
| 6,195,950 B1 | 3/2001 | Harris | |
| 6,223,479 B1 | 5/2001 | Stockli | |
| 6,231,706 B1 | 5/2001 | Higaki et al. | |
| 6,244,016 B1 | 6/2001 | Wolf | |
| 6,279,284 B1 | 8/2001 | Moras | |
| 6,308,469 B1 | 10/2001 | Leung | |
| 6,385,942 B1 | 5/2002 | Grossman et al. | |
| 6,421,968 B2 * | 7/2002 | Degelsegger | E06B 1/6007 52/235 |
| 6,481,165 B1 | 11/2002 | Romary et al. | |
| 6,481,172 B1 | 11/2002 | Porter | |
| 6,625,937 B1 | 9/2003 | Parker et al. | |
| 6,663,740 B2 | 12/2003 | Yamasaki | |
| 6,745,531 B1 | 6/2004 | Egan | |
| 6,925,761 B1 | 8/2005 | De La Marche | |
| 6,941,718 B1 | 9/2005 | diGirolamo et al. | |
| 6,959,514 B1 | 11/2005 | Pingel | |
| 6,959,515 B1 | 11/2005 | Beighton | |
| 6,983,567 B2 | 1/2006 | Ciotti | |
| 6,996,947 B2 | 2/2006 | Albora | |
| 6,997,495 B1 | 2/2006 | Groezinger | |
| 7,299,596 B2 | 11/2007 | Hildreth | |
| 7,326,022 B2 | 2/2008 | Brown et al. | |
| 7,444,953 B1 | 11/2008 | Player | |
| 7,562,504 B2 * | 7/2009 | Herbst | E04F 13/0889 52/762 |
| 7,665,264 B1 * | 2/2010 | Wolfe | E04B 7/22 52/763 |
| 7,740,257 B2 | 6/2010 | Haire | |
| 7,828,367 B2 | 11/2010 | Hickam et al. | |
| 7,841,136 B2 | 11/2010 | Czyznikiewicz | |
| 7,877,960 B2 * | 2/2011 | Kennedy | E04C 2/384 52/592.1 |
| 7,882,659 B2 | 2/2011 | Gyory et al. | |
| 7,930,857 B2 | 4/2011 | Pope | |
| 8,141,304 B2 | 3/2012 | Shen et al. | |
| 8,166,715 B2 | 5/2012 | De Azambuja | |
| 8,186,109 B2 | 5/2012 | Warminsky | |
| 8,201,362 B2 | 6/2012 | Alford et al. | |
| 8,276,328 B2 | 10/2012 | Pepin | |
| 8,347,560 B2 | 1/2013 | Gyory et al. | |
| 8,365,473 B2 | 2/2013 | Bjerre | |
| 8,474,194 B2 | 7/2013 | Tiramani | |
| 8,516,778 B1 | 8/2013 | Wilkens | |
| 8,733,029 B2 | 5/2014 | Tiramani | |
| 8,925,270 B2 | 1/2015 | Grisolia et al. | |
| 9,617,739 B2 | 4/2017 | Krause | |
| D820,469 S | 6/2018 | Watson | |
| 10,196,173 B2 | 2/2019 | Tiramani | |
| 10,661,835 B2 | 5/2020 | Tiramani | |
| 10,688,906 B2 | 6/2020 | Tiramani et al. | |
| 10,829,029 B2 | 11/2020 | Tiramani et al. | |
| 10,926,689 B2 | 2/2021 | Tiramani et al. | |
| 10,961,016 B2 | 3/2021 | Tiramani | |
| 11,007,921 B2 | 5/2021 | Tiramani et al. | |
| 11,066,832 B2 | 7/2021 | Krause | |
| 11,118,344 B2 | 9/2021 | Tiramani et al. | |
| 11,220,816 B2 | 1/2022 | Tiramani et al. | |
| 11,525,256 B2 | 12/2022 | Tiramani et al. | |
| 11,554,898 B2 | 1/2023 | Brunner et al. | |
| 11,560,707 B2 * | 1/2023 | Tiramani | E04B 1/343 |
| 2001/0004820 A1 | 6/2001 | Poliquin | |
| 2002/0046514 A1 | 4/2002 | Leung | |
| 2002/0095896 A1 | 7/2002 | Commins et al. | |
| 2002/0179598 A1 | 12/2002 | Kuhn | |
| 2003/0009964 A1 | 1/2003 | Trarup et al. | |
| 2003/0051314 A1 | 3/2003 | Jenks | |
| 2003/0071426 A1 | 4/2003 | Larouche | |
| 2004/0108750 A1 | 6/2004 | Park | |
| 2004/0128930 A1 | 7/2004 | Ohnishi | |
| 2004/0139674 A1 | 7/2004 | DiLorenzo | |
| 2004/0148889 A1 | 8/2004 | Bibee et al. | |
| 2004/0177581 A1 | 9/2004 | Starke | |
| 2005/0055973 A1 | 3/2005 | Hagen et al. | |
| 2005/0066620 A1 | 3/2005 | Albora | |
| 2005/0076600 A1 | 4/2005 | Moody et al. | |
| 2005/0122014 A1 | 6/2005 | Bucher et al. | |
| 2005/0283371 A1 | 12/2005 | Tiramani | |
| 2006/0037256 A1 | 2/2006 | Pryor | |
| 2006/0070306 A1 | 4/2006 | Lin | |
| 2006/0137269 A1 | 6/2006 | Di Lorenzo | |
| 2006/0150573 A1 | 7/2006 | Elliott et al. | |
| 2006/0251851 A1 | 11/2006 | Bowman | |
| 2006/0260268 A1 | 11/2006 | Ritchie | |
| 2007/0051069 A1 | 3/2007 | Grimes | |
| 2007/0079573 A1 | 4/2007 | Sarine et al. | |
| 2007/0096473 A1 | 5/2007 | Ortega | |
| 2007/0144078 A1 | 6/2007 | Frondelius | |
| 2007/0170740 A1 | 7/2007 | Di Franco | |
| 2007/0209294 A1 | 9/2007 | Harvey | |
| 2007/0271857 A1 | 11/2007 | Heather et al. | |
| 2008/0047225 A1 | 2/2008 | Kawai et al. | |
| 2008/0066417 A1 | 3/2008 | Orchard | |
| 2008/0264463 A1 | 10/2008 | Kim et al. | |
| 2009/0014044 A1 | 1/2009 | Hartman et al. | |
| 2009/0139153 A1 | 6/2009 | Hudson | |
| 2009/0193734 A1 | 8/2009 | Harig et al. | |
| 2009/0205277 A1 | 8/2009 | Gibson | |
| 2009/0217600 A1 * | 9/2009 | De Azambuja | E04B 1/3444 52/79.5 |
| 2009/0266006 A1 | 10/2009 | Gyory et al. | |
| 2009/0293395 A1 * | 12/2009 | Porter | E04B 7/04 52/579 |
| 2010/0012000 A1 | 1/2010 | Gordon | |
| 2010/0018130 A1 | 1/2010 | Lopez et al. | |
| 2010/0162636 A1 | 7/2010 | Bonebrake | |
| 2010/0192481 A1 | 8/2010 | Shen et al. | |
| 2010/0269419 A1 | 10/2010 | Gyory et al. | |
| 2011/0094167 A1 | 4/2011 | Noiseux et al. | |
| 2011/0126479 A1 | 6/2011 | Alford et al. | |
| 2011/0268916 A1 | 11/2011 | Pardue, Jr. | |
| 2011/0297675 A1 | 12/2011 | Johnson et al. | |
| 2012/0006369 A1 | 1/2012 | Cantin et al. | |
| 2012/0137610 A1 | 6/2012 | Knight et al. | |
| 2012/0180404 A1 | 7/2012 | Scouten | |
| 2012/0240501 A1 | 9/2012 | Spiegel | |
| 2012/0255240 A1 | 10/2012 | Shen | |
| 2012/0317902 A1 | 12/2012 | Kapteyn | |
| 2013/0036688 A1 | 2/2013 | Gosain | |
| 2013/0067841 A1 | 3/2013 | Grieco et al. | |

(56) References Cited

U.S. PATENT DOCUMENTS

| | | |
|---|---|---|
| 2013/0081346 A1 | 4/2013 | Kulprathipanja et al. |
| 2013/0232902 A1 | 9/2013 | Mayer et al. |
| 2013/0263527 A1 | 10/2013 | Barrett et al. |
| 2013/0269267 A1 | 10/2013 | Tiramani |
| 2013/0283618 A1 | 10/2013 | Wiliams |
| 2013/0305626 A1 | 11/2013 | Strickland et al. |
| 2013/0326986 A1 | 12/2013 | Krivtsov et al. |
| 2014/0001786 A1 | 1/2014 | Cantin et al. |
| 2014/0033619 A1 | 2/2014 | Merchant |
| 2014/0115991 A1 | 5/2014 | Sievers et al. |
| 2014/0150352 A1 | 6/2014 | Lee |
| 2014/0157710 A1* | 6/2014 | Potter ............... E04C 2/049 52/582.1 |
| 2014/0202089 A1 | 7/2014 | Nakajima et al. |
| 2014/0311051 A1 | 10/2014 | Fagan |
| 2015/0007506 A1 | 1/2015 | Wallance |
| 2015/0034634 A1 | 2/2015 | Mullaney |
| 2015/0093535 A1 | 4/2015 | Lambach et al. |
| 2015/0121775 A1 | 5/2015 | Lippert |
| 2015/0135623 A1 | 5/2015 | Garrett et al. |
| 2015/0204068 A1 | 7/2015 | Miller |
| 2015/0239221 A1 | 8/2015 | Gillman |
| 2015/0322668 A1 | 11/2015 | Quinn et al. |
| 2015/0361653 A1 | 12/2015 | Grant et al. |
| 2016/0059104 A1 | 3/2016 | Monaco |
| 2016/0069062 A1 | 3/2016 | Dynon |
| 2016/0069067 A1 | 3/2016 | Ciuperca |
| 2016/0138258 A1 | 5/2016 | Schaffert et al. |
| 2016/0160501 A1 | 6/2016 | Taraba et al. |
| 2016/0208479 A1 | 7/2016 | Krause |
| 2016/0215508 A1 | 7/2016 | Kimel |
| 2017/0030071 A1 | 2/2017 | Sorensen et al. |
| 2017/0037637 A1 | 2/2017 | Grisolia et al. |
| 2017/0145692 A1 | 5/2017 | Zheng et al. |
| 2017/0146055 A1 | 5/2017 | Lowrey |
| 2017/0268232 A1 | 9/2017 | Renke et al. |
| 2017/0323780 A1 | 11/2017 | Koga et al. |
| 2017/0342723 A1 | 11/2017 | Krause |
| 2017/0350114 A1 | 12/2017 | Crozier |
| 2018/0016781 A1 | 1/2018 | Fox et al. |
| 2018/0112394 A1 | 4/2018 | Giles |
| 2018/0141134 A1 | 5/2018 | Brigham |
| 2018/0148923 A1 | 5/2018 | Bravo Valenzuela |
| 2018/0313074 A1 | 11/2018 | Brown et al. |
| 2019/0024364 A1 | 1/2019 | Lestini et al. |
| 2019/0056237 A1 | 2/2019 | White et al. |
| 2019/0100908 A1 | 4/2019 | Tiramani et al. |
| 2019/0128847 A1 | 5/2019 | Humfeld et al. |
| 2019/0161964 A1 | 5/2019 | Figueroa |
| 2019/0352515 A1* | 11/2019 | Zoitos ............... C09D 1/00 |
| 2020/0002552 A1 | 1/2020 | Song et al. |
| 2020/0123776 A1 | 4/2020 | Leatherman et al. |
| 2020/0263412 A1 | 8/2020 | Tiramani et al. |
| 2020/0263413 A1* | 8/2020 | Tiramani ............... B32B 7/12 |
| 2020/0317880 A1 | 10/2020 | Ruckdaeschel et al. |

FOREIGN PATENT DOCUMENTS

| | | |
|---|---|---|
| CA | 2442403 C | 12/2008 |
| CA | 2665960 A1 | 8/2009 |
| CH | 713912 A1 | 12/2018 |
| CN | 101249663 A | 8/2008 |
| CN | 205935221 U | 2/2017 |
| CN | 107012982 A | 8/2017 |
| CN | 206957136 U | 2/2018 |
| CN | 110000252 A | 7/2019 |
| CN | 110273517 B | 7/2020 |
| CN | 113423901 A | 9/2021 |
| CN | 113454302 A | 9/2021 |
| CN | 214994585 U | 12/2021 |
| DE | 1937440 A1 | 2/1971 |
| DE | 19800291 A1 | 7/1999 |
| DE | 19631647 C2 | 4/2000 |
| EP | 0205278 A1 | 12/1986 |
| EP | 2000611 A2 | 12/2008 |
| EP | 2636807 A2 | 9/2013 |
| EP | 3059357 A1 | 8/2016 |
| EP | 3239423 A1 | 11/2017 |
| FR | 1484291 A | 6/1967 |
| FR | 2652620 A1 | 4/1991 |
| GB | 1209160 A | 10/1970 |
| GB | 2290567 A | 1/1996 |
| WO | 1986/004630 A1 | 8/1986 |
| WO | 1996/013402 A1 | 5/1996 |
| WO | 1997/013931 A1 | 4/1997 |
| WO | 2002/066755 A1 | 8/2002 |
| WO | 2006/056383 A1 | 1/2006 |
| WO | 2008/067592 A1 | 6/2008 |
| WO | 2012/154898 A1 | 11/2012 |
| WO | 2014/169320 A1 | 10/2014 |
| WO | 2015/155438 A1 | 10/2015 |
| WO | 2016/074116 A1 | 5/2016 |
| WO | 2017/182471 A1 | 10/2017 |
| WO | 2019121958 A1 | 6/2019 |
| WO | 2020/167671 A2 | 8/2020 |
| WO | 2020/167673 A1 | 8/2020 |
| WO | 2020/167674 A1 | 8/2020 |

OTHER PUBLICATIONS

Thomas, Robert, MgO Board, igO Board, https://www.wconline.com/articles/85449-mgo-board, Oct. 31, 2007.

International Search Report and Written Opinion from related International Patent Application No. PCT/US2020/017528 issued May 1, 2020.

Moore, Tom, PE, "SIPs: An Engineer's Perspective," Powerpoint presented by the Structural Insulated Panel Association, 2018.

Video entitled, "Mega advanced Boxabl tech?", found at: https://www.facebook.com/boxabl/videos/660885174475648/ (May 8, 2020).

Video entitled, "Mega advanced Boxabl tech?", found at: https://www.tiktok.com/@boxabl/video/6824523989658930437?is_copy_url=1&is_from_webapp=v1 (May 8, 2020).

Video entitled, "Sneak peek of some Boxabl parts being made in a fully automated steel processing . . . ," found at: https://www.facebook.com/boxabl/videos/1113135289041201/ (Apr. 30, 2020).

APA Product Guide—Structural Insulated Panels, printed 2018.

International Search Report and Written Opinion from related Int'l Patent Appl'n No. PCT/US2020/017524 dated Jul. 30, 2020.

International Search Report and Written Opinion from related Int'l Patent Appl'n No. PCT/US2021/061343 dated Feb. 9, 2022.

International Search Report and Written Opinion from related Int'l Patent Appl'n No. PCT/US2021/056415 dated Feb. 25, 2022.

International Search Report and Written Opinion from related Int'l Patent Appl'n No. PCT/US2021/058912 dated Feb. 24, 2022.

Picture from https://microshowcase.com/microdwell/minim-house/, believed available as submitted herewith by Apr. 27, 2020.

Structural Insulated Panels Association, "Designing With SIP's: Design Considerations", printed 2018.

European Search Report from related European patent application No. 18864413.2 issued May 19, 2021.

European Search Report from related European patent application No. 18863822.5 issued Jun. 28, 2021.

//topsider.com/floorF.html—believed available as submitted herewith by May 13, 2008.

Ching, Building Construction Illustrated (3d edition), Wall Systems 5.03, believed available as submitted herewith by Oct. 3, 2006.

BOCA 1999 (14th edition), p. 267, believed available as submitted herewith by Oct. 3, 2006.

Portion of www.thisoldhouse.com , believed available as submitted herewith by Aug. 2, 2006.

Pages 1 and 2 of //www.taunton.com/finehomebuilding/pages/h00023.asp , believed available as submitted herewith by Aug. 2, 2006.

Affidavit of Robert Delorenzo dated Oct. 3, 2006.

Decision on Appeal, Ex Parte Paolo Tiramani, Appeal 2010-008385, U.S. Appl. No. 10/653,523, dated Aug. 28, 2012.

L1019-Genuine-Parts-Flyer, attached—Air Springs, 2014.

(56) References Cited

OTHER PUBLICATIONS

Hendrickson-Trailer Air Springs-Hendrickson Genuine Parts, attached, believed available as submitted herewith by Nov. 7, 2018.
International Search Report & Written Opinion, issued on Jan. 2, 2019, in PCT/US2018/053006. (15 Pages).
International Search Report & Written Opinion, issued on Jan. 29, 2019 in corresponding PCT application No. PCT/US2018/053015.
Heavy Timbers, Structural Insulated Panels, SIPS, http://heavytimbers.com/sips.html. last viewe Oct. 31, 2018.
International Search Report and Written Opinion from related Int'l Patent Appl'n No. PCT/US2021/059440 dated Mar. 16, 2022.
International Search Report and Written Opinion from related Int'l Patent Appl'n No. PCT/US2022/014224 dated Apr. 25, 2022.
International Search Report and Written Opinion from related Int'l Patent Appl'n No. PCT/US2021/063581 dated May 3, 2022.
International Search Report and Written Opinion from related Int'l Patent Appl'n No. PCT/US2022/011415 dated May 24, 2022.
First Examination Report from related Chinese Patent Application No. 202080014606.4 issued Apr. 20, 2022.
U.S. Non-Final Office Action from related U.S. Appl. No. 16/786,202 issued Apr. 22, 2022.
First Examination Report from related Chinese Patent Application No. 202080014607.9 issued Mar. 24, 2022.
International Search Report and Written Opinion from related Int'l Patent Appl'n No. PCT/US2022/01699 dated Jul. 7, 2022.
Search Report from related European Patent Application No. 20755992.3 issued Oct. 7, 2022.
Search Report from related European Patent Application No. 20755993.1 issued Nov. 17, 2022.
European Office Action for Application No. 20755992.3, dated Feb. 3, 2023, 24 pages.
Non-Final Office Action from related U.S. Appl. No. 17/675,646 dated Feb. 2, 2023.
U.S. Appl. No. 17/527,520, filed Nov. 16, 2021, Paolo Tiramani et al.
U.S. Appl. No. 17/239,706, filed Dec. 1, 2021, Paolo Tiramani et al.
U.S. Appl. No. 17/539,706, filed Dec. 1, 2021, Paolo Tiramani et al.
U.S. Appl. No. 17/513,207, filed Oct. 28, 2021, Paolo Tiramani et al.
U.S. Appl. No. 17/513,266, filed Oct. 28, 2021, Paolo Tiramani et al.
U.S. Appl. No. 17/587,051, filed Jan. 28, 2022, Paolo Tiramani et al.
U.S. Appl. No. 17/504,883, filed Oct. 19, 2021, Paolo Tiramani et al.
U.S. Appl. No. 17/675,646, filed Feb. 18, 2022, Paolo Tiramani et al.
U.S. Appl. No. 17/675,653, filed Feb. 18, 2022, Paolo Tiramani et al.
U.S. Appl. No. 18/118,770, filed Mar. 8, 2023, Paolo Tiramani et al.
U.S. Appl. No. 17/552,108, filed Dec. 15, 2021, Paolo Tiramani et al.
U.S. Appl. No. 17/569,962, filed Jan. 6, 2022, Paolo Tiramani et al.
U.S. Appl. No. 17/245,187, filed Apr. 30, 2021, Paolo Tiramani et al.
U.S. Appl. No. 18/071,902, filed Nov. 30, 2022, Paolo Tiramani et al.
U.S. Appl. No. 18/071,905, filed Nov. 30, 2022, Paolo Tiramani et al.

\* cited by examiner

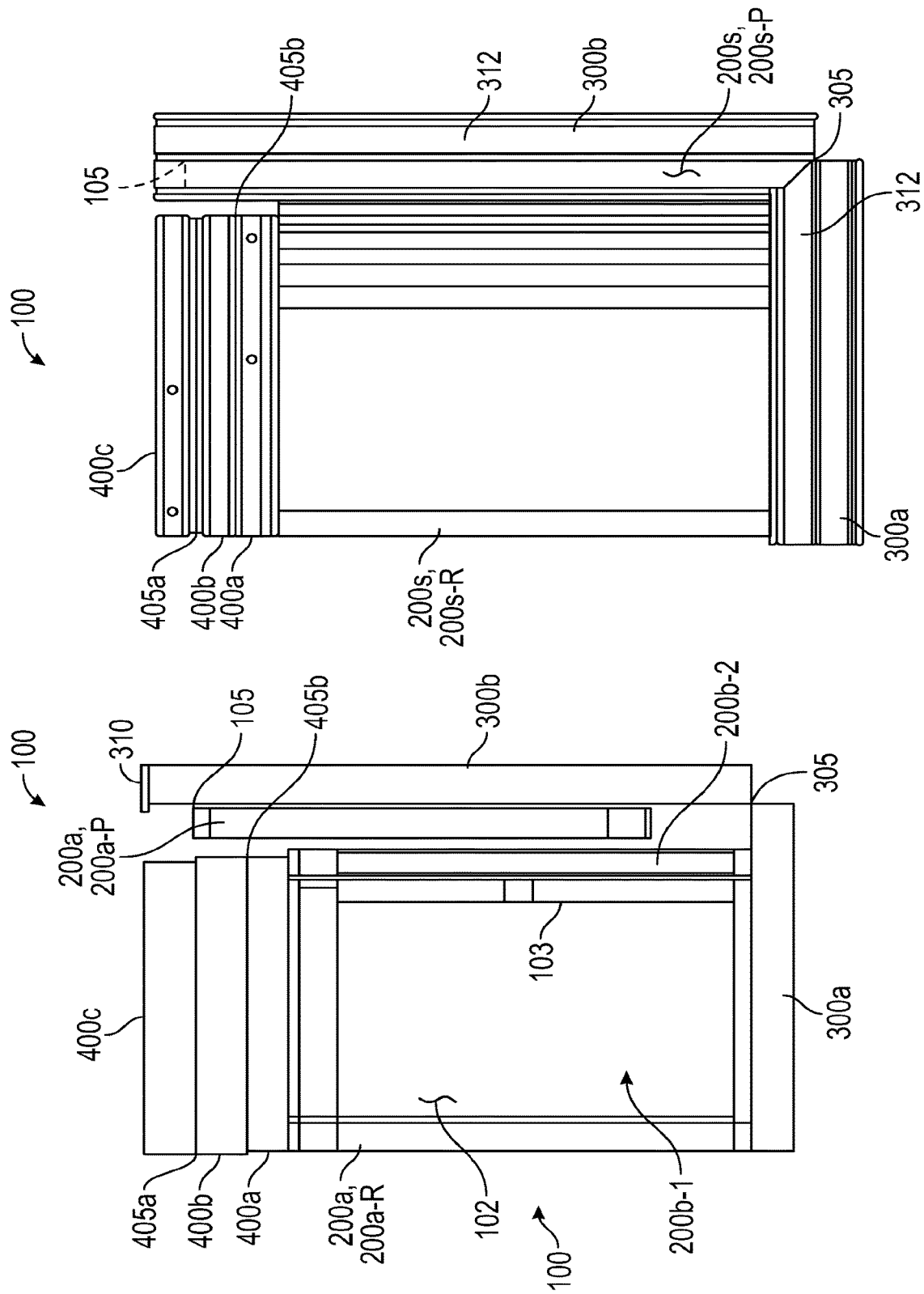

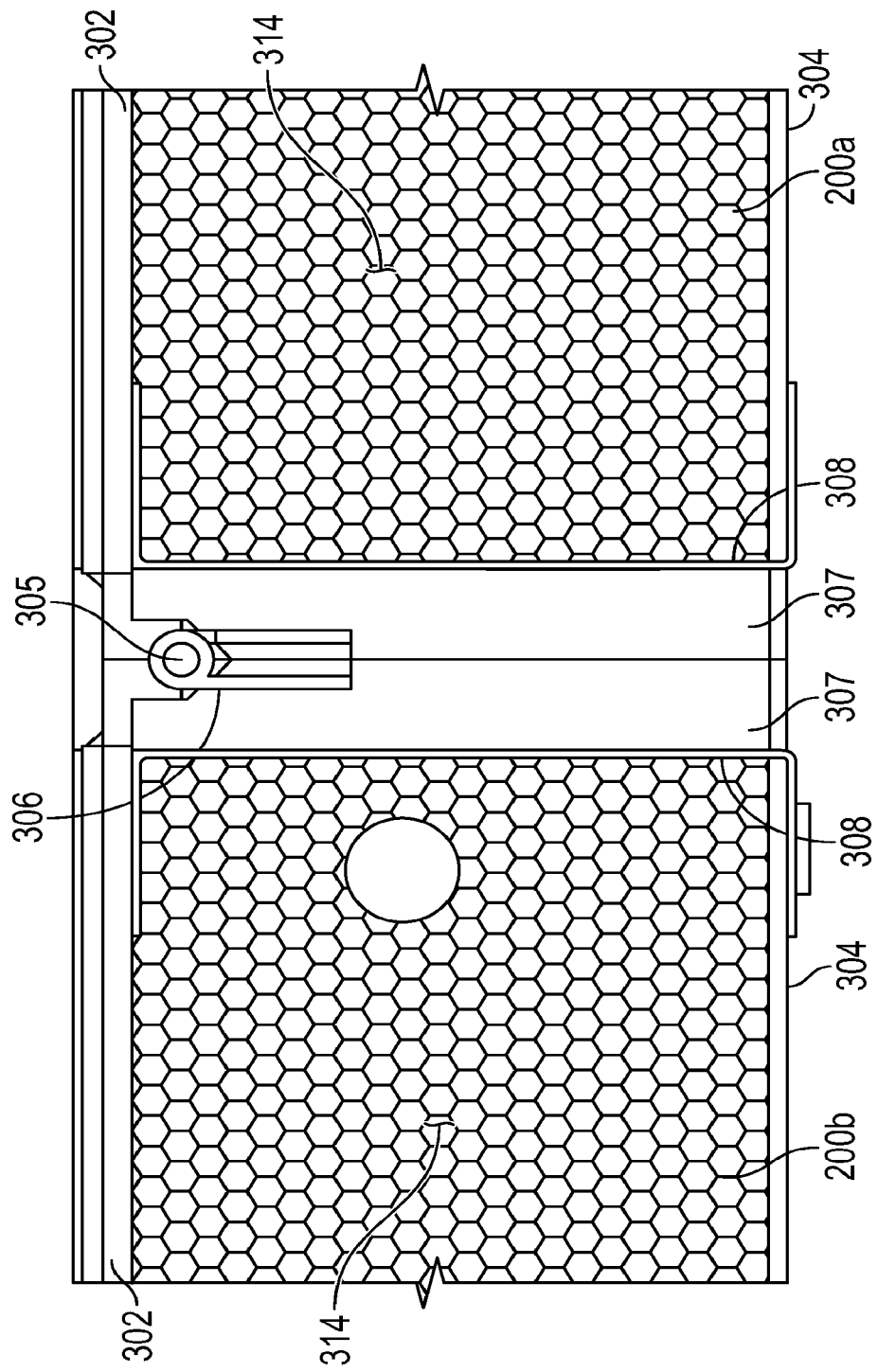

PERIMETER STRUCTURES FOR JOINING ABUTTING ENCLOSURE COMPONENTS

CROSS-REFERENCES TO RELATED APPLICATIONS

This application is a continuation application of U.S. patent application Ser. No. 16/786,202, filed on Feb. 10, 2020, which claims the benefit of U.S. Provisional Application No. 62/805,710, filed Feb. 14, 2019 and U.S. Provisional Application No. 62/960,991, filed Jan. 14, 2020, each of which are incorporated by reference herein in their entirety.

BACKGROUND OF THE INVENTION

Field of the Invention

The inventions herein relate to structures, such as dwellings and other buildings for residential occupancy, commercial occupancy and/or material storage, and to components for such structures.

Description of the Related Art

In the field of residential housing, the traditional technique for building homes is referred to as "stick-built" construction, where a builder constructs housing at the intended location using in substantial part raw materials such as wooden boards, plywood panels, and steel Lally columns. The materials are assembled piece by piece over a previously prepared portion of ground, for example, a poured concrete slab or a poured concrete or cinder block foundation.

There have been a variety of efforts to depart from the conventional construction techniques used to create dwellings, as well as commercial spaces and like. One of the alternatives to stick-built construction is very generally referred to as modular housing. As opposed to stick-built construction, where the structure is built on-site, a modular house is constructed in a factory and then shipped to the site, often by means of a tractor-trailer. A drawback of modular housing is that the prospective buyer can customize the structure layout only to a relatively limited degree. That is, while certain features, for example a closet, may be added or subtracted from a room, the general shape and layout of the house cannot be changed or adapted to the customer's preference.

Additionally, modular housing often exceeds in size normally-permitted legal limits for road transport. For example, in the United States the maximum permitted dimensions for road transport are in general 102 inches (259.1 cm) in width, 13.5 feet (4.11 m) in height and 65 to 75 feet (19.81 to 22.86 m) in length. Thus, in many cases transporting a modular house from factory to site requires oversize load permits, which may impose restrictions on when transport can be undertaken and what routes can be utilized. Oversize road regulations may also require the use of an escort car and a trailing car as well. All of these requirements and restrictions inevitably increase the cost of the modular housing.

Significant advancements in the construction of dwellings and commercial space are described in U.S. Pat. Nos. 8,474,194, 8,733,029 and U.S. Patent Publication No. 2019/0100908. In one aspect, those patent documents pertain to fabricating wall, floor and ceiling components in a factory that are folded together into a compact shipping module, and which are then transported to the intended location and unfolded to yield a structure, where the folding and unfolding of the components can be facilitated by the use of hinges.

SUMMARY OF THE INVENTION

The present inventions are directed to enclosure component perimeter structures, including hinged structures that can be left in place after delivery, thereby reducing on-site set-up costs. In addition, the hinged and other enclosure component perimeter structures described herein can serve as structural load-bearing members, and also contribute to weather-proofing of the enclosure components to which they are affixed. The present inventions facilitate the provision of enclosure components and enclosure component portions which can be compactly packaged for easy shipment from a factory to a construction site, and which are joined to each other in a manner to permit rapid field-level deployment with factory-level tolerances and repeatability.

In one aspect, the present inventions are directed to a reinforced enclosure member for a building structure, comprising a planar laminate having a generally linear edge comprising a first facing layer; a layer of foam having a first face and a second opposing face; and a second facing layer; with the first facing layer fastened to the first face of the layer of the foam, and the second facing layer fastened to the second opposing face of the layer of foam; and a reinforced end cap comprising a first elongate flange surface joined to an elongate web surface at a first junction, a second elongate flange surface joined to the elongate web surface at a second junction, the first elongate flange surface and the second elongate flange surface being spaced-apart by a distance, and with the web surface, the first elongate flange surface and the second elongate flange surface generally forming a C-channel shape. There is provided an elongate cavity wall joined to each of the first and second elongate flange surfaces, the elongate cavity wall being spaced from and generally parallel to the elongate web surface, and spanning the distance spacing apart the first and second elongate flange surfaces, to define a reinforcement channel; and a filler reinforcement within the reinforcement channel. The reinforced end cap is secured to the generally linear edge of the planar laminate, with the distance spacing apart the first and second elongate flange surfaces adapted to receive between them at least the generally linear edge of the layer of foam.

In another aspect, the present inventions are directed to foldable enclosure members for a building structure that comprise a first planar laminate having a first generally linear edge and a second planar laminate having a second generally linear edge, where each planar laminate comprises a first facing layer; a layer of foam having a first face and a second opposing face; and a second facing layer; where the first facing layer is fastened to the first face of the layer of foam, and the second facing layer is fastened to the second opposing face of the layer of foam. The foldable enclosure components additionally comprise a first perimeter section comprising a first elongate web surface having a first elongate edge region and a second elongate edge region; and a second perimeter section comprising a third elongate edge region and a fourth elongate edge region. The first perimeter section is secured to the generally linear edge of the first planar laminate, and the second perimeter section is secured to the generally linear edge of the second planar laminate. The first perimeter section has a first series of hinge knuckles in proximity to the first elongate edge region, and a second series of hinge knuckles in proximity to the second elongate edge region; and the second perimeter section correspondingly has a third series of hinge knuckles in proximity to the third elongate edge, and a fourth series of hinge knuckles in proximity to the fourth elongate edge region. The first series of hinge knuckles is intermeshed with the third series of hinge knuckles, and a first rod is received in and joins the intermeshed first and third series of hinge knuckles to form a pivotable junction between the first perimeter section and the second perimeter section that can pivot from a folded position, where the first elongate web surface is oriented at an angle to the second elongate web surface, to an unfolded position where the first elongate web surface is in flush contact with the second elongate web surface. The second series of hinge knuckles is adapted to intermesh with the fourth series of hinge knuckles when the pivotable junction is in the unfolded position. These foldable enclosure components also comprise a second rod, and the second series of hinge knuckles and the fourth series of hinge knuckles are adapted to receive, when intermeshed, the second rod, to form a rigid structure between the first perimeter section and the second perimeter section, the rigid structure comprising the first perimeter section and the second perimeter section.

These and other aspects of the present inventions are described in the drawings annexed hereto, and in the description of the preferred embodiments and claims set forth below.

BRIEF DESCRIPTION OF THE DRAWINGS

FIGS. 3A and 3B are end views of shipping modules from which are formed the finished structures respectively shown in FIGS. 1A and 1B.

FIG. 8 is a schematic side view of an embodiment of a hinge structure joining two floor portions in accordance with the present inventions.

DETAILED DESCRIPTION OF THE PREFERRED EMBODIMENTS

Figure 1A:
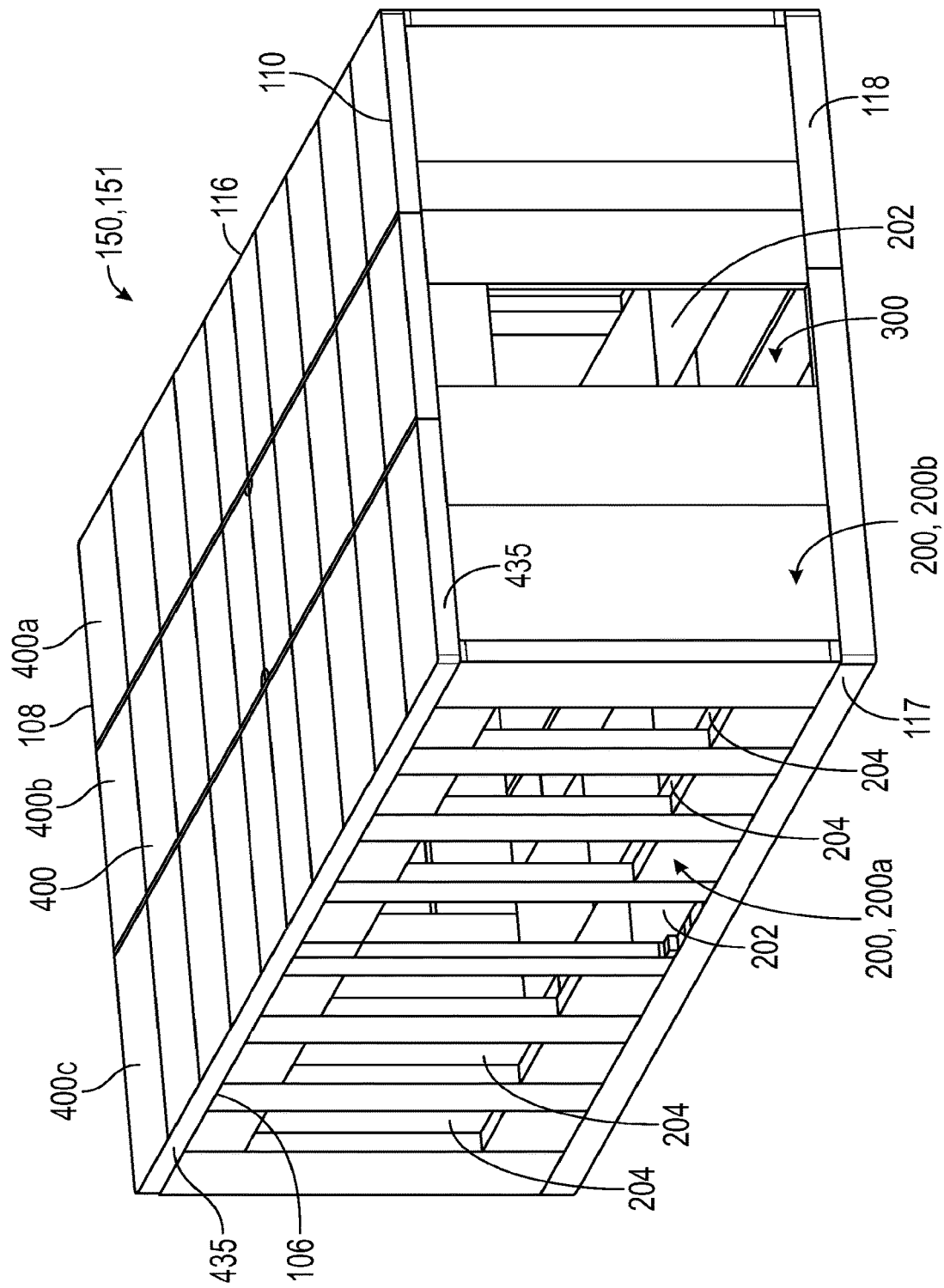
FIGS. 1A and 1B are perspective views of finished structures prepared in accordance with the present inventions.
Figure 1B:
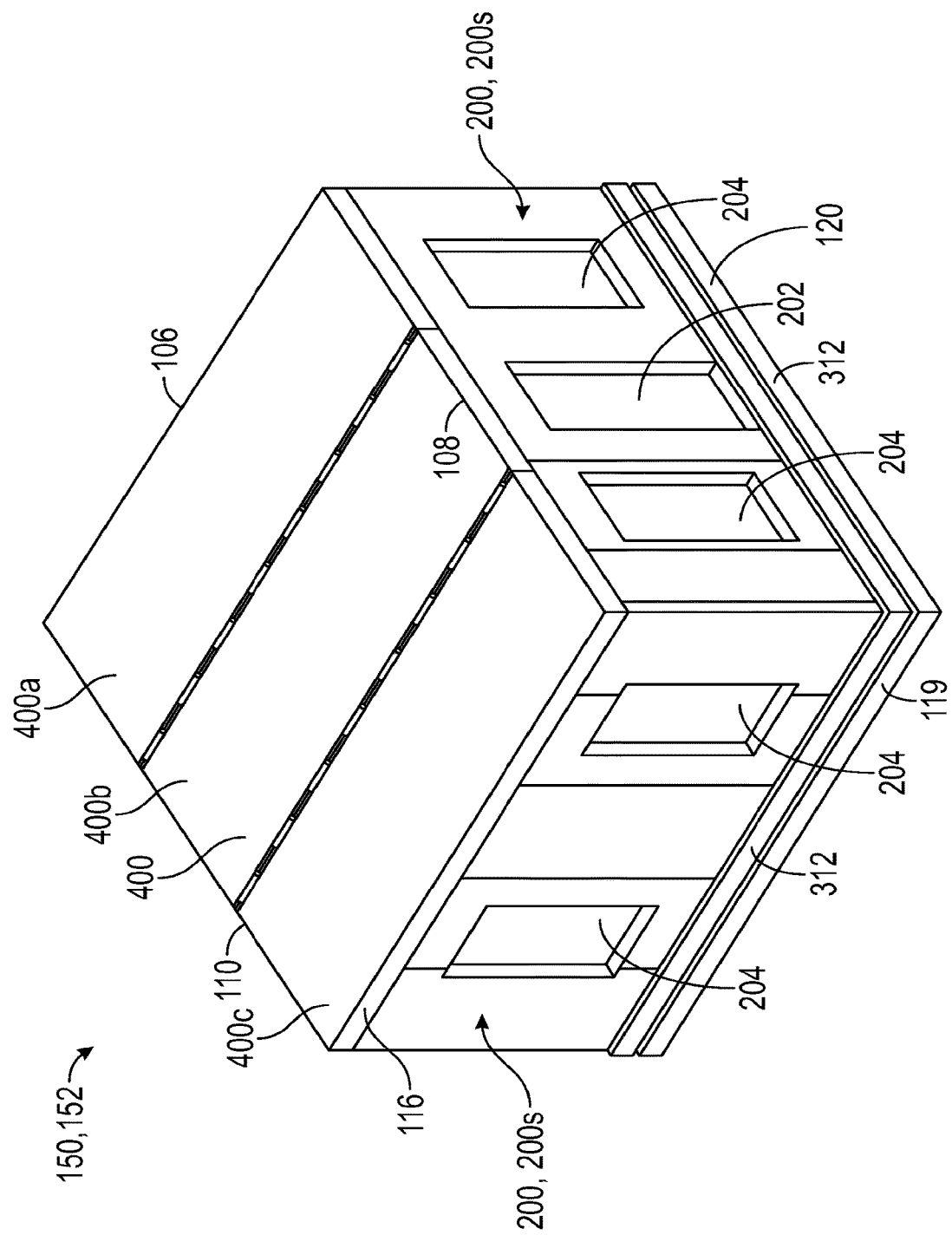

FIG. 1A depicts a finished structure 150 of a first type (sometimes referred to herein as type 1 structure 151) in accordance with the inventions disclosed herein, and FIG. 1B depicts a finished structure 150 of a second type (sometimes referred to herein as type 2 structure 152) in accordance with the inventions disclosed herein. Type 1 structure 151 is smaller than type 2 structure 152, but the inventions described herein are equally applicable to the fabrication and deployment of type 1 structure 151, type 2 structure 152, and to other structures of different dimensions as well. Accordingly, references herein to "structure 150" should be understood to generically denote type 1 structure 151 and type 2 structure 152 without distinction. Likewise, reference in this disclosure to the same numerically identified component among different embodiments indicates that such component is the same among such different embodiments.

Structure 150 as depicted in FIGS. 1A and 1B has a rectangular shape made of three types of generally planar and rectangular enclosure components 155, the three types of enclosure components 155 consisting of a wall component 200, a floor component 300, and a ceiling component 400. Structure 150 has one floor component 300, one ceiling component 400 and four wall components 200. As shown in FIGS. 1A and 1B, the perimeter of finished structure 150 is defined by first longitudinal edge 106, first transverse edge 108, second longitudinal edge 116 and second transverse edge 110.

Enclosure components 155 (wall component 200, floor component 300 and ceiling component 400) can be fabricated and dimensioned as described herein and positioned together to form a shipping module 100, shown end-on in FIGS. 3A and 3B, with FIG. 3A depicting a shipping module 100 for a type 1 structure 151 and FIG. 3B depicting a shipping module 100 for a type 2 structure 152. The enclosure components 155 are dimensioned so that the shipping module 100 is within U.S. federal highway dimensional restrictions. As a result, shipping module 100 can be transported over a limited access highway more easily, and with appropriate trailering equipment, transported without the need for oversize permits. Thus, the basic components of finished structure 150 can be manufactured in a factory, positioned together to form the shipping module 100, and the modules 100 can be transported to the desired site for the structure, where they can be readily assembled and customized, as described herein.

Enclosure Component Laminate Design

A laminate multi-layer design can be used to fabricate the enclosure components 155 of the present inventions. FIGS. 4A-4D depict four embodiments of that multi-layer design, in exploded cross-section, for an exemplary enclosure component 155.

First and Second Embodiments

Interior Sheathing Layer (282). In the first and second embodiments of the laminate multi-layer design, shown in FIGS. 4A and 4B respectively, the surface of enclosure component 155 that will face toward the interior of structure 150 is optionally provided with an interior sheathing layer 282. It is preferred that interior sheathing layer 282 be fabricated of relatively thick paper, of a weight comparable to that used as the exterior surface of drywall (marketed for example under the trademark Sheetrock®). Interior sheathing layer 282 preferably is unrolled from a continuous roll of paper (the paper roll optionally having a width approximating the width of enclosure component 155) to yield a seamless interior finish for enclosure component 155.

First Structural Layer (210). A first structural layer 210 is provided in the first embodiment depicted in FIG. 4A and in the second embodiment depicted in FIG. 4B. If used, the interior sheathing layer 282 is bonded to this first structural layer 210 with a suitable adhesive, preferably a polyurethane based construction adhesive. First structural layer 210 in the embodiments shown comprises a plurality of rectangular structural building panels 211 principally comprising an inorganic composition of relatively high strength, such as magnesium oxide (MgO). Suitable structural building panels 211 can be MgO boards approximately four feet (1.22 m) wide by approximately eight feet (2.44 m) long. In a specific implementation of the first embodiment of the multi-layer design of FIG. 4A, the thickness of those structural building panels 211 using magnesium oxide board can be approximately 0.5 inch (1.27 cm); as an alternative, a thickness of approximately 0.25 inch (0.64 cm) can be employed.

To form first structural layer 210, a number of generally rectangular structural building panels 211 are laid adjacent to each other to generally cover the full area of the intended enclosure component 155. For example, for the wall component 200a shown in FIG. 5A, structural building panels 211 are arranged horizontally and vertically adjacent each other in a checkerboard relationship to generally cover the full area of of wall component 200a. As another exemplary arrangement, a number of structural building panels 211 of sufficient length can be vertically positioned side-by-side to generally cover the full area of a wall component 200.

Figure 4A:
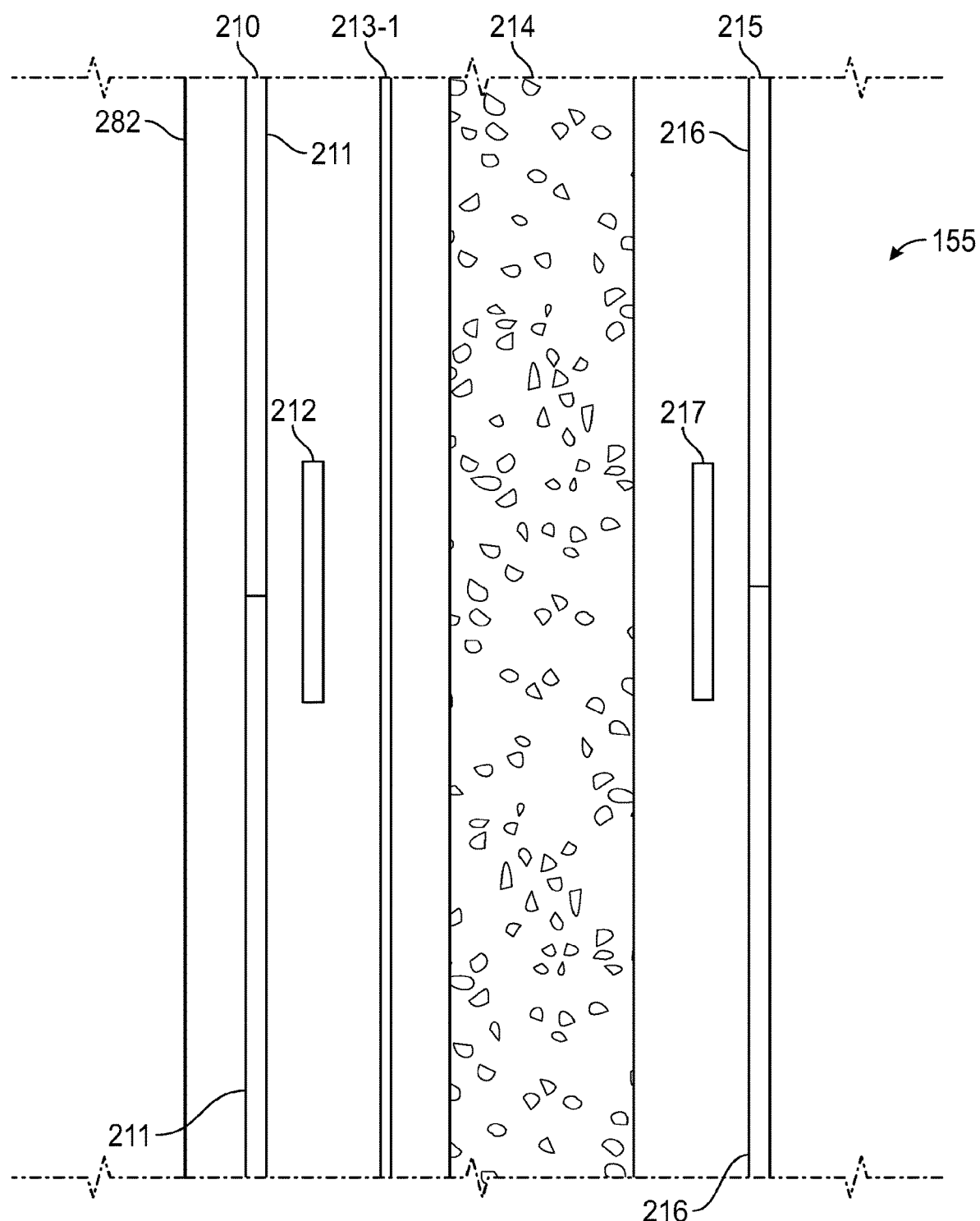
FIGS. 4A, 4B, 4C and 4D are exploded cross-sectional views of four embodiments of laminate multi-layer constructions for use in the enclosure components of the present inventions.
Figure 4B:
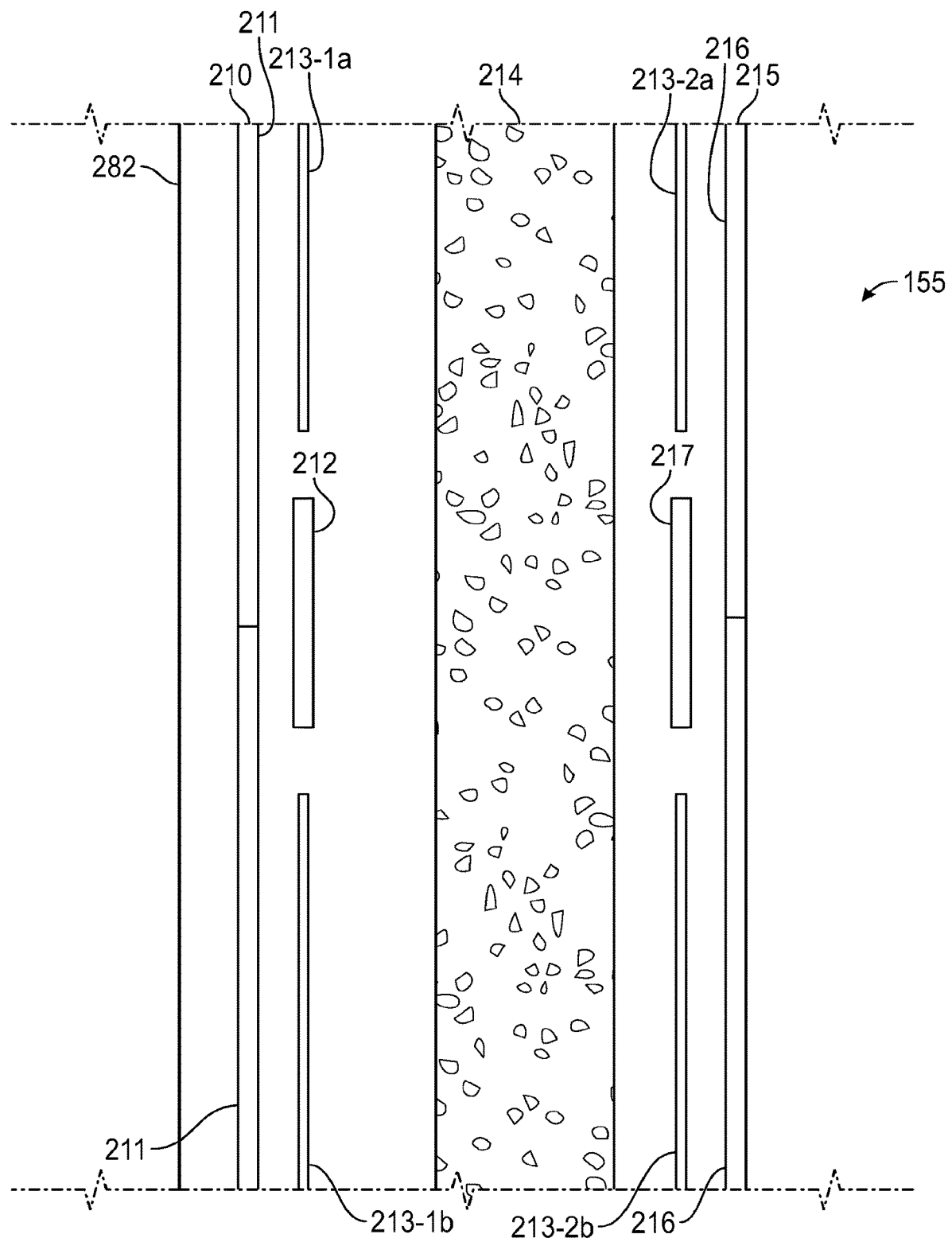

First structural layer 210 in the first and second embodiments, respectively shown in FIGS. 4A and 4B, additionally comprises multiple binding strips 212, made for example of magnesium oxide board, laid both horizontally and/or vertically as appropriate. In particular, binding strips 212 are positioned over the linear junctions between adjacent panels 211, and then are fastened to the regions of those panels bordering those junctions, using for example a suitable adhesive, preferably a polyurethane based construction adhesive, to form a lap joint between the adjacent building panels 211, thereby bonding together the panels 211 of first structural layer 210 to form a single unit. Binding strips 212 of magnesium oxide board can be for example approximately six inches (15.2 cm) wide and 0.25 inch (0.635 cm) or 0.5 inch (1.27 cm) thick.

First Strengthening Layer (213-1). As shown in the first and second embodiments depicted in FIGS. 4A and 4B respectively, there is next provided a first strengthening layer 213-1, made of woven fiber such as woven fiberglass. In the first embodiment, shown in FIG. 4A, first strengthening layer 213-1 preferably is unrolled from a continuous roll of mat (the mat roll optionally having a width approximating the width of enclosure component 155) to yield a seamless interior layer. In the second embodiment, shown in FIG. 4B, first strengthening 213-1 comprises multiple separate fiber layer segments, as exemplified by segments 213-1a and 213-1b shown in FIG. 4B, which are positioned between binding strips 212.

Foam Panels (214). Referring again to FIGS. 4A and 4B, there is next provided in the first and second embodiments a plurality of generally planar rectangular foam panels 214 collectively presenting a first face and a second opposing face. Foam panels 214 are made for example of expanded polystyrene (EPS) or polyurethane foam. A number of these foam panels 214 are laid adjacent to each other to generally cover the full area of the intended enclosure component 155. For example, for the wall component 200a shown in FIG. 5B, foam panels 214 are arranged horizontally and vertically adjacent each other in a checkerboard relationship to generally cover the full area of wall component 200a. As another exemplary arrangement, a number of foam panels 214 of sufficient length can be vertically positioned side-by-side to generally cover the full area of a wall component 200.

It is preferred that the seams between adjacent foam panels 214 not overlay or coincide with the seams between the structural building panels 211 of first structural layer 210, in reference to the direction across the thickness of the enclosure component 155. Rather, it is preferred that the seams between adjacent foam panels 214 be offset a distance from the seams between adjacent structural building panels 211 of first structural layer 210. For example, for foam panels 214 vertically positioned side-by-side and structural building panels 211 vertically positioned side-by-side, the seams between adjacent foam panels can be positioned at or as near the mid-line (the middle dividing line) of structural building panels 211 as design, manufacturing and other considerations permit. Correspondingly, for foam panels 214 arranged in a checkerboard relationship and building panels 211 arranged in a checkerboard relationship, each corner where four foam panels 214 meet can be positioned at or as near the center of a structural building panel 211 as design, manufacturing and other considerations permit.

First strengthening layer 213-1 preferably is sandwiched between and fastened to both first structural layer 210 and to the first face of foam panels 214 using a suitable adhesive, preferably a polyurethane based construction adhesive. If the woven fiber of first strengthening layer 213-1 has a relatively open weave, only one adhesive spread is required during manufacture to bond together the layers 210, 213-1 and 214 into a bonded laminate structure. Adjacent foam panels 214 optionally can be fastened to each other with a suitable adhesive applied between abutting panels, preferably a polyurethane based construction adhesive.

Second Strengthening Layer (213-2). In the first embodiment of the laminate multi-layer design shown in FIG. 4A, there is a strengthening layer of woven fiber, first strengthening layer 213-1, on one face of foam panels 214 only. In the second embodiment of the laminate multi-layer design, shown in FIG. 4B, there is a second strengthening layer 213-2, made of woven fiber such as woven fiberglass, on the second opposing face of foam panels 214. Second strengthening layer 213-2 can be continuous, like first strengthening layer 213-1 shown in FIG. 4A, or can comprise multiple separate fiber layer segments, as exemplified by segments 213-2a and 213-2b shown in FIG. 4B, which are positioned between binding strips 217, described further below.

Second Structural Layer (215). In the first embodiment of the laminate multi-layer design shown in FIG. 4A, there is provided a second structural layer 215, which is positioned on the second opposing face of foam panels 214 (the face distal from first structural layer 210). In the second embodiment of the laminate multi-layer design, shown in FIG. 4B, there is also provided a second structural layer 215, although in this second embodiment the second strengthening layer 213-2 is sandwiched between the second opposing face of foam panels 214 and second structural layer 215. Second structural layer 215 comprises a plurality of rectangular structural building panels 216, each principally comprising an inorganic composition of relatively high strength, such as magnesium oxide. Suitable building panels 216 can be magnesium oxide boards approximately four feet (1.22 m) wide by eight feet (2.44 m) long. In an exemplary embodiment of second structural layer 215, the thickness of those structural building panels 216 using magnesium oxide board can approximately 0.5 inch (1.27 cm) as an alternative, a thickness of approximately 0.25 inch (0.64 cm) can be employed.

To form second structural layer 215, a number of rectangular structural building panels 216 are laid adjacent to each other to generally cover the full area of the intended enclosure component 155. For example, for the wall component 200a shown in FIG. 5B, structural building panels 216 are arranged horizontally and vertically adjacent each other in a checkerboard relationship to generally cover the full area of wall component 200a. As another exemplary arrangement, a number of structural building panels 216 of sufficient length can be vertically positioned side-by-side to generally cover the full area of a wall component 200.

As is the case for first structural layer 210, it is preferred that the seams between adjacent foam panels 214 not overlay or coincide with the seams between the structural building panels 216 of second structural layer 215 in the direction across the thickness of the enclosure component 155. Rather, it is preferred that the seams between adjacent foam panels 214 be offset a distance from the seams between adjacent structural building panels 216 of second structural layer 215. For example, for foam panels 214 vertically positioned side-by-side and structural building panels 216 vertically positioned side-by-side, the seams between adjacent foam panels 214 can be positioned at or as near the mid-line of structural building panels 216 as design, manufacturing and other considerations permit. Correspondingly, for foam panels 214 arranged in a checkerboard relationship and structural building panels 216 arranged in a checkerboard relationship, each corner where four foam panels 214 meet can be positioned at or as near the center of a structural building panel 216 as design, manufacturing and other considerations permit. On the other hand, the seams between the structural building panels 211 of first structural layer 210 can coincide without preference in the direction across the thickness of the enclosure component 155 with the seams of structural building panels 216 of second structural layer 215.

The second structural layer 215 in the first and second embodiments, shown in FIGS. 4A and 4B respectively, additionally comprises multiple binding strips 217, made for example of magnesium oxide board, positioned between building panels 216 and foam panels 214. Binding strips 217 are positioned over the linear junctions between adjacent panels 216, and then are fastened to the regions of those panels bordering those junctions, using for example a suitable adhesive, preferably a polyurethane based construction adhesive, to form a lap joint between the adjacent building panels 216, thereby bonding together the panels 211 of first structural layer 210 to form a single unit. Binding strips 217 of magnesium oxide board can be for example approximately six inches (15.2 cm) wide and 0.25 inches (0.635 cm) or 0.5 inch (1.27 cm) thick.

If first strengthening layer 213-1 and/or second strengthening layer 213-2 are formed from a continuous roll, then foam panels 214 can be provided with suitable recesses (not shown) to accommodate such local thickness variations of the combination of layer 213-1/binding strips 212 and/or layer 213-2/binding strips 217 as may arise in the regions proximate the binding strips. If first strengthening layer 213-1 and/or second strengthening layer 213-2 are formed from separate segments, then foam panels 214 can be provided with suitable recesses (not shown) to receive binding strips 212 and/or 217.

In the first embodiment shown in FIG. 4A, second structural layer 215 is fastened to foam panels 214 using for example a suitable adhesive, preferably a polyurethane based construction adhesive. In the second embodiment shown in FIG. 4B, second strengthening layer 213-2 preferably is fastened to both second structural layer 215 and to foam panels 214 using for example a suitable adhesive, preferably a polyurethane based construction adhesive. If first strengthening layer 213-2 has a woven fiber having a relatively open weave, only one adhesive spread is required during manufacture to bond together the layers 214, 213-2 and 215 into a bonded laminate structure.

Figure 5A:
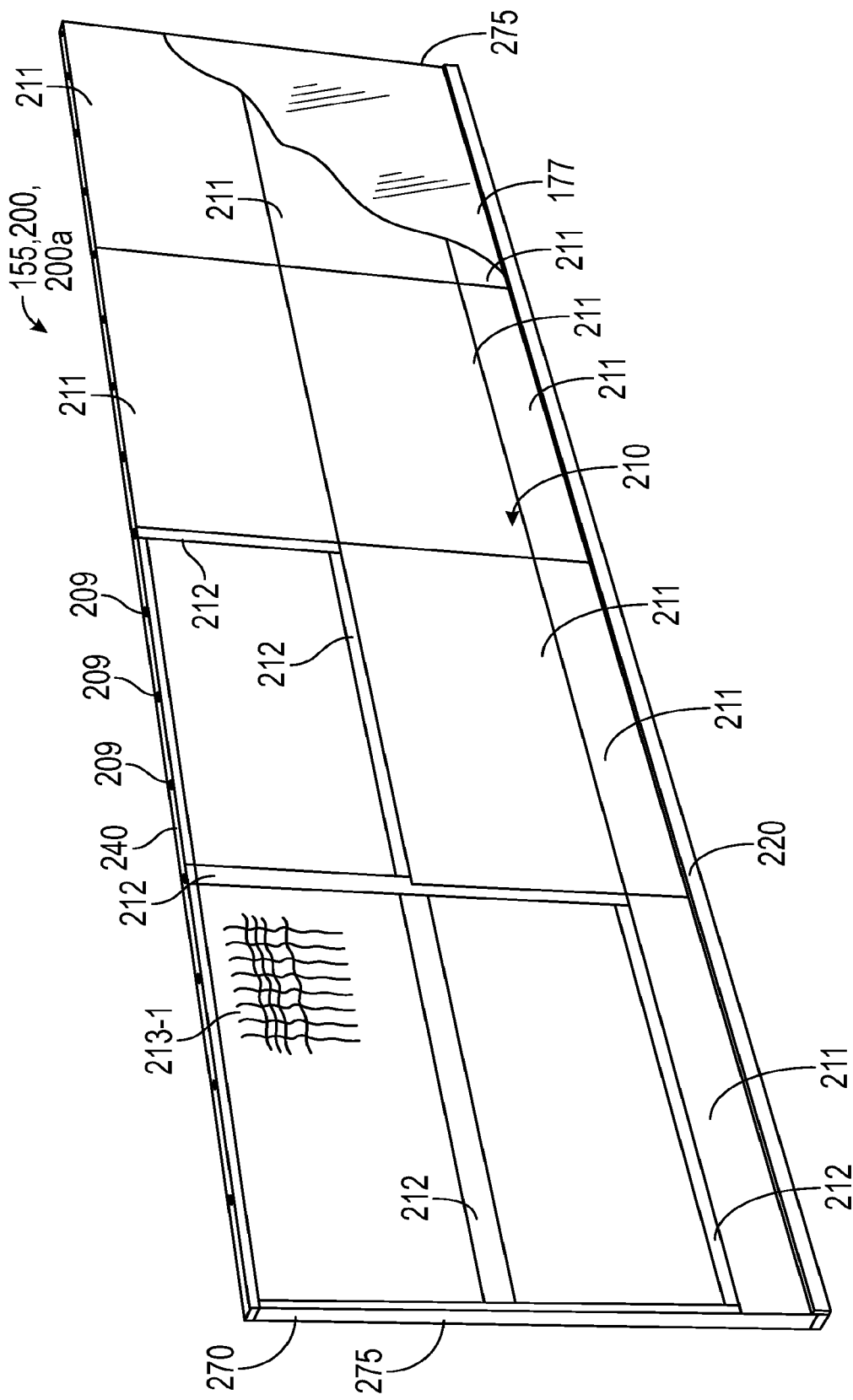
FIG. 5A is a cutaway perspective interior view of a wall component in accordance with the present inventions.
Figure 5B:
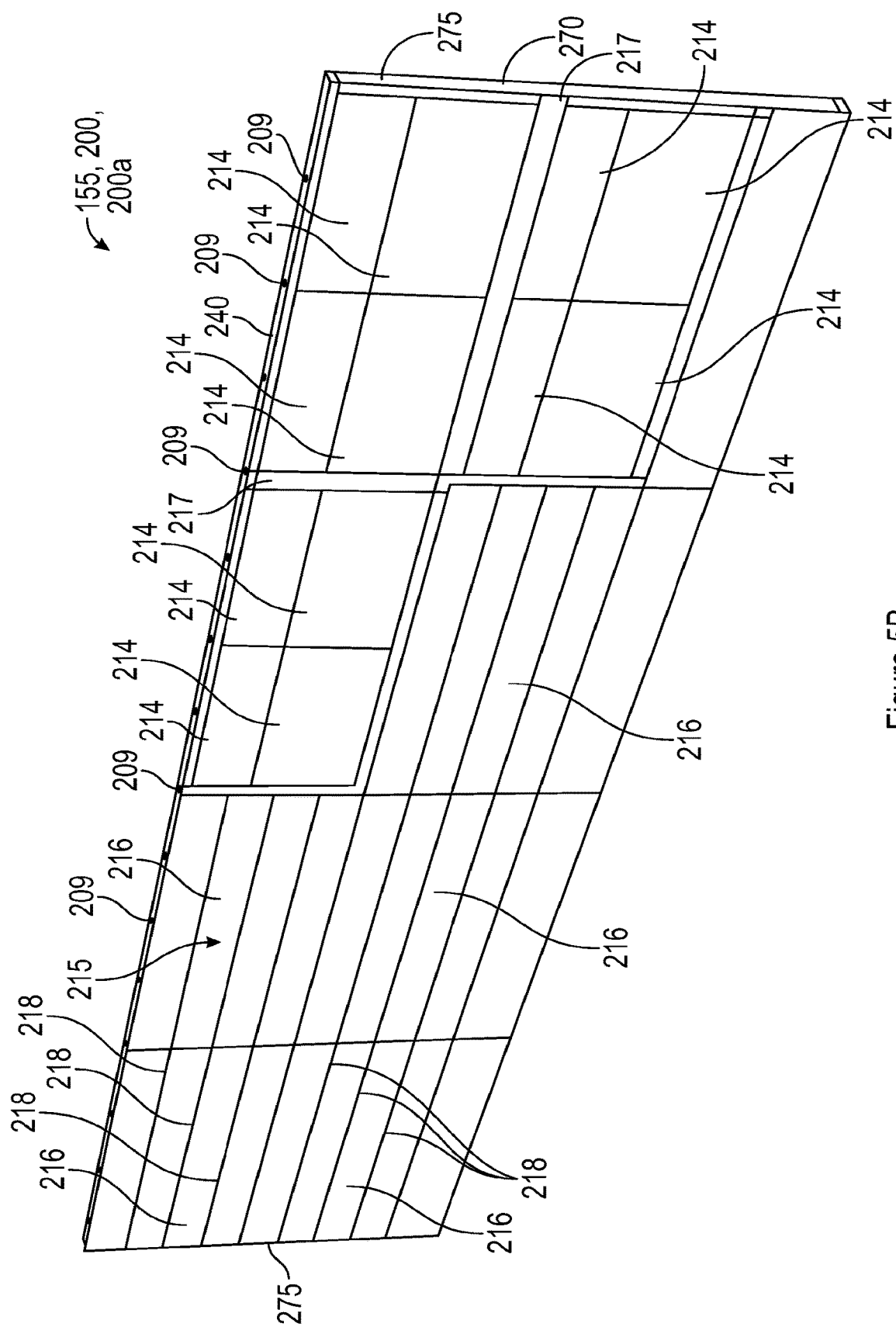
FIG. 5B is a cutaway perspective exterior view of a wall component in accordance with the present inventions.

In the embodiment of wall component 200 shown in FIG. 5B, the exterior of the structural building panels 216 of second structural layer 215 are provided with grooves 218 for aesthetic reasons, particularly to better conceal the presence of the seams between adjacent panels 216. Optionally, the exterior of panels 216 can be covered with additional protective material unrolled from a continuous roll.

Strengthening layer 213-1 and/or strengthening layer 213-2 can be omitted in the absence of tensile loading in the applicable region. Further, although the interior sheathing layer 282 is shown bonded to first structural layer 210, it can with equal facility be bonded to second structural layer 215, where that structural layer faces the interior, inhabited portion of the structure. Interior sheathing layer 282 can also be omitted where not desired.

Third and Fourth Embodiments

Figure 4C:
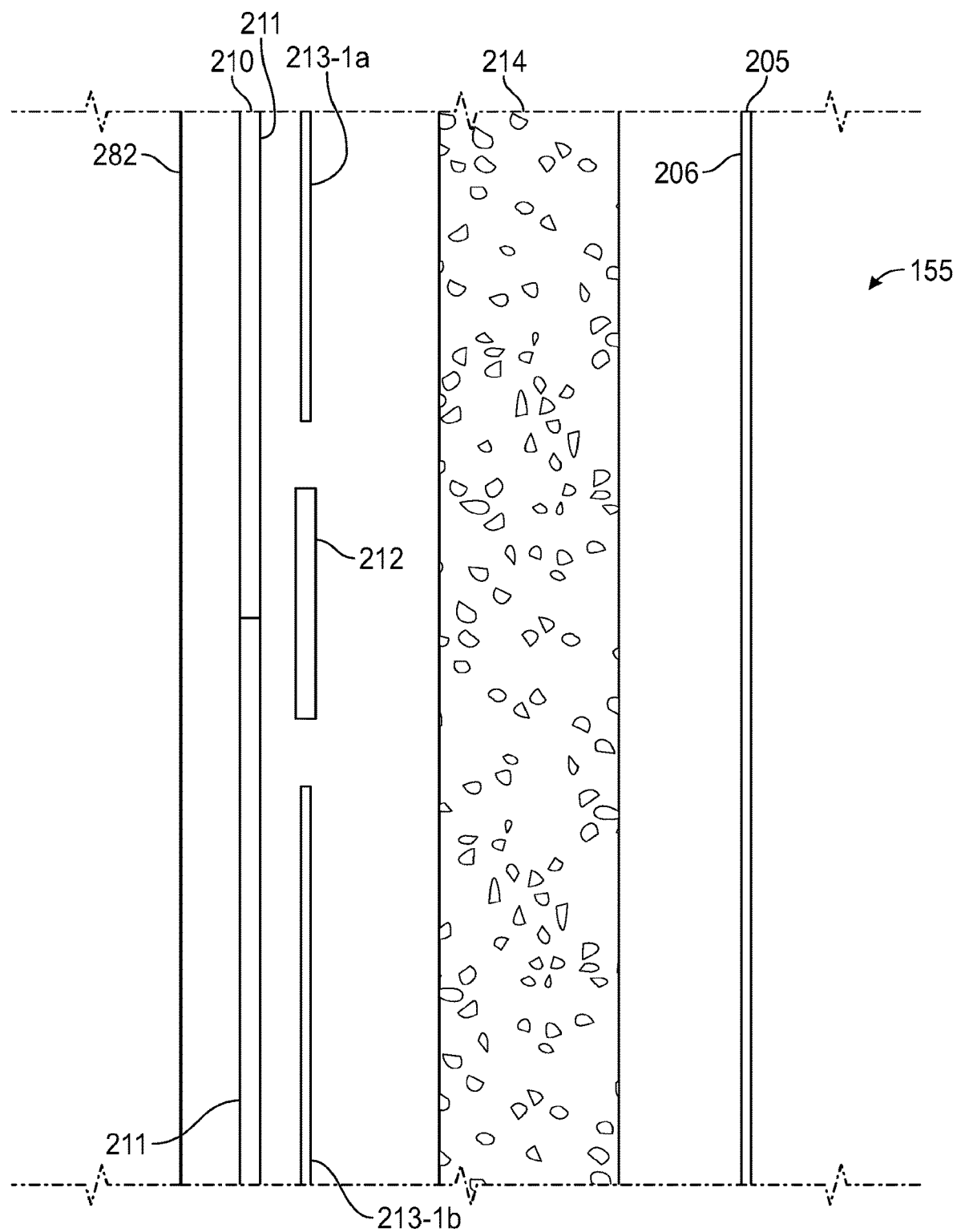

A third embodiment of the laminate multi-layer design is shown in FIG. 4C. As compared to the second embodiment shown in FIG. 4B, the third embodiment of FIG. 4C has a sheet metal layer 205 in lieu of second structural layer 215, but is otherwise identical in design to the second embodiment shown in FIG. 4B. Sheet metal layer 205, which can be steel or aluminum for example, is made from a plurality of generally planar rectangular metal sheets 206 positioned adjacent to each other to generally cover the full area of the intended enclosure component 155, and joined to each other, such as by riveting or welding. Following joining, the joined metal sheets 206 of sheet metal layer 205 are fastened with a suitable adhesive spread to the second opposing face of foam panels 214 (the face of foam panels 214 distal from structural layer 210).

It is preferred that the seams between adjacent foam panels 214 not overlay or coincide with the seams in the joined metal sheets 206 of sheet metal layer 205 in the direction across the thickness of the enclosure component 155. Rather, it is preferred that the seams between adjacent foam panels 214 be offset a distance from the seams in the joined metal sheets 206 of sheet metal layer 205. For example, for foam panels 214 vertically positioned side-by-side and joined metal sheets 206 vertically positioned side-by-side, the seams between adjacent foam panels can be positioned at or as near the mid-line (the middle dividing line) of joined metal sheets 206 as design, manufacturing and other considerations permit.

In this third embodiment, the metal sheets 206 of sheet metal layer 205 can be made of steel, optionally given a protective and/or decorative surface treatment, each having for example a thickness in the range of approximately 26 to 20 gauge (0.0179 inch (0.454 mm) to 0.0478 inch (1.214 mm)). Use of sheet metal layer 205 provides increased tensile strength as compared for example to a second structural layer 215 comprising structural building panels 216, particularly magnesium oxide boards. At the same time, the laminate multi-layer design shown in FIG. 4C exhibits substantial compressive strength in the region of a first structural layer 210 comprising structural building panels 211, particularly magnesium oxide boards.

Figure 4D:
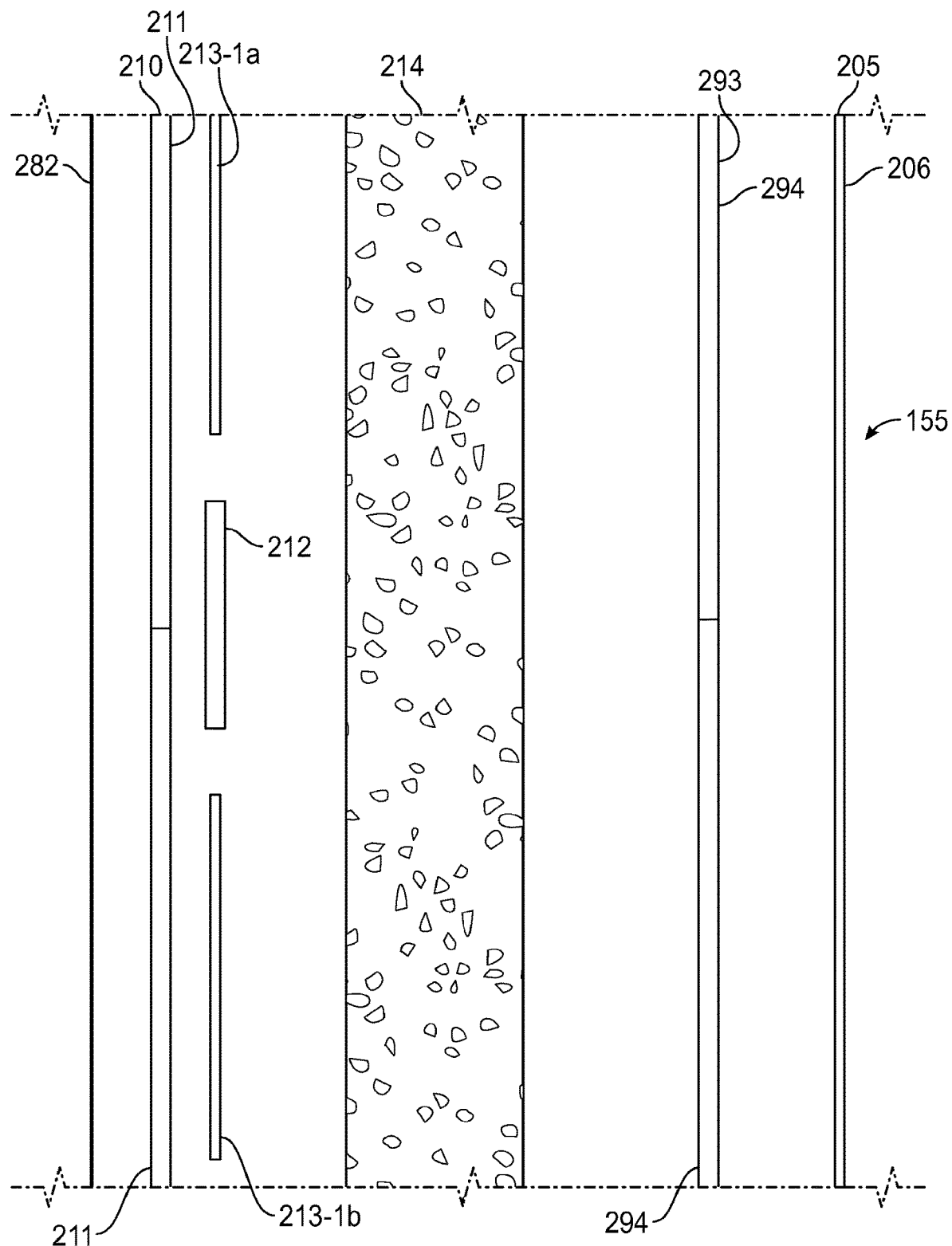

A fourth embodiment of the laminate multi-layer design is shown in FIG. 4D. As compared to the third embodiment shown in FIG. 4C, the fourth embodiment of FIG. 4D includes a protective layer 293 interposed between foam panels 214 and sheet metal layer 205, but is otherwise identical in design to the third embodiment shown in FIG. 4C. Protective layer 293 comprises a plurality of generally rectangular protective panels 294 arranged adjacent to each other to generally cover the full area of the intended enclosure component 155. The protective panels 294 of protective layer 293 can principally comprise a fire-resistant inorganic composition, such as magnesium oxide (MgO) or calcium sulfate dihydrate (also known as drywall and marketed for example under the trademark Sheetrock®). Suitable protective panels 294 for protective layer 293 can be magnesium oxide boards approximately four feet (1.22 m) wide by approximately eight feet (2.44 m) long.

The protective building panels 294 of protective layer 293 are bonded to both foam panels 214 and sheet metal layer 205 with a suitable adhesive spread applied between protective layer 293 and the second opposing face of foam panels 214, and between protective layer 293 and sheet metal layer 205. A suitable thickness for protective building panels 294 of protective layer 293, using magnesium oxide boards, can be 0.125 inch (3.18 mm). A principal function of protective layer 293 in the fourth embodiment of the laminated multi-layer construction shown in FIG. 4D is to impart fire resistance.

Enclosure Component Exterior Edge Reinforcement

The exterior edges defining the perimeter of each enclosure component 155 can be provided with edge reinforcement, as desired. Exterior edge reinforcement can protect foam panel material that would otherwise be exposed at the exterior edges of enclosure components 155. Exterior edge reinforcement can also serve other functions, as described below. Exterior edge reinforcement can be fabricated from one or more of laminated strand lumber board, wooden board, C-channel extruded aluminum or steel, or the like, and is generally secured to the exterior edges of enclosure component 155 with fasteners, such as screw or nail fasteners, and/or adhesive.

Enclosure Component Partitioning

Enclosure components 155 in certain instances are partitioned into enclosure component portions to facilitate forming a compact shipping module 100. In those instances where an enclosure component 155 is partitioned into enclosure component portions, any exterior edge reinforcement on the exterior edges defining the perimeter of the enclosure component is segmented as necessary between or among the portions.

Enclosure Component Interior Edge Reinforcement

An enclosure component 155 partitioned into enclosure component portions will have interior edges. There will be two adjacent interior edges for each adjacent pair of enclosure component portions. Such interior edges can be provided with interior edge reinforcement. Similar to exterior edge reinforcement, such interior edge reinforcement can protect foam panel material that would otherwise be exposed at the interior edges of enclosure components 155. Interior edge reinforcement can also serve other functions, as described below. Interior edge reinforcement can be fabricated from one or more of laminated strand lumber board, wooden board, C-channel extruded aluminum or steel, or the like, and is generally secured to the interior edges of enclosure component 155 with fasteners, such as screw or nail fasteners, and/or adhesive.

Further design details for finished structure 150, wall component 200, floor component 300, and ceiling component 400 are provided in the sections following.

Wall Component (200)

Typically, a finished structure 150 will utilize four wall components 200, with each wall component 200 corresponding to an entire wall of structure 150. Wall component 200 has a generally rectangular perimeter. The height and length of wall components 200 can vary in accordance with design preference, subject to the dimensional restrictions applicable to transport, described above. In this disclosure, where structure 150 is fashioned with two opposing sides longer than the other two sides (as is the case with type 1 structure 151), the two wall components 200 positioned along first and second longitudinal edges 106 and 116 are sometimes referred to as long wall components, with each being denominated 200a, and the two wall components 200 positioned along first and second transverse edges 108 and 110 are sometimes referred to as short wall components, with each being denominated 200b. Where structure 150 is fashioned with all sides of approximately equal length (as is the case with type 2 structure 152), the four wall components 200 are sometimes each denominated 200s. The basic structure and design of wall component 200 is the same for both type 1 structure 151 and type 2 structure 152, and are applicable to structures 150 generally.

Figure 2A:
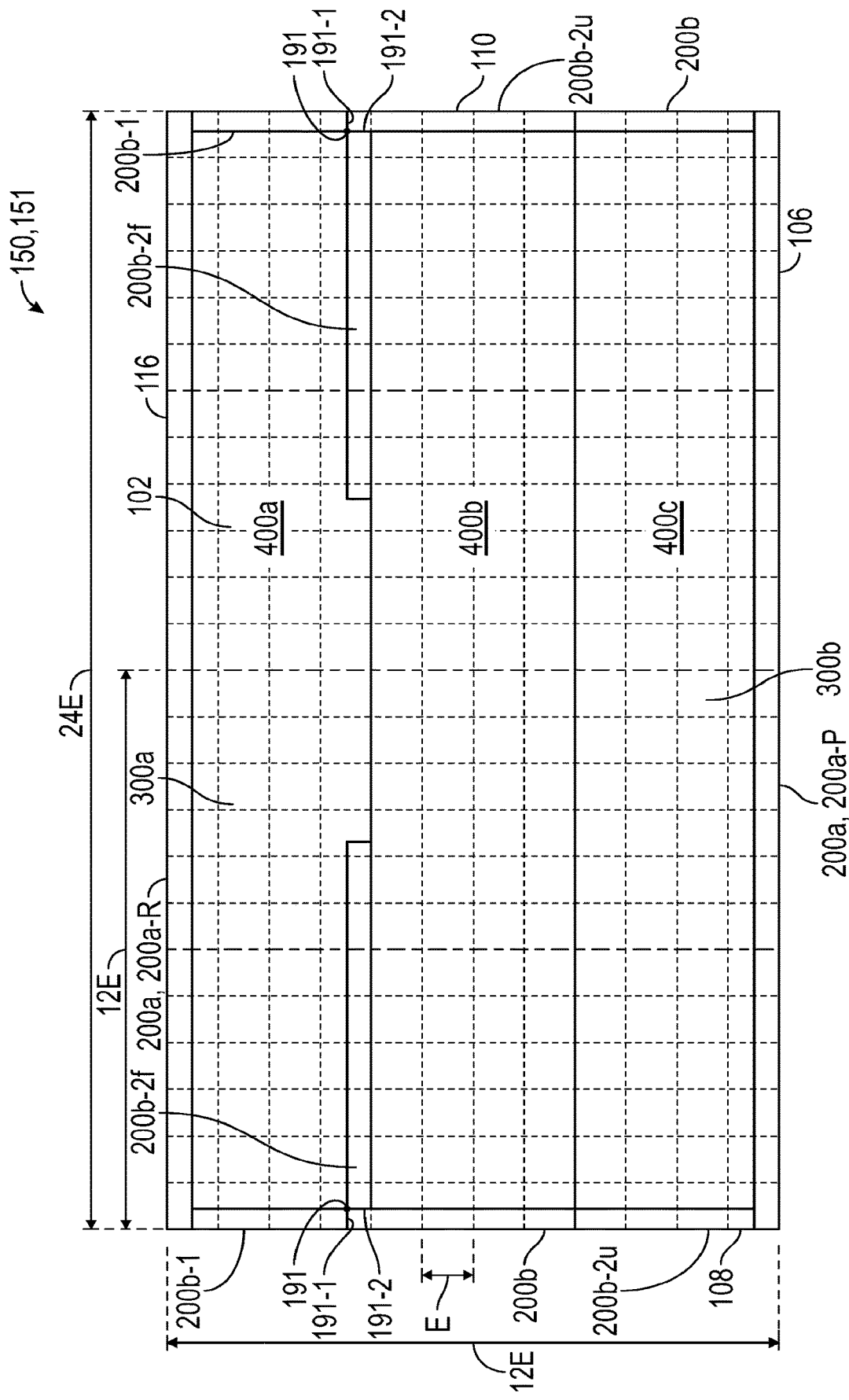
FIGS. 2A and 2B are top schematic views of finished structures prepared in accordance with the present inventions.

In a particular embodiment of the type 1 structure 151 depicted in FIGS. 1A and 2A, long wall component 200a is approximately thirty-nine feet (11.89 m) in length, and short wall component 200b is approximately 19.5 feet (5.94 m) in length; thus long wall components 200a positioned along first and second longitudinal edges 106 and 116 are approximately twice the length of short wall components 200b positioned along first and second transverse edges 108 and 110. Long wall components 200a and short wall components 200b are approximately 9.5 feet (2.9 m) in height and approximately six inches (15.24 cm) in thickness.

Figure 2B:
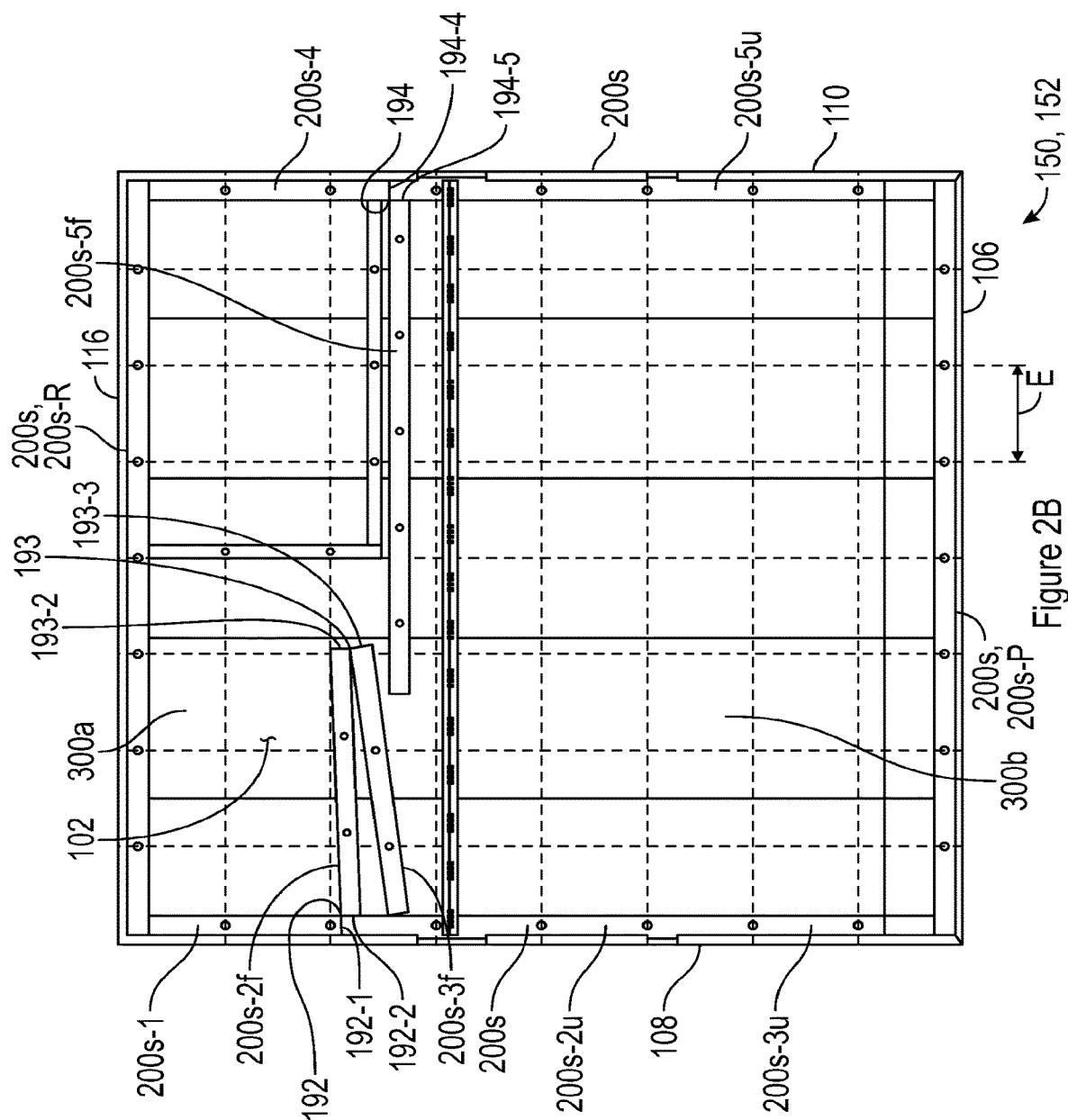

As indicated above, the type 2 structure 152 shown in FIGS. 1B and 2B has wall components 200, 200s of equal length (each denominated 200s)—i.e., type 2 structure 152 generally has a square shape. Thus in the case of type 2 structure 152, the first and second longitudinal edges 106 and 116, and the first and second transverse edges 108 and 110, are all of equal length. In a particular embodiment of the type 2 structure 152 shown in FIGS. 1B and 2B, wall components 200, 200s can be approximately 19 feet (5.79 m) in length, approximately 9.45 feet (2.88 m) in height and approximately six inches (15.24 cm) in thickness.

As indicated above, wall components 200 of the present inventions preferably utilize one of the laminate multi-layer designs described above in reference to FIGS. 4A-4D. For example, long wall component 200a, shown in FIGS. 5A and 5B, can utilize the second embodiment of the laminate multi-layer designs described with reference to FIG. 4B. The particular embodiment of wall component 200s of the type 2 structure 152 shown in FIGS. 1B and 2B referenced above can utilize the second multi-layer design (FIG. 4B) with 0.25 inch (0.635 cm) thick MgO board for structural building panels 211 of first structural layer 210 and also for structural building panels 216 of second structural layer 211, with binding strips 211, 217 of 0.25 inch (0.635 cm) thick MgO board six inches (15.24 cm) wide. The foam panels 214 can be 5.5 inches (13.97 cm) thick, yielding a wall component 200 approximately six inches (15.24 cm) thick.

The perimeter of each wall component 200 is generally provided with exterior edge reinforcement. As exemplified by long wall component 200a shown in FIG. 5A, the exterior edge reinforcement for wall component 200 is a floor plate 220 along the bottom horizontal edge, a ceiling plate 240 along the top horizontal edge and two end pieces 270 respectively fastened at each vertical edge 275 of wall component 200. In the case of a wall component 200, exterior edge reinforcement provides regions for fastening like regions of abutting wall components 200, ceiling component 400 and floor component 300, in addition to in addition to protecting the exterior edges of foam panel material.

The exterior edge reinforcement for wall component 200 provided by floor plate 220, ceiling plate 240, and end pieces 270 can be fabricated from one or more of laminated strand lumber board, wooden board, C-channel extruded aluminum or steel, or the like. Alternatively, the enclosure component perimeter structures described below can be employed in addition to or in substitution for exterior edge reinforcement of the type just described for wall component 200.

Wall Partitioning

Partitioned Wall Portions of Type 1 Structure (151). Referring to FIG. 2A, the two short wall components 200b of type 1 structure 151 each comprises first wall portion 200b-1 and second wall portion 200b-2. Each of wall portions 200b-1 and 200b-2 is a generally rectangular planar structure. The interior vertical edge 191-1 of each of wall portions 200b-1 is proximate to a respective interior vertical edge 191-2 of wall portion 200b-2. Interior edge reinforcement can be provided at any one or more of vertical edges 191-1 and 191-2, examples of which include laminated strand lumber board, wooden board, C-channel extruded aluminum or steel.

Referring again to FIG. 2A, the two first wall portions 200b-1 are located at fixed positions, opposite each other on floor portion 300a, proximate first and second transverse edges 108, 110 of finished structure 150. Each first wall portion 200b-1 is joined to a second wall portion 200b-2 with a hinge structure. These hinge structures permit second wall portions 200b-2 to pivot about vertical axes 191 between a folded position and an unfolded position. FIG. 2A depicts second portions 200b-2 both in their unfolded positions, where they are denominated 200b-2u, and in their inwardly folded positions, where they are denominated 200b-2f. When second portions 200b-2 are in their folded positions, they facilitate forming a compact shipping module. When second portions 200b-2 are in their unfolded positions, with first portions 200b-1 they form the short wall components 200b of type 1 structure 151 shown in FIG. 2A.

Partitioned Wall Portions of Type 2 Structure (152). Referring to FIG. 2B, type 2 structure 152 has two opposing wall components 200s, where one of the opposing wall components 200s comprises first wall portion 200s-1, second wall portion 200s-2 and third wall portion 200s-3, and the other of the opposing wall components 200s comprises fourth wall portion 200s-4 and fifth wall portion 200s-5. Each of wall portions 200s-1, 200s-2, 200s-3, 200s-4 and 200s-5 has a generally rectangular planar structure. As shown in FIG. 2B, the interior vertical edge 192-1 of wall portion 200s-1 is proximate to a respective interior vertical edge 192-2 of wall portion 200s-2, and the interior vertical edge 193-2 of wall portion 200s-2 is proximate a respective interior vertical wall edge 193-3 of wall portion 200s-3. Also as shown in FIG. 2B, the interior vertical edge 194-4 of wall portion 200s-4 is proximate to a respective interior vertical edge 194-5 of wall portion 200s-5. Interior edge reinforcement can be provided at any one or more of vertical edges 192-1, 192-2, 193-2, 193-3, 194-4 and 194-5, examples of which include laminated strand lumber board, wooden board, C-channel extruded aluminum or steel.

Referring again to FIG. 2B, first wall portion 200s-1 is fixed in position on floor portion 300a proximate to first transverse edge 108, and fourth wall portion 200s-4 is fixed in position on floor portion 300a, opposite first wall portion 200s-1 and proximate to second transverse edge 110. First wall portion 200s-1 is joined to second wall portion 200s-2 with a hinge structure that permits wall portion 200s-2 to pivot about vertical axis 192 between a folded position and an unfolded position. Further, second wall portion 200s-2 is joined to third wall portion 200s-3 with a hinge structure to permit third wall portion 200s-3 to pivot about vertical axis 193 between a folded position and an unfolded position. For the opposing wall, fourth wall portion 200s-4 is joined to fifth wall portion 200s-5 with a hinge structure that permits first wall portion 200s-5 to pivot about vertical axis 194 between a folded position and an unfolded position. Notably, fifth wall portion 200s-5 is longer than either second wall portion 200s-2 or third wall portion 200s-3.

FIG. 2B depicts second wall portion 200s-2 and third wall portion 200s-3 both in their unfolded positions, where they are denominated by 200s-2u and 200s3-u respectively, and depicts fifth wall portion 200s-5 in its unfolded position, where it is denominated 200s-5u. FIG. 2B also depicts second wall portion 200s-2 and third wall portion 200s-3 both in their inwardly folded positions, where they are denominated by 200s-2f and 200s3-f respectively, and depicts fifth wall portion 200s-5 in its inwardly folded position, where it is denominated 200s-5f. When second wall portion 200s-2, third wall portion 200s-3 and fifth wall portion 200s-5 are in their inwardly folded positions, they facilitate forming a compact shipping module. When second wall portion 200s-2 and third wall portion 200s-3 are in their unfolded positions, with first wall portion 200s-1 they form the wall component 200s proximate first transverse edge 108. When fifth wall portion 200s-5 is in its unfolded position, with fourth wall portion 200s-4 they form the wall component 200s proximate second transverse edge 110.

The hinge structures described above (for securing each first wall portion 200b-1 to its second wall portion 200b-2, first wall portion 200s-1 to second wall portion 200s-2, second wall portion 200s-2 to third wall portion 200s-3, and fourth wall portion 200s-4 to fifth wall portion 200s-5), can be surface mounted or recessed, and of a temporary or permanent nature. The provision of interior edge reinforcement, as described above, can provide a region for securing hinge structures. Suitable hinge structures can be fabricated for example of metal, plastic, leather, ferrous or non-ferrous material. The enclosure component perimeter structures described below which include hinge structures are also suitable for securing together wall portions, such as tongue-and-groove hinged structure 242 shown in FIG. 15. Such enclosure component perimeter structures can be employed in addition to or in lieu of the interior edge reinforcement described above.

Non-Partitioned Wall Components of Type 1 Structure (151). As compared to the two short wall components 200b of type 1 structure 151, which are each partitioned into two portions, the two long wall components 200a shown in FIG. 2A do not comprise plural wall portions, but rather each is a single piece structure. However, one of these long wall components 200a, which is located on floor portion 300b proximate to first longitudinal edge 106, and which is sometimes denominated as (long) wall component 200a-P in this disclosure, is pivotally secured to floor portion 300b to permit wall component 200a-P to pivot about horizontal axis 105 shown in FIG. 3A from a folded position to an unfolded position. Pivotally securing long wall component 200a-P also facilitates forming a compact shipping module 100. The remaining long wall component 200a, sometimes denominated 200a-R in this disclosure, is rigidly secured on floor portion 300a proximate second longitudinal edge 116 and abutting the vertical edges of the two first wall portions 200b-1 proximate second longitudinal edge 116, as shown in FIG. 2A.

Non-Partitioned Wall Components of Type 2 Structure (152). As compared to the two wall components 200s of type 2 structure 152, which are each partitioned into portions, the remaining two wall components 200s shown in FIG. 2B do not comprise plural wall portions, but rather are single piece structures. However, one of these wall components 200s, which is sometimes denominated 200s-P in this disclosure, and which is located on floor portion 300b proximate first longitudinal edge 106, is pivotally secured to floor portion 300b to permit wall component 200s-P to pivot about horizontal axis 105 shown in FIG. 3B from a folded position to an unfolded position. Pivotally securing wall component 200s-P also facilitates forming a compact shipping module 100. The remaining wall component 200s, sometimes denominated 200s-R in this disclosure, is rigidly secured on floor portion 300a proximate second longitudinal edge 116 and abutting the vertical edges of first wall portion 200s-1 and fourth wall portion 200s-4 proximate to second longitudinal edge 116, as shown in FIG. 2B.

The hinge structures described above, for securing wall component 200a-P to floor portion 300b, and for securing wall component 200s-P to floor portion 300b, can be surface mounted or recessed, and of a temporary or permanent nature. The provision of exterior edge reinforcement, as described above, can provide a region for securing hinge structures. Suitable hinge structures can be fabricated for example of metal, plastic, leather, ferrous or non-ferrous material. Alternatively, the enclosure component perimeter structures described below which include hinge structures are also suitable for securing the foregoing wall components to their respective floor portions 300b (altered as may be appropriate, given the 90 degree (90°) junction between floor component 300b and wall component 200a-P/200s-P when either of the latter is in an unfolded position). Such enclosure component perimeter structures can be employed either in addition to or in lieu of the exterior edge reinforcement described above.

Wall Chases. Where wall component 200 utilizes one of the multi-laminate designs described with respect to FIGS. 4A-4C, the foam panels 214 can be provided with a series of elongate, generally parallel, approximately vertically-oriented cylindrical passageways, spaced apart at regular intervals across the entire distance between end pieces 270, with each spanning the distance between floor plate 220 and ceiling plate 240. These vertical passageways are denominated wall chases 219 and can be seen in FIG. 6A in wall components 200a, 200b for a type 1 structure 151, and in FIG. 7A for a wall component 200s for a type 2 structure 152. Wall chases 219 facilitate the installation of utility lines (such as for electrical power, lighting control, heating, ventilation, and air conditioning (HVAC), HVAC control, security systems, including energizing and communicating with smoke or heat sensors, etc.), in wall component 200. Further details concerning these wall chases are described in U.S. Nonprovisional patent application Ser. No. 16/786,130 entitled "Foldable Building Structures with Utility Channels and Laminate Enclosures," having the same inventors and filed on the same date as the subject application. The contents of that U.S. Nonprovisional patent application Ser. No. 16/786,130 entitled "Foldable Building Structures with Utility Channels and Laminate Enclosures," having the same inventors and filed on the same date as the subject application, are incorporated by reference as if fully set forth herein, particularly the details relating to wall chases, and especially those found at paragraphs 0077-0081 and in FIGS. 5A-5C, 6A and 7A. In the event that communication is desired between wall chases 219 and the regions above ceiling plate 240 and/or floor plate 220, and the wall component 200 is provided with enclosure component perimeter structures, as described below, either bonded to or in place of either or both of floor plate 220 and ceiling plate 240, then those enclosure component perimeter structures can be provided with suitable apertures at appropriate locations to permit communication to the wall chases 219.

Wall Customization Options. FIGS. 1A and 2A depicts wall components 200 having plural apertures, specifically door apertures 202, for receiving door frame and door assemblies, and window apertures 204, for receiving window frame and window assemblies. The multi-laminate construction of wall component 200 lends itself to a high degree of customization in terms of type, size and location of doors, windows and the like, while the number of apertures 202, 204 can be varied in accordance with design preference. Further details concerning customization of wall component 200 are described in U.S. Nonprovisional patent application Ser. No. 16/786,130 entitled "Foldable Building Structures with Utility Channels and Laminate Enclosures," having the same inventors and filed on the same date as the subject application. The contents of that U.S. Nonprovisional patent application Ser. No. 16/786,130 entitled "Foldable Building Structures with Utility Channels and Laminate Enclosures," having the same inventors and filed on the same date as the subject application, are incorporated by reference as if fully set forth herein, particularly the details relating to wall customization, found for example at paragraphs 0082-0084 and in FIGS. 1A and 2A thereof.

Ceiling Component (400)

Figure 6A:
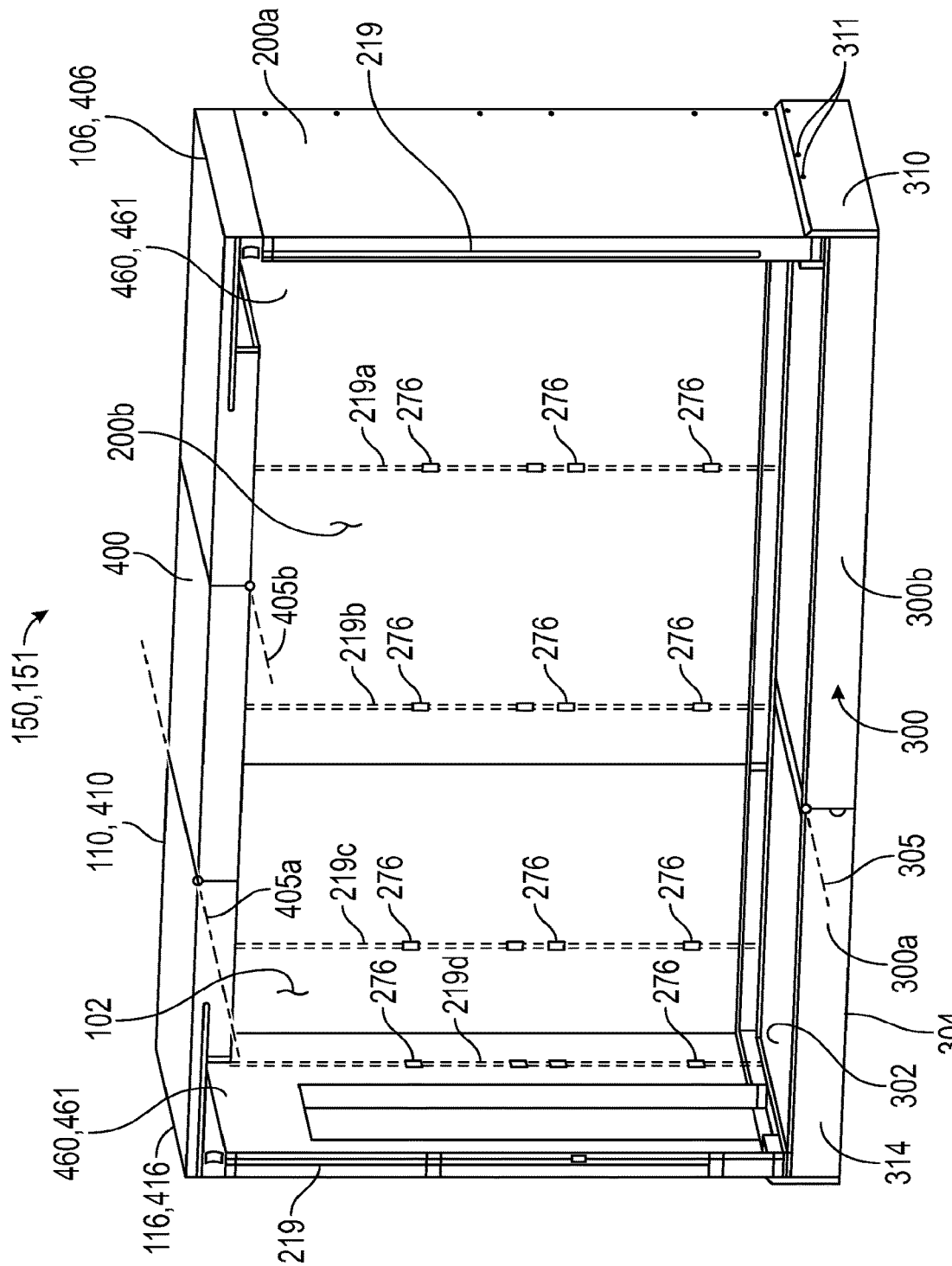
FIGS. 6A and 6B are partial cutaway perspective views of a finished structure in accordance with the present inventions, depicting in greater detail aspects of the ceiling, wall and floor components of a first type of structure in accordance with the present inventions.
Figure 6B:
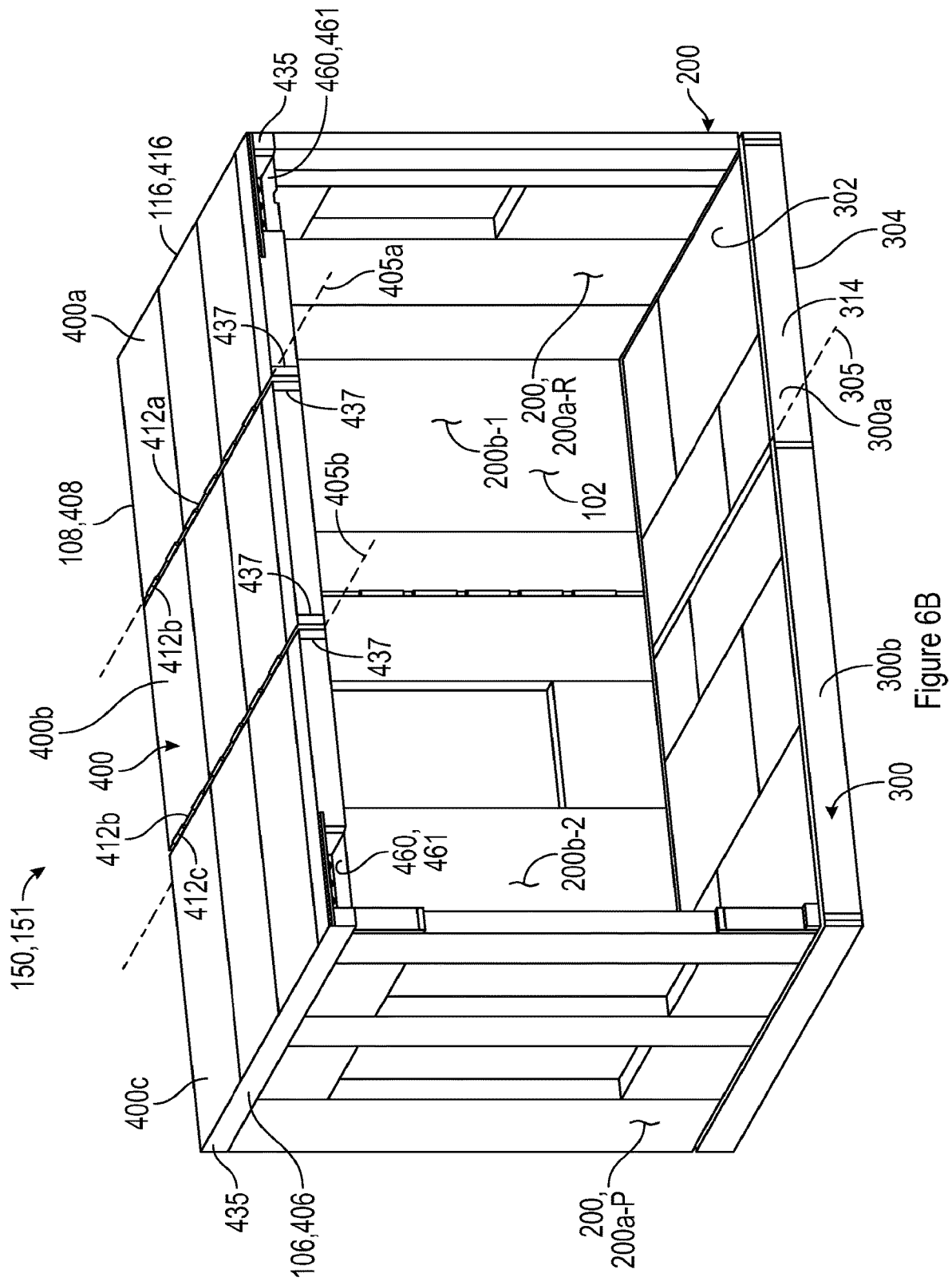
Figure 7A:
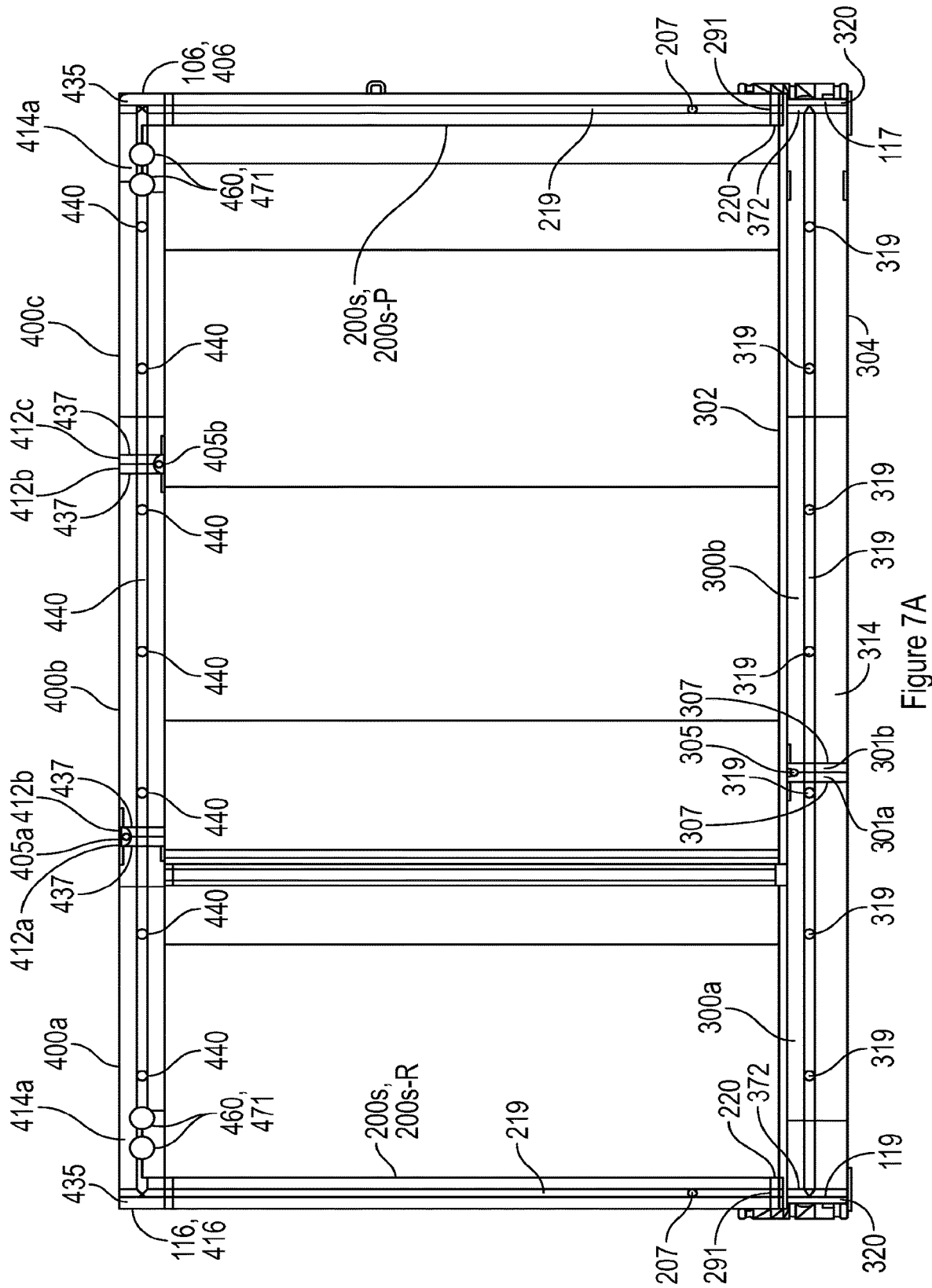
FIGS. 7A and 7B are partial cutaway views of a finished structure in accordance with the present inventions, depicting in greater detail aspects of the ceiling, wall and floor components of a second type of structure in accordance with the present inventions.
Figure 7B:
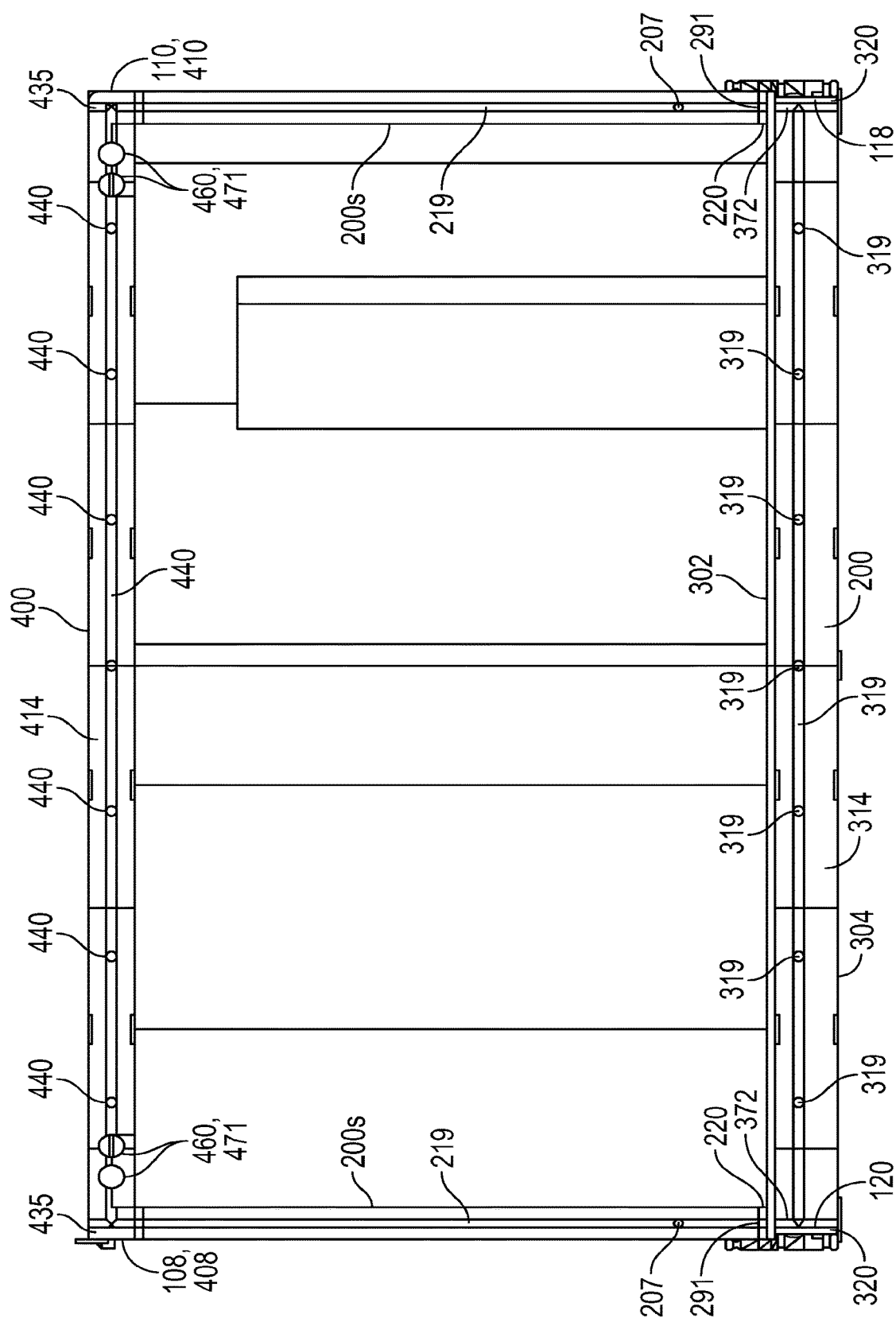

Typically, a finished structure 150 will utilize one ceiling component 400; thus ceiling component 400 generally is the full ceiling of finished structure 150. Ceiling component 400 has a generally rectangular perimeter. Among others, FIGS. 6A-7B depict ceiling component 400 in accordance with the present inventions. The perimeter of ceiling component 400 is defined by first longitudinal ceiling edge 406, first transverse ceiling edge 408, second longitudinal ceiling edge 416 and second transverse ceiling edge 410. In particular, (a) first longitudinal ceiling edge 406, (b) first transverse ceiling edge 408, (c) second longitudinal ceiling edge 416 and (d) second transverse ceiling edge 410 of ceiling component 400 generally coincide with (i.e., overlie) (w) first longitudinal edge 106, (x) first transverse edge 108, (y) second longitudinal edge 116 and (z) second transverse edge 110, respectively, of finished structure 150. FIGS. 6A and 6B depict the ceiling component 400 of a type 1 structure 151, and FIGS. 7A and 7B depict the ceiling component 400 of a type 2 structure 152. The basic structure and design of ceiling component 400 is the same for both type 1 structure 151 and type 2 structure 152, and are applicable to structures 150 generally, and is generally applicable to ceiling components 400 of structures 150 fabricated in accordance with this disclosure.

The length and width of ceiling component 400 can vary in accordance with design preference. In a particular embodiment of the type 1 structure 151 depicted in FIGS. 1A and 2A, ceiling component 400 (the dimension along first and second longitudinal edges 106, 116) is approximately thirty-nine feet (11.89 m) in length (the dimension along first and second longitudinal ceiling edges 406, 416) and approximately 19.5 feet (5.94 m) in width (the dimension along first and second transverse ceiling edges 408, 410). In a particular embodiment of the type 2 structure 152 depicted in FIGS. 1B and 2B, ceiling component 400 is approximately 19 feet (5.79 m) square.

It is preferred that ceiling component 400 utilize one of the multi-laminate designs described above in regard to FIGS. 4A-4D, as described below.

The perimeter of ceiling component 400 is generally provided with exterior edge reinforcement. As exterior edge reinforcement for the embodiments of ceiling component 400 shown for a type 1 structure 151 in FIG. 6B and for a type 2 structure 152 in FIG. 7A, a first shoulder beam 435 is positioned at the first longitudinal ceiling edge 406 of ceiling component 400, a second shoulder beam 435 (visible edge-on in FIG. 7B) is positioned at the second transverse ceiling edge 408 of ceiling component 400, a third shoulder beam 435 (visible edge-on in FIG. 7B) is positioned at the first transverse exterior ceiling edge 410 of ceiling component 400, and a fourth shoulder beam 435 is positioned at the second longitudinal ceiling edge 416 of ceiling component 400 (see FIG. 6B). In the case floor component 400, in addition to protecting the exterior edges of foam panel material, the exterior edge reinforcement provided by shoulder beams 435 assists in resisting vertical loads and transferring such loads to lower floors through underlying wall components 200 supporting ceiling component 400, and then to the foundation of the finished structure 150. Such exterior edge reinforcement can also provide a region for fastening like regions of abutting enclosure components 155 (underlying and any overlying).

The exterior edge reinforcement provided by shoulder beams 435 of ceiling component 400 can be fabricated from one or more of laminated strand lumber board, wooden board, C-channel extruded aluminum or steel, or the like. Alternatively, the enclosure component perimeter structures described below can be employed in addition to or in substitution for exterior edge reinforcement as just described for ceiling component 400.

Ceiling Partitioning

The type 1 structure 151 and the type 2 structure 152 each includes ceiling portions 400a, 400b and 400c. Each of the ceiling portions 400a, 400b and 400c is a planar generally rectangular structure, with ceiling portion 400a adjoining ceiling portion 400b, and ceiling portion 400b adjoining ceiling portion 400c as exemplified by FIGS. 6A and 6B.

Ceiling Portion 400c. Ceiling portion 400c is generally exemplary of the construction of all ceiling portions 400a, 400b and 400c. Referring to the segment of ceiling portion 400c depicted in FIG. 6C, ceiling portion 400c utilizes a laminated multi-layer design according to the first embodiment thereof (depicted in FIG. 4A) or the second embodiment thereof (depicted in FIG. 4B). As relevant here, ceiling portion 400c includes a first structural layer 210 of structural building panels 211, denominated ceiling bottom surface 404, and a second structural layer 215 of structural building panels 216, denominated ceiling top surface 402. Between ceiling surfaces 402 and 404 there are foam panels 214, denominated ceiling foam panels 414. Interior edge 412c of ceiling component 400c abuts a first interior edge 412b of ceiling component 400b, as shown in FIGS. 6B and 7A. For interior edge reinforcement, a reinforcing board 437 is positioned adjacent interior edge 412c.

Ceiling Portion 400a. Ceiling portion 400a is shown for example in FIGS. 6B and 7A. It is a mirror image in design and construction of ceiling portion 400c. Interior edge 412a of ceiling portion 400a abuts a second interior edge 412b of ceiling portion 400b, as shown in FIGS. 6B and 7A. For interior edge reinforcement, a reinforcing board 437 is positioned adjacent interior edge 412a.

Ceiling Portion 400b. Ceiling portion 400b shown in FIGS. 6B and 7A is the same in general design and construction as ceiling portions 400a and 400c. First interior edge 412b of ceiling component 400b abuts interior edge 412c of ceiling component 400c, and second interior edge 412b of ceiling component 400b abuts interior edge 412a of ceiling portion 400a. For interior edge reinforcement, a reinforcing board 437 is positioned adjacent first interior edge 412b of ceiling portion 400b, and a reinforcing board 437 is positioned adjacent second interior edge 412b of ceiling portion 400b.

Ceiling component 400 and its constituent elements are generally dimensioned in thickness and otherwise to accommodate the particular loads to which ceiling component 400 may be subject. A particular embodiment of ceiling component 400 in the type 2 structure 152 shown for example in FIGS. 7A and 7B can utilize the second multi-layer design embodiment (see FIG. 4B) with 0.25 inch (0.635 cm) thick MgO board for structural building panels 211 of first structural layer 210/ceiling bottom surface 404 and also for structural building panels 216 of second structural layer 211/ceiling top surface 402, and with binding strips of 0.25 inch (0.635 cm) thick MgO board six inches (15.24 cm) wide. The foam panels 214/ceiling foam panels 414 can be 7.9 inches (20.07 cm) thick, yielding a roof component 400 approximately 8.4 inches (21.34 cm) thick. Additional structural members, such as joists, can be utilized as is appropriate to the specific design of structure 150 to assist in the transfer of vertical loads to one or more shoulder beams 435.

Referring to the type 1 structure 151 shown in FIG. 6B, ceiling portion 400a is fixed in position relative to first portions 200b-1 of short wall components 200b and relative to long wall component 200a-R, and is joined with hinge structures along longitudinal interior edge 412a to the abutting longitudinal interior edge 412b of ceiling portion 400b. Such hinge structures are adapted to permit ceiling portion 400b to pivot through up to one hundred and eighty degrees (180°) of arc about a horizontal axis 405a, located proximate the top of ceiling component 400, between a folded position, where ceiling portion 400b lies flat against ceiling portion 400a, and the fully unfolded position shown in FIG. 6B.

In turn, ceiling portion 400b is joined with hinge structures to ceiling portion 400c at the longitudinal interior edge 412b of ceiling portion 400b abutting the longitudinal interior edge 412c of ceiling portion 400c. Such hinge structures are adapted to permit ceiling portion 400c to pivot through up to one hundred and eighty degrees (180°) of arc about a horizontal axis, located proximate the bottom of ceiling component 400, between a folded position, where ceiling portion 400c lies flat against ceiling portion 400b (when ceiling portion 400b is positioned to lie flat against ceiling portion 400a), and the fully unfolded position shown in FIG. 6B.

Likewise referring to the type 2 structure 152 shown in FIG. 7A, ceiling portion 400a is fixed in position relative to first wall portion 200s-1, fourth wall portion 200s-4 and wall component 200s-R. Ceiling portions 400a, 400b and 400c for type 2 structure 152 are joined with hinge structures in the same manner as described above in connection with type 1 structure 151.

The hinge structures joining ceiling portions 400a, 400b and 400c can be surface mounted or recessed, and of a temporary or permanent nature. Suitable hinge structures can be fabricated for example of metal, plastic, leather, ferrous or non-ferrous material. The interior edge reinforcement provided by reinforcing boards 437 of ceiling portions 400a, 400b and 400c provides structure for mounting hinge structures, in addition to protecting the edges of foam panel material. Reinforcing boards 437 can be fabricated for example from one or more of laminated strand lumber board, wooden board, C-channel extruded aluminum or steel, or the like.

Figure 9:
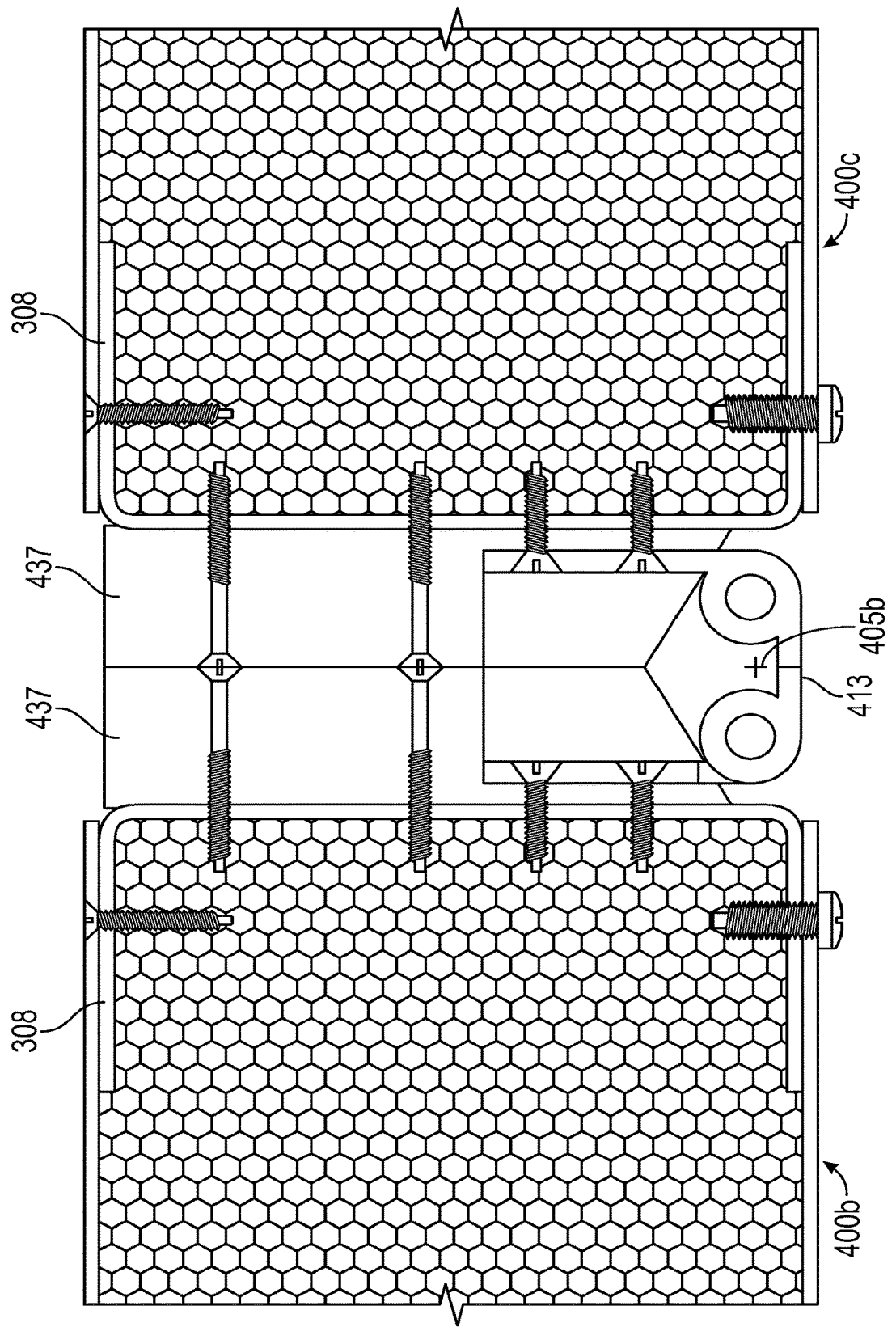
FIG. 9 is a schematic side view of an embodiment of a hinge structure joining two roof portions in accordance with the present inventions.

A suitable hinge structure and its associated members is shown in FIG. 9, which depicts an exemplary hinge structure joining ceiling portions 400b and 400c. In particular, a plurality of double hinges 413 are arranged in line along horizontal axis 405b. Double hinges are preferred to permit the hinges to be recessed below the surface, while retaining the ability to pivot through up to one hundred eighty degrees (180°) of arc, without causing interference crimping between adjacent ceiling portions. These double hinges can be fabricated by positioning together in an abutting relationship two single hinges, each along one of their respective leaves, and welding them to fashion one double hinge 413.

As shown in FIG. 9, each of the free leaves of double hinge 413 are respectively secured to a reinforcing board 437. Each reinforcing board 437 is positioned against the exterior of the web of a C-channel track 308 (fabricated from cold formed steel), each of which in turn is secured to the respective abutting edges of roof portions 400b and 400c, as shown in FIG. 9. The same hinge structure can be utilized to secure together ceiling portions 400a and 400b, although rotated 180 degrees and displaced to be arranged in line along horizontal axis 405a, so as to permit the ceiling portions 400b and 400c to fold in an accordion pattern, as shown in FIGS. 3A and 3B The enclosure component perimeter structures described below which include hinge structures provide further alternatives to the hinge structure depicted in FIG. 7B, particularly the second hinged I-beam structure 268 depicted in FIGS. 14A-14F. Such enclosure component perimeter structures can be employed in addition to or in substitution for the interior edge reinforcement provided by reinforcing boards 437 of ceiling portions 400a, 400b and 400c.

Utility Service System and Ceiling Chases. Ceiling component 400 can be provided with a utility service system 460, which is one or more recessed passageways of closed loop form, located about the entirety of the periphery of ceiling component 400 proximate to the shoulder beams 435 included in those ceiling portions 400a, 400b and 400c, to facilitate routing of utility lines (such as for electrical power, lighting control, HVAC, HVAC control, security systems, including energizing and communicating with smoke or heat sensors, etc.). FIGS. 6A and 6B show one embodiment of utility service system 460 (denominated 461 in those figures), and FIGS. 7A and 7B show another embodiment of utility service system 460 (denominated 462 in those figures). For the same purpose, ceiling component 400 can also be provided with ceiling chases 440, which are a plurality of elongate spaced-apart cylindrical passages in ceiling portions 400a, 400b and 400c. The utility service system 460 is adapted to communicate with both the ceiling chases 440 and wall chases 219. Further details concerning utility service system 460 and ceiling chases 440 for ceiling component 400 are described in U.S. Nonprovisional patent application Ser. No. 16/786,130 entitled "Foldable Building Structures with Utility Channels and Laminate Enclosures," having the same inventors and filed on the same date as the subject application. The contents of that U.S. Nonprovisional patent application Ser. No. 16/786,130 entitled "Foldable Building Structures with Utility Channels and Laminate Enclosures," having the same inventors and filed on the same date as the subject application, are incorporated by reference as if fully set forth herein, particularly the details relating to utility service system 460 and wall chases 440, found for example at paragraphs 0102-0120 and in FIGS. 6A-7E thereof.

Floor Component (300)

Typically, a finished structure 150 will utilize one floor component 300; thus floor component 300 generally is the full floor of finished structure 150. Floor component 300 has a generally rectangular perimeter. FIGS. 6A-6B and 7A-7B depict floor component 300 in accordance with the present inventions. The perimeter of floor component 300 is defined by first longitudinal floor edge 117, first transverse floor edge 120, second longitudinal floor edge 119 and second transverse floor edge 118. In particular, (a) first longitudinal floor edge 117, (b) first transverse floor edge 120, (c) second longitudinal floor edge 119 and (d) second transverse floor edge 118 generally coincide with (i.e., underlie) (w) first longitudinal edge 106, (x) first transverse edge 108, (y) second longitudinal edge 116 and (z) second transverse edge 110, respectively, of finished structure 150. FIGS. 6A and 6B depict the floor component 300 for a type 1 structure 151, and FIGS. 7A and 7B depict the floor component 300 for a type 2 structure 152. The basic structure of floor component 300 is the same for both type 1 structure 151 and type 2 structure 152, and is generally applicable to floor components 300 of structures 150 fabricated in accordance with this disclosure.

The length and width of floor component 300 can vary in accordance with design preference. In the particular embodiment of the type 1 structure 151 depicted in FIGS. 1A and 2A, where wall components 200a, 200b are vertically oriented, the length and width of ceiling component 400 approximates the length and width of ceiling component 400 for that type 1 structure. Likewise in the particular embodiment of the type 2 structure 152 depicted in FIGS. 1B and 2B, where wall components 200s are vertically oriented, the length and width of ceiling component 400 approximates the length and width of ceiling component 400 for that type 2 structure.

It is preferred that floor component 300 utilize one of the multi-laminate designs described above in regard to FIGS. 4A-4D, as described below.

The perimeter of each floor component 300 is generally provided with exterior edge reinforcement. As exterior edge reinforcement for the embodiments of floor component 300 shown in FIGS. 7A and 7B, a first footing beam 320 (visible edge-on in FIG. 7A) is positioned at the first longitudinal floor edge 117 of floor component 300, a second footing beam 320 (visible edge-on in FIG. 7B) is positioned at the second transverse floor edge 118 of floor component 300, a third footing beam 320 (visible edge-on in FIG. 7B) is positioned at the first transverse floor edge 120 of floor component 300, and a fourth footing beam 320 is positioned at the second longitudinal floor edge 119 of floor component 300 (visible edge-on in FIG. 7A). In the case floor component 300, the edge reinforcement provided by footing beams 320 assists in resisting vertical loads and transferring such loads to any ceiling component 400 thereunder and then to underlying wall components 200, and/or to the foundation of the finished structure 150, in addition to protecting the edges of foam panel material.

The exterior edge reinforcement provided by footing beams 420 of floor component 300 can be fabricated from one or more of laminated strand lumber board, wooden board, C-channel extruded aluminum or steel or the like. Alternatively, enclosure component perimeter structures described below can be employed in addition to or in substitution for exterior edge reinforcement of the type just described for floor component 300.

Floor Partitioning

The floor component 300 in type 1 structure 151 and in type 2 structure 152 comprises floor portion 300a and floor portion 300b. Each of the floor portions 300a and 300b is a planar generally rectangular structure, with floor portion 300a adjoining floor portion 300b, as exemplified by FIGS. 6A, 6B and 7A.

Floor Portion 300a. Floor portion 300a, shown in FIGS. 6A, 6B and 7A, is generally exemplary of the construction of floor portions 300a and 300b, and as depicted generally utilizes a laminate multi-layer design in accordance with the first or second embodiment thereof respectively illustrated in FIGS. 4A and 4B. As relevant here, floor portion 300a includes a first structural layer 210 of structural building panels 211, denominated floor bottom surface 304 and a second structural layer 215 of structural building panels 216, denominated floor top surface 302. Between floor surfaces 302 and 304 there are foam panels 214, denominated floor foam panels 314. Interior edge 301a of floor portion 300a abuts interior edge 301b of floor portion 300b, as shown in FIG. 9A. As interior edge reinforcement, a reinforcing board 307 is positioned adjacent interior edge 301a.

Floor Portion 300b. Floor portion 300b is shown for example in FIGS. 6A, 6B and 7A. It is the same in general design and construction as floor portion 300a. Interior edge 301b of floor portion 300b abuts interior edge 301a of floor portion 300a, as shown in FIG. 7A. As interior edge reinforcement, a reinforcing board 307 is positioned adjacent interior edge 301b.

Floor component 300 and its constituent elements generally dimensioned in thickness and otherwise to accommodate the particular loads to which floor component 300 may be subject. A particular embodiment of floor component 300 for the type 2 structure 152 shown for example in FIGS. 7A and 7B can utilize the second multi-layer design embodiment (see FIG. 4B) with 0.25 inch (0.635 cm) thick MgO board for structural building panels 211 of first structural layer 210/floor bottom surface 304, and 0.5 inch (1.27 cm) thick MgO board for structural building panels 216 of second structural layer 211/floor top surface 302. Correspondingly in this particular embodiment, binding strips of 0.25 inch (0.635 cm) thick MgO board six inches (15.24 cm) wide are used to join together the structural building panels 211 of first structural layer 210/floor bottom surface 304, and binding strips of 0.5 inch (1.27 cm) thick MgO board six inches (15.24 cm) wide are used to join together the structural building panels 216 of second structural layer 211/floor top surface 302. The foam panels 214/floor foam panels 314 can be 11.25 inches (28.575 cm) thick, yielding a floor component 300 approximately 12 inches (30.48 cm) thick.

The floor portion 300b comprising floor component 300 can be folded to facilitate forming a compact shipping module. The type 1 structure 151 and the type 2 structure 152 each includes such a floor portion.

Referring to the type 1 structure 151 shown in FIG. 6B, floor portion 300a is fixed in position relative to first wall portions 200b-1 of short wall components 200b and relative to long wall component 200a-R, and is joined with hinge structures to floor portion 300b, so as to permit floor portion 300b to pivot through approximately ninety degrees (90°) of arc about a horizontal axis 305, located proximate floor top surface 302, between a folded position, where floor portion 300b is approximately vertically oriented as shown in FIG. 3A, and the fully unfolded position shown in FIGS. 6A and 6B.

Likewise referring to the type 2 structure 152 shown in FIG. 7A, floor portion 300a is fixed in position relative to first wall portion 200s-1, fourth wall portion 200s-4 and wall component 200s-R. Floor portion 300a is joined with hinge structures to floor portion 300b in the same manner as described above in connection with type 1 structure 151.

The hinge structures joining floor portions 300a and 300b can be surface mounted or recessed, and of a temporary or permanent nature. Suitable hinge structures can be fabricated for example of metal, plastic, leather, ferrous or non-ferrous material. An example of a suitable hinge structure and its associated members is shown in FIG. 8. In particular, a plurality of steel hinges 306, for example approximately three inches (7.62 cm) wide by approximately six inches (15.24 cm) long, are arranged in line along horizontal axis 305, as shown edge-on in FIG. 8. Such hinges are commercially available from McMaster-Carr, Douglasville, GA USA. The hinge structures joining floor portions 300a and 300b need not be double hinges, since they need to pivot only through approximately ninety degrees (90°) of arc, and thus the potential for interference crimping is less than in connection with the ceiling portions of ceiling component 400.

As shown in FIG. 8, the opposing leaves of hinges 306 are respectively secured to the interior edge reinforcement, reinforcing board 307, provided at each of interior edges 301a and 301b. Reinforcing boards 307 in FIG. 8 are made of laminated strand lumber. Each reinforcing board 307 is positioned against the exterior of the web of a C-channel track 308 (fabricated from cold formed steel), each of which in turn is secured to the respective abutting edges of floor portions 200a and 200b, as shown in FIG. 8.

The enclosure component perimeter structures described below which include hinge structures provide further alternatives to the hinge structure shown in FIG. 8 for joining floor portions 300a and 300b, particularly the first hinged I-beam structure 258 depicted in FIGS. 13A-13F. Such enclosure component perimeter structures can be utilized in addition to or in place of interior edge reinforcement, as described above.

Baseboard and Perimeter Board. The exterior edges of floor component 300, or portions thereof, such as the exterior edge of floor portion 300b located along first longitudinal edge 106 of finished structure 150, can be provided with a baseboard 310. In the type 1 structure 151 shown for example in FIG. 3A, a baseboard 310 is shown edge-on secured to the exterior edge of floor portion 300b. Where baseboard 310 extends around the perimeter of floor component 300, it is termed perimeter board 312. The type 2 structure 152 shown for example in FIGS. 1B and 3B utilizes a perimeter board 312. It is preferred that the vertical dimension (height) of baseboard 310 (including perimeter board 312) be greater than the thickness of floor component 300.

Floor Chases. Optionally, the floor foam panels 314 in floor component 300 can be provided with floor chases 319, which are a plurality of elongate spaced-apart cylindrical passages in floor portions 300a and 300b, to facilitate routing of utility lines (such as for electrical power, lighting control, HVAC, HVAC control, security systems, including energizing and communicating with smoke or heat sensors, etc.). Such floor chases 319 are adapted to communicate with wall chases 219 (see FIGS. 7A and 7B). Further details concerning floor chases 319 for floor component 300 are described in U.S. Nonprovisional patent application Ser. No. 16/786,130 entitled "Foldable Building Structures with Utility Channels and Laminate Enclosures," having the same inventors and filed on the same date as the subject application. The contents of that U.S. Nonprovisional patent application Ser. No. 16/786,130 entitled "Foldable Building Structures with Utility Channels and Laminate Enclosures," having the same inventors and filed on the same date as the subject application, are incorporated by reference as if fully set forth herein, particularly the details relating to floor chases 319, found for example at paragraphs 0137-0141 and in FIG. 7F thereof.

Enclosure Component Perimeter Structures

The perimeter (exterior edges) of each enclosure component 155 (wall components 200, floor components 300, ceiling components 400), as well as any interior edges of partitioned enclosure components 155, preferably are bound by an enclosure component perimeter structure. The enclosure component perimeter structure to be utilized can vary depending upon the particular circumstances and preferences, as described in more detail below.

Sealing Layer

A sealing gasket strip or layer, made for example from extruded polyvinyl chloride (PVC), can optionally be bonded as desired to select edges of enclosure components 155, such as about the periphery of a wall component 200 to floor plate 220, end pieces 270 and ceiling plate 240. The gasket strip or layer can be coextruded with one or plural sealing beads or ridges located proximate the middle of the strip or layer and oriented along the length of the strip or layer, and having a lower Durometer hardness than the strip or layer material. Such a sealing strip or layer performs a sealing function against water ingress into and environmental exposure of the edge of the enclosure component 155 to which it is secured.

Free-Standing End Cap (221)

Figure 10:
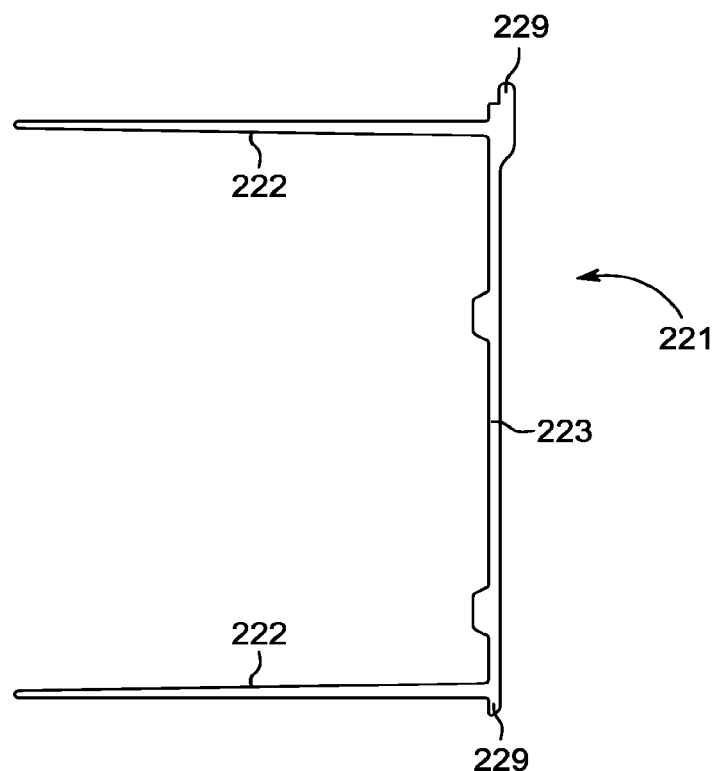
FIG. 10 is a side view of a free-standing end cap in accordance with the present inventions.

Free-standing end cap 221, shown edge-on in profile in FIG. 10, generally has a C-channel shape of a length "L", with L being approximately the length of the edge of the planar enclosure component 155 to which free-standing end cap 221 is to be secured. Free-standing end cap 221 has two spaced-apart elongate flange surfaces 222 joined by an elongate web surface 223 to define the C-channel. The particular profile of the C-channel of free-standing end cap 221 can vary as desired to include such thickness variations, ridges and/or grooves as are appropriate for the intended application.

In the case of securing free-standing end cap 221 to a planar enclosure component 155 comprising two structural layers separated by a filler material, such as foam panels, flange surfaces 222 are spaced apart by a distance approximately equal to the thickness of the foam panels of the planar enclosure component 155 over which free-standing end cap 221 will be positioned and to which it will be secured. Preferably, free-standing end cap 221 is made of a high-impact material, such as polyvinyl chloride (PVC) having a high Durometer hardness extruded and then cut into sections of length L to form free-standing end cap 221.

Free-standing end cap 221 preferably is secured to the desired edge locations of one or more enclosure components 155 in the course of fabricating the enclosure component 155 in a factory or workshop prior to shipment to the building site. For example, where planar enclosure component 155 comprises two structural layers separated by foam panels, a free-standing end cap 221 having a length L approximately equal to the length of the edge in question of enclosure component 155 is positioned over the edge of the foam panels, such that web surface 223 abuts or is closely proximate to the edge of the foam. The two structural layers are then positioned over the foam to overlap a major portion of the flange surfaces 222, with locating ridge 229 positioned on the exterior of each flange surface 222 assisting in proper overlap and alignment of the structural layers. Free-standing end cap 221 can be secured in place for example by adhesive applied between the overlapping regions of free-standing end cap 221 and the enclosure component 155, or by fasteners, such as screw or nail fasteners, spaced apart along the length of one or more of flange surfaces 222 and web surface 223, and driven therethrough into the enclosure component 155, or by utilizing a combination of adhesive and fasteners in any manner as just described, or otherwise. Free-standing end cap 221 performs a sealing function against water ingress into and environmental exposure of the edge of the enclosure component 155 to which it is secured.

Reinforced End Cap (224)

The edge of the planar enclosure component 155 to which free-standing end cap 221 is to be secured can be provided with exterior edge reinforcement fabricated from one or more of laminated strand lumber board, wood, C-channel extruded aluminum or steel, or the like, secured to the exterior edges of the enclosure component 155, as described previously. Alternatively, the edge of the planar enclosure component 155 to which free-standing end cap 221 is to be secured can in appropriate circumstances terminate with a foam panel 214, without provision of such exterior edge reinforcement.

Figure 11:
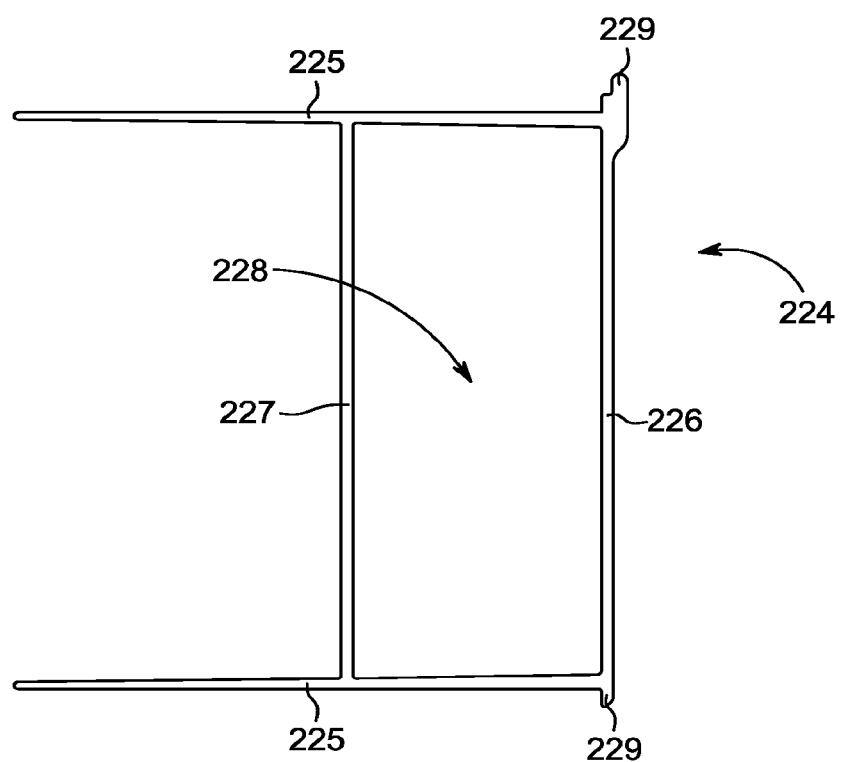
FIG. 11 is a side view of a reinforced end cap in accordance with the present inventions and FIG. 12 is a side view of an abutting end cap in accordance with the present inventions.

As another alternative, it is possible to integrate exterior edge reinforcement into the end cap, thereby combining the sealing and edge reinforcement functions. Referring to FIG. 11, there is shown edge-on in profile a reinforced end cap 224, which is used in lieu of free-standing end cap 221. Reinforced end cap 224 generally has a C-channel shape of a length "L", with L being approximately the length of the edge of the planar enclosure component 155 to which free-standing end cap 221 is to be secured. Reinforced end cap 224 has two spaced-apart elongate flange surfaces 225 joined by an elongate web surface 226 to define the C-channel. In the case of securing a reinforced end cap 224 to a planar enclosure component 155 comprising two structural layers separated by a filler material, such as foam panels, flange surfaces 225 are spaced apart by a distance approximately equal to the thickness of the foam panels of the planar enclosure component 155 over which reinforced end cap 224 will be positioned and to which it will be secured. As was the case with free-standing end cap 221, the particular profile of the C-channel of reinforced end cap 224 can vary as desired to include such thickness variations, ridges and/or grooves as are appropriate for the intended application.

Reinforced end cap 224 includes a reinforcement channel 228, shown edge-on in profile in FIG. 11, for providing additional structural rigidity. In particular, reinforcement channel 228 is a four sided closed space, having a generally rectangular configuration in cross-section, and is defined by a cavity wall 227 spaced from web surface 226, which is oriented generally parallel to web surface 226 and spans the distance between flange surfaces 225.

Where even further structural reinforcement is desired, filler reinforcement can be inserted into or formed in reinforcement channel 228. Filler reinforcement can comprise rectangular or other suitably-shaped laminated strand lumber board, wood, aluminum or steel inserts or sleeves, or expanded foam, concrete or even reinforced concrete or other materials. As a further example of filler reinforcement, the scrap foam and/or scrap MgO board that may be a by-product of the fabrication of enclosure components 155 can be further cut to suitable sizes to serve as inserts or sleeves, or can be cut into pieces and mixed with epoxy adhesive to form a slurry, which is then poured into reinforcement channel 228. Upon drying this material provides a suitable medium for retaining fasteners used to secure the enclosure components in place relative to each other.

In general, use of reinforcement channel 228, either without or with further filler reinforcement as just described, can reduce or eliminate any need for positioning and securing exterior edge reinforcement to the edge of the planar enclosure component 155 to which reinforced end cap 224 is to be secured.

Preferably, reinforced end cap 224 is made of a high-impact material, such as polyvinyl chloride (PVC) having a high Durometer hardness extruded and then cut into sections of length L to form reinforced end cap 224.

Reinforced end cap 224 preferably is secured to the desired edge locations of one or more enclosure components 155 in the course of fabricating the enclosure component 155 in a factory or workshop prior to shipment to the building site. For example, where planar enclosure component 155 comprises two structural layers separated by foam panels, a reinforced end cap 224 having a length L approximately equal to the length of the edge in question of enclosure component 155 is positioned over the edge of the foam panels, such that cavity wall 227 abuts or is closely proximate to the edge of the foam. The two structural layers are then positioned over the foam to overlap a major portion of the flange surfaces 225, with locating ridge 229 positioned on the exterior of each flange surface 222 assisting in proper overlap and alignment of the structural layers. Reinforced end cap 224 can be secured in place for example by adhesive applied between the overlapping regions of reinforced end cap 224 and the enclosure component 155, or by fasteners, such as screw or nail fasteners, spaced apart along the length of one or more of flange surfaces 225, and driven therethrough into the enclosure component 155, or by utilizing a combination of adhesive and fasteners in any manner as just described, or otherwise. As indicated above, reinforced end cap 224 performs both an edge reinforcement function and a sealing function against water ingress into and environmental exposure of the edge of the enclosure component 155 to which it is secured.

Although described in detail in connection with reinforced end cap 224, the other enclosure component perimeter structures described below (abutting end cap 235, first hinged I-beam structure 258, second hinged I-beam structure 268, tongue-and-groove hinged structure 242) can also utilize a like reinforcement structure (with and without filler reinforcement), namely a cavity wall spaced from an elongate web, where the cavity wall is oriented generally parallel to the web and spans the distance between the associated elongate flanges to define a reinforcement channel having a generally closed rectangular configuration in cross-section.

Abutting End Cap (235)

Figure 12:
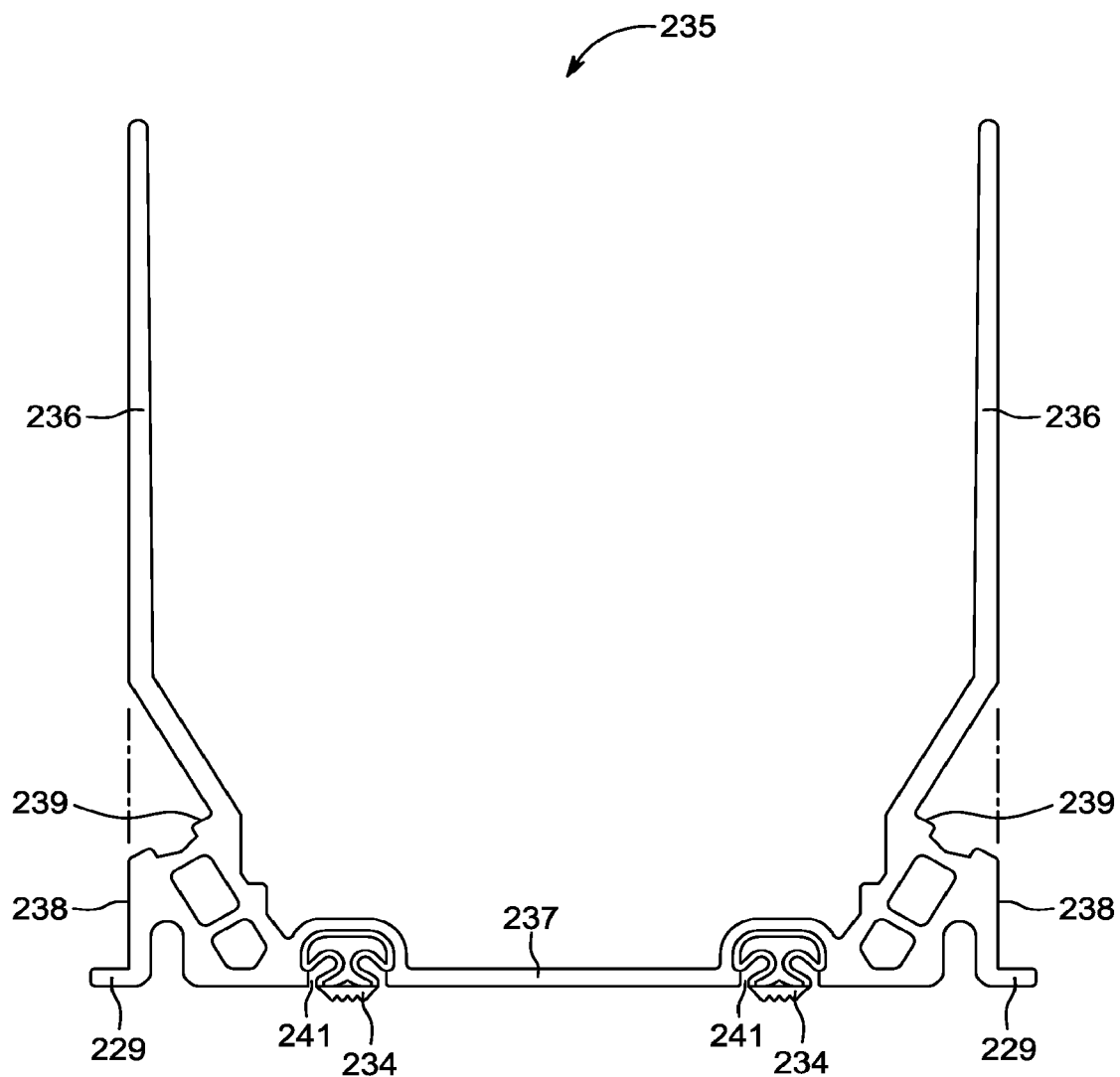

Abutting end cap 235, shown edge-on in profile in FIG. 12, generally has a C-channel shape of a length "L", where L is the length of the edge of the enclosure component 155 to which end cap 235 is to be secured. Abutting end cap 235 has two spaced-apart elongate flange surfaces 236 and an elongate web surface 237, which generally define the C-channel. The particular profile of the C-channel of abutting end cap 235 can vary as desired to include such thickness variations, ridges and/or grooves as are appropriate for the intended application. In the case of securing abutting end cap 235 to a planar enclosure component 155 comprising two structural layers separated by foam panels, flange surfaces 236 are spaced apart by a distance approximately equal to the thickness of the foam panels of the planar enclosure component 155 over which abutting end cap 235 will be positioned and to which it will be secured. Preferably, abutting end cap 235 is made of a high-impact material, such as polyvinyl chloride (PVC) having a high Durometer hardness extruded and then cut into sections of length L to form abutting end cap 235.

Web surface 237 of abutting end cap 235 is not joined directly to each of flange surfaces 236. Rather, an inclined fastener shelf 239 shown in FIG. 12 is interposed between each flange surface 236 and web surface 237. Fastener shelves 239 allow a plurality of spaced-apart fasteners, such as nails or screw fasteners, to be driven down through abutting end cap 235 into a planar enclosure component 155 that may abut web surface 237, and thereby fasten abutting end cap 235 to the planar enclosure component 155. The regions of each flange surface 236 proximate to fastener shelf 239 are canted inward toward each other, at a select angle as shown in FIG. 12, so as to provide access to fastener shelves 239 while lowering the width across web surface 237 and thereby reduce the footprint of abutting end cap 235, as compared to the situation of positioning fastener shelves 239 outward from fully-planar flange surfaces 236. It is preferred that the regions of each flange surface 236 proximate to fastener shelf 239 be canted inward toward each other at approximately thirty degrees (30°) from the plane of the flange surface 236 to which it is proximate, and that each fastener shelf 239 be inclined at approximately sixty degrees) (60°) from the plane of the flange surface to which it is proximate.

Abutting end cap 235 performs a sealing function against water ingress into and environmental exposure of the edge of the enclosure component 155 to which it is secured. In addition, abutting end cap 235 can also provide a sealing function against water ingress across its boundary with an abutting enclosure component 155. Thus as shown in FIG. 12, the exterior of web surface 237 can be provided with plural receiving slots 241 for receiving sealing beads 234, in order to form a water-resistant seal between web abutting end cap 235 and an abutting planar enclosure component. In an alternative embodiment, the sealing beads are coextruded with abutting end cap 235 at locations that approximate the locations of receiving slots 241.

Abutting end cap 235 preferably is secured to the desired edge locations of one or more enclosure components 155 in the course of fabricating the enclosure component(s) 155 in a factory or workshop prior to shipment to the building site. For example, where planar enclosure component 155 comprises two structural layers separated by foam panels, an abutting end cap 235 having a length "L" approximately equal to the length of the edge in question of enclosure component 155 is positioned over the edge of the foam panels, such that web surface 237 abuts or is closely proximate to the edge of the foam. The two structural layers are then positioned over the foam to overlap a major portion of the flange surfaces 236. As shown in FIG. 12, a locating ridge 229 is positioned on the exterior of each flange surface 236 assisting in proper overlap and alignment of the structural layers. Abutting end cap 235 can be secured to the enclosure component 155 for example by adhesive applied between the overlapping regions of abutting end cap 235 and the enclosure component 155, or by fasteners, such as screw or nail fasteners, spaced apart along the length of one or more of flange surfaces 236 and web surface 237, and driven therethrough into the enclosure component 155, or by utilizing a combination of adhesive and fasteners in any manner as just described, or otherwise.

First Hinged I-Beam Structure (258)

First hinged I-beam structure 258 is shown in FIGS. 13A-13F. It provides means for pivotally attaching two adjacent enclosure components 155, or two adjacent portions of an enclosure component 155, so that one can pivot through at least up to ninety degrees) (90°) of arc relative to the other. First hinged I-beam structure 258 can also provide a sealing function against water ingress into and environmental exposure of the edges of the two adjacent enclosure components 155, or the two adjacent portions of an enclosure component 155, to which it is secured, and can provide a sealing function to prevent water ingress across the boundary between those two edges.

First hinged I-beam structure 258 comprises a first elongate perimeter section 259 of length "L" and a second elongate perimeter section 263 also of length "L," where L is the length of each of the edges of the enclosure components 155 on which first perimeter section 259 and second perimeter section 263 will be respectively secured in order to pivotally join those sections together.

Figure 13A:
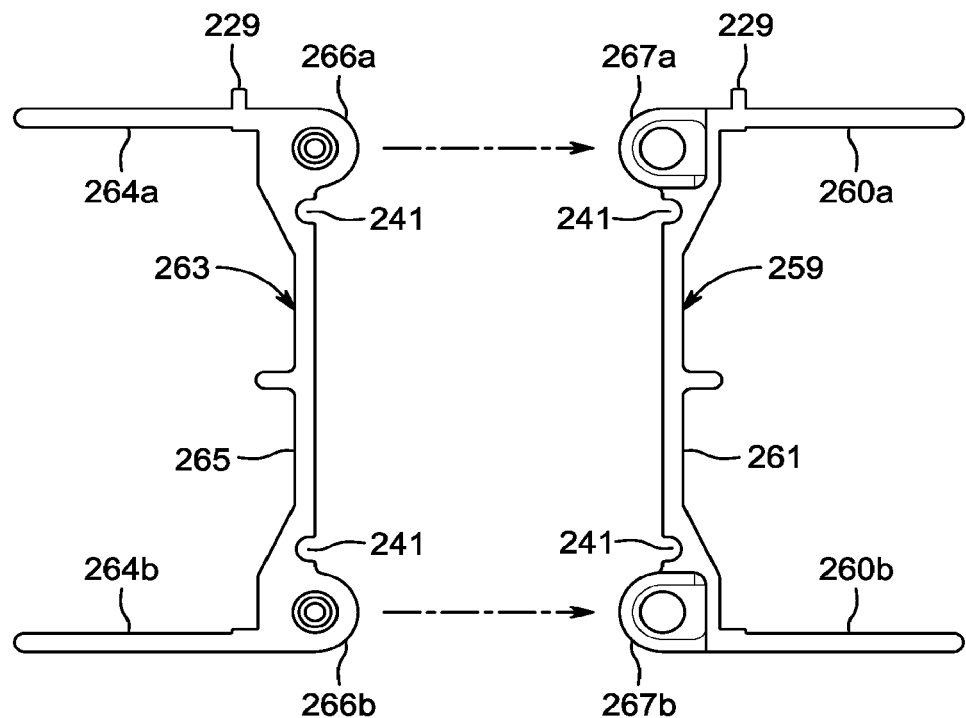
FIGS. 13A, 13B and 13C are side views of a first hinged I-beam structure in accordance with the present inventions.

In particular, FIG. 13A shows first perimeter section 259 of first hinged I-beam structure 258 edge-on in profile. First perimeter section 259 is defined by two spaced-apart elongate flange surfaces 260 and an elongate web surface 261. One of the flange surfaces 260, flange surface 260a, is joined to web surface 261 at a first junction and the other of the flange surfaces 260, flange surface 260b, is joined to web surface 261 at a second junction. Where the first perimeter section 259 is to be secured to a planar enclosure component 155 comprising two structural layers separated by foam panels, the width of web surface 261 (the distance separating flange surfaces 260a and 260b) is somewhat greater than the thickness of the foam panels of the enclosure component 155 to which it will be secured, as particularized further below. First perimeter section 259 approximately forms a C-channel in cross-section.

Comparable to first perimeter section 259, second perimeter section 263 (shown in FIG. 13A edge-on in profile) of first hinged I-beam structure 258 is defined by two spaced-apart elongate flange surfaces 264 and an elongate web surface 265. One of the flange surfaces 264, flange surface 264a, is joined to web surface 265 at a third junction and the other of the flange surfaces 264, flange surface 264b, is joined to web surface 265 at a fourth junction. Where the second perimeter section 263 is to be secured to a planar enclosure component 155 comprising two structural layers separated by foam panels, the width of web surface 265 (the distance separating flange surfaces 264a and 264b) is somewhat greater than the thickness of the foam panels of the enclosure component 155 to which it will be secured, as particularized further below. Second perimeter section 263 approximately forms a C-channel in cross-section. It is preferred that first and second perimeter sections 259 and 263 each have approximately the same shape and dimensions.

Figure 13B:
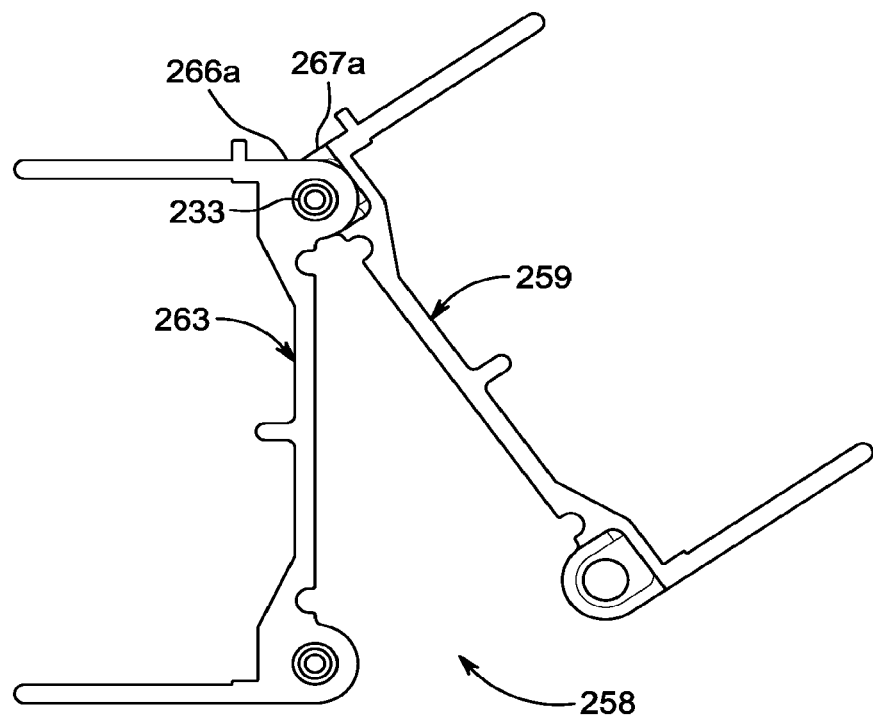
Figure 13C:
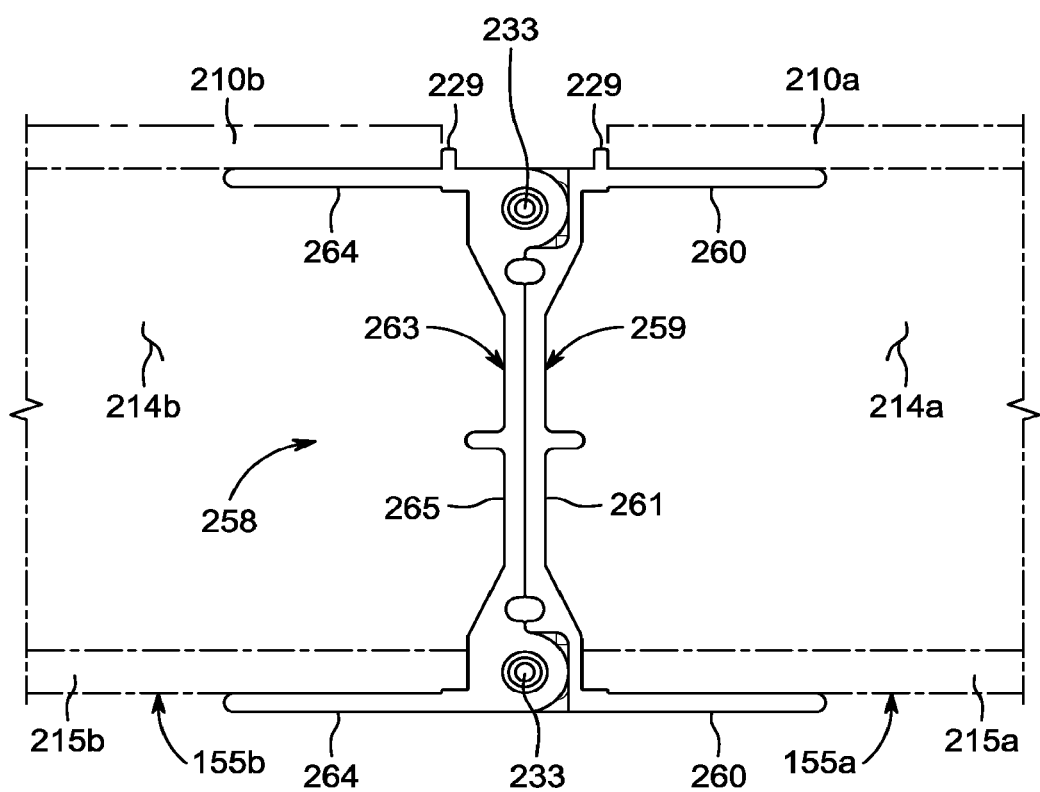
Figure 13D:
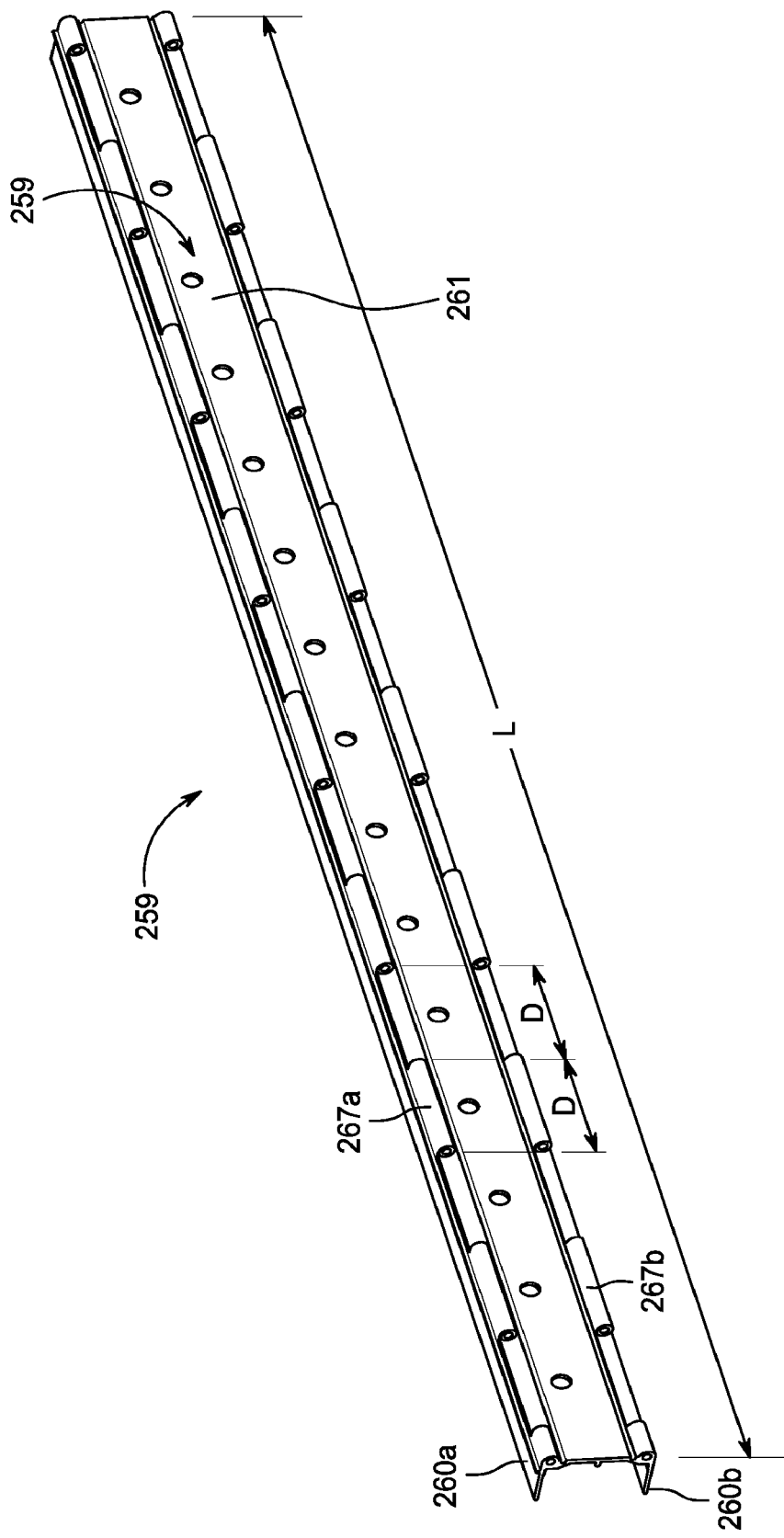
FIG. 13D is a perspective view of a perimeter section of the first hinged I-beam structure in accordance with the present inventions.

As shown in FIGS. 13A-13F, first perimeter section 259 has a first series of hinge knuckles 267a of length L in proximity to the first junction of flange surface 260a and web surface 261, and a second series of hinge knuckles 267b of length L in proximity to the second junction of flange surface 260b and web surface 261. It is preferred that the geometry of hinge knuckles 267a and 267b be the same as each other. Likewise second perimeter section 263 has a first series of hinge knuckles 266a in proximity to the third junction of flange surface 264a and web surface 265, and a second series of hinge knuckles 266b in proximity to the fourth junction of flange surface 264b and web surface 265. It is preferred that the geometry of hinge knuckles 266a and 266b be the same as each other, and also the same as hinge knuckles 267a and 267b. It is specifically preferred that the hinge knuckles 267a and 267b of first perimeter section 259 each be of length D and be spaced-apart the same distance D, and it is specifically preferred that the hinge knuckles 266a and 266b of second perimeter section 263 also be of length D and be spaced-apart the same distance D. FIG. 13D depicts the hinge knuckle arrangement of second perimeter section 263 having a length L. As shown in that figure, each of the hinge knuckles 267a is in an overlying relationship (vertically aligned) with a respective hinge knuckle 267b, and each of the spaces between an adjacent pair of hinge knuckles 267a is in an overlying relationship (vertically aligned) with a respective space between an adjacent pair of hinge knuckles 267b.

Figure 13E:
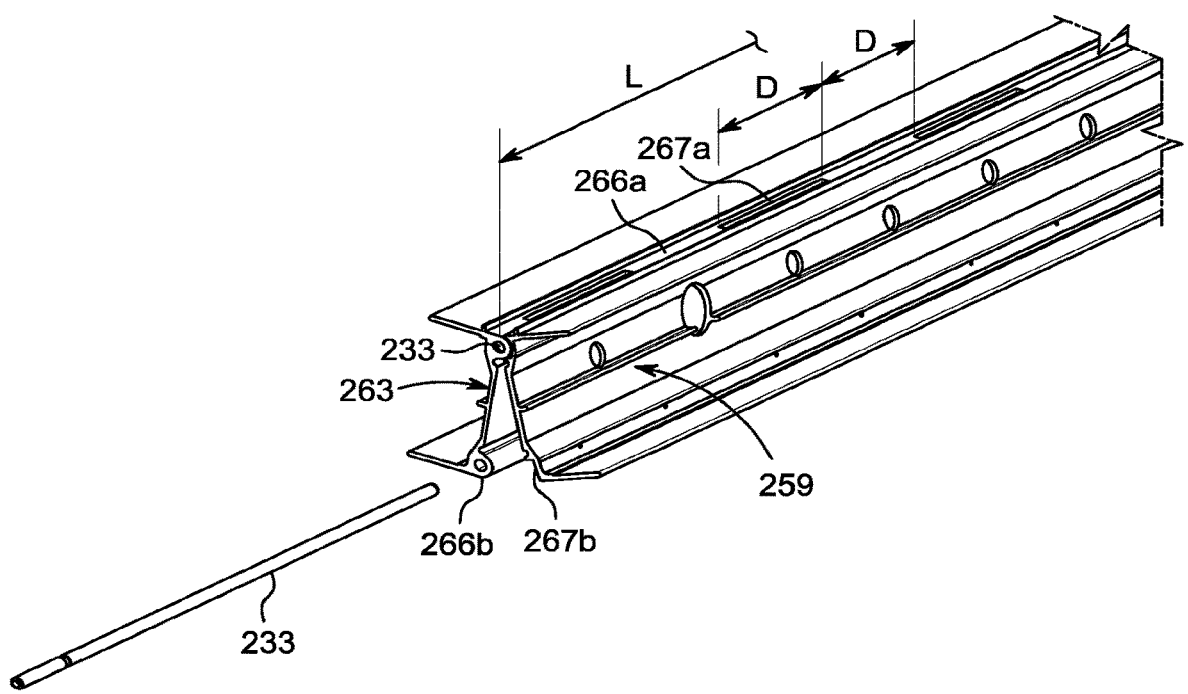
FIGS. 13E and 13F are perspective views of the first hinged I-beam structure in accordance with the present inventions.
Figure 13F:
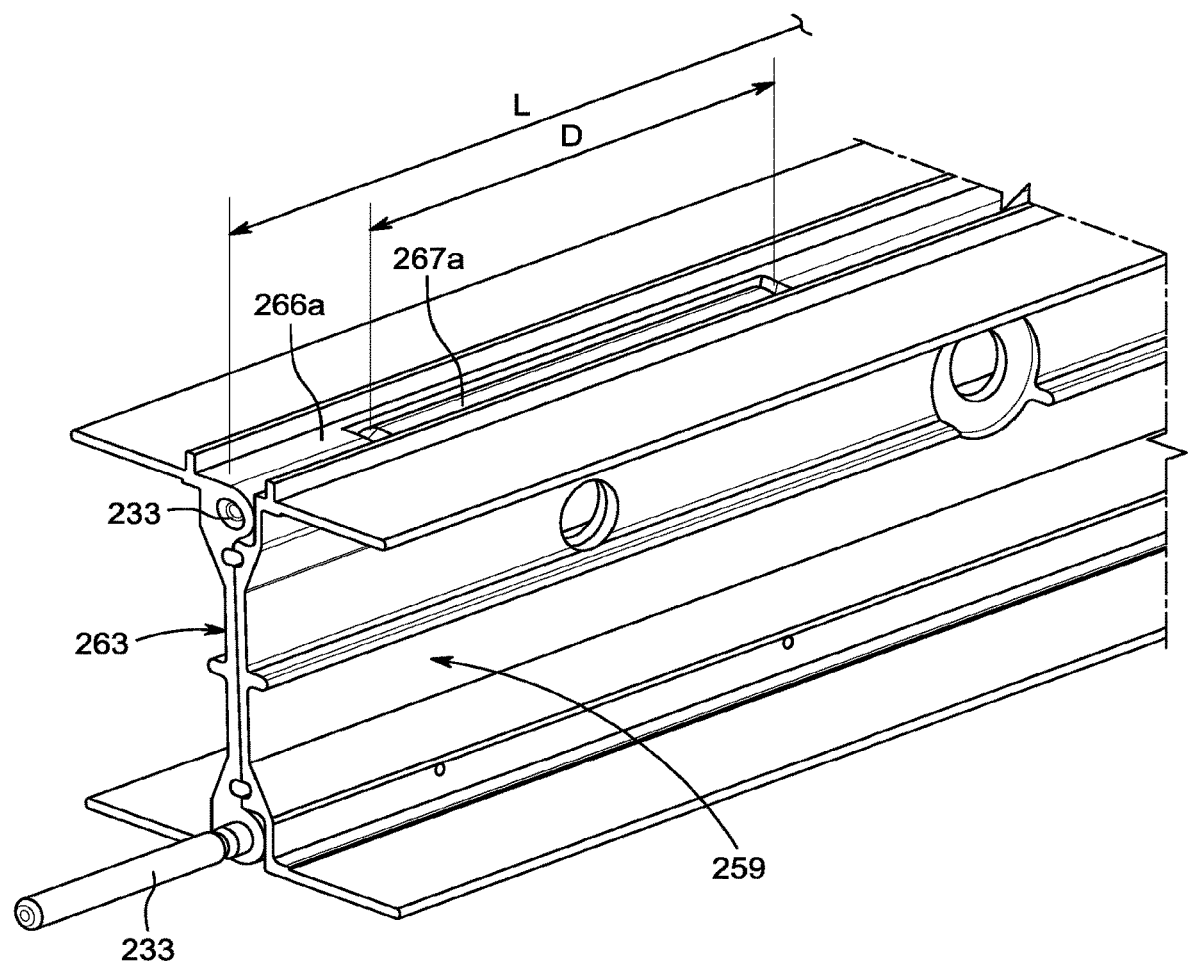

As shown in FIGS. 13B and 13E, hinge knuckles 267a and 266a are intermeshed and joined by a first series of linearly arranged cylindrical steel rods 233 of aggregate length L to form a pivotable junction between first perimeter section 259 and second perimeter section 263. This pivotable junction enables first hinged I-beam structure 258 to rotate through at least ninety degrees (90°) of arc to a fully open (unfolded) position, as shown in FIGS. 13C and 13F. The hinge knuckles 266b and 267b are positioned so that hinge knuckles 266b and 267b intermesh when first hinged I-beam structure 258 is fully open. When so intermeshed, a second series of linearly arranged cylindrical steel rods 233 of aggregate length L can be passed through hinge knuckles 267b and 266b to lock second hinged I-beam structure 258 in the fully opened position, as shown in FIGS. 13E-13F.

It is preferred that the first series of linearly arranged cylindrical steel rods 233 be joined end-to-end by threaded connections, so that the steel rods 233 act as a single continuous rod that better resists tensile loading. It is also preferred that the second series of linearly arranged cylindrical steel rods 233 be joined in like manner. In one embodiment of first hinged I-beam structure 258, the first and second series of linearly arranged cylindrical steel rods 233 have a diameter of approximately 0.625 inch (1.5875 cm).

The design of first and the second perimeter sections 259 and 263 are such that the web surfaces 261 and 265 are in contact when first hinged I-beam structure 258 is fully open, as shown in FIGS. 13C and 13F. This contacting relationship assists in weather-sealing the structure. In furtherance of this objective and as shown for example in FIG. 13A, the exterior face of each of web surfaces 261 and 265 can be provided with plural receiving slots 241 for receiving a sealing bead (not shown), in order to form a water-resistant seal between the web surfaces. In an alternative embodiment, the sealing beads can be coextruded with at the same time as the perimeter section itself, at locations that approximate the locations of receiving slots 241. As a general matter, the particular profile of the C-channel of first and second perimeter sections 259 and 263 can vary as desired to include such thickness variations, ridges and/or grooves as are appropriate for the intended application.

First and second perimeter sections 259 and 263 of first folding I-beam structure 258 be fabricated by an extrusion process, such as pultrusion, in which a suitable material (fiberglass reinforced polymer plastic, in the case of pultrusion) is drawn through an appropriately-shaped die to form a work piece generally having the web/flange structure of the perimeter sections. As part of the drawing process, cylindrical conduits can be formed in the work piece proximate the intended locations for the first/third and second/fourth junctions, following which sections of length D can be machined into the conduits at spaced-apart intervals of length D to form a series of hinge knuckles. Alternatively, the work piece can be drawn without such cylindrical conduits, following which tubular sections of length D are secured at spaced-apart intervals of length D to form the series of hinge knuckles. After drawing, the work piece is sectioned into sectioned work pieces of length L to yield the desired perimeter sections of first folding I-beam structure 258. Where first and second perimeter sections 259 and 263 have the same geometry, as is preferred, the sectioned work pieces are interchangeable and can serve as one or the other of first and second perimeter sections 259 and 263. However, in pairing any two work pieces to form a first folding I-beam structure 258, it is necessary to take into account their interlaced relationship; thus for example, when sectioning two work pieces into perimeter sections of length L having hinge knuckles of length D spaced-apart at intervals of length D, a first of the two can be sectioned at a point where a hinge knuckle starts, and in accordance therewith the second of the two should be sectioned at a point where a spaced-apart interval of length D starts.

First folding I-beam structure 258 can be secured to two adjacent enclosure components 155, or to two adjacent portions of an enclosure component 155, that are intended to have a folded relationship in shipping module 100. In FIG. 13C, the two adjacent enclosure components 155 are denominated 155a and 155b; and as depicted, each enclosure component 155a, 155b has a first structural layer 210a, 210b respectively, a foam panel 214a, 214b respectively, and a second structural layer 215a, 215b respectively. First folding I-beam structure 258 has a length "L" (L being approximately equal to the length of the edges in question of the two adjacent enclosure components 155a and 155b). As seen in FIG. 13C, first and second perimeter sections 259 and 263 are dimensioned to capture between their respective flange surfaces 260, 264 the foam panels 214a, 214b of the respective enclosure components 155a, 155b, such that web surfaces 261 and 265 abut or are closely proximate to the edges of foam panels 214a, 214b, respectively. The adjacent first structural layers 210a and 210b are then respectively positioned to overlap a major portion of the upper flange surfaces 260, 264, with locating ridges 229, positioned on those upper flange surface as shown in FIG. 13C, assisting in proper alignment and overlap of first structural layers 210a, 210b. In turn, where lower flange surfaces 260 and 264 are intended to capture the adjacent second structural layers 215a, 215b of enclosure components 155a, 155b, as in FIG. 13C, locating ridges 229 on lower flange surfaces 260, 264 need not be provided.

First and second perimeter sections 259 and 263 can each be secured to the respective enclosure components 155 for example by adhesive applied between the overlapping regions of first and second perimeter sections 259 and 263 and the respective enclosure components 155, or by fasteners, such as screw or nail fasteners, spaced apart along the length of one or more of flange surfaces 260, 264 and web surfaces 261 and 265, and driven therethrough into the respective enclosure component 155, or by utilizing a combination of adhesive and fasteners in any manner as just described, or otherwise. Once secured to their respective enclosure components 155, the relevant components can be rotated to a fully folded state to form shipping module 100, and also rotated to a fully unfolded state upon finishing structure 150 at its intended location.

Second Hinged I-Beam Structure (268)

Second hinged I-beam structure 268 is shown in FIGS. 14A-14F. It provides means for pivotally attaching two adjacent enclosure components 155, or two adjacent portions of an enclosure component 155, so that one can pivot through up to one hundred and eighty degrees (180°) of arc relative to the other, without causing interference crimping between adjacent components or portions. Second hinged I-beam structure 268 can also provide a sealing function against water ingress into and environmental exposure of the edges of the two adjacent enclosure components 155, or the two adjacent portions of an enclosure component 155, to which it is secured, and can provide a sealing function to prevent water ingress across the boundary between those two edges.

Second hinged I-beam structure 268 comprises a first elongate perimeter section 269 (shown edge-on in profile in FIG. 14A) of length "L" and a second elongate perimeter section 274 also of length "L", where L is the length of each of the edges of the enclosure components 155 on which first perimeter section 269 and second perimeter section 274 will be respectively positioned in order to pivotally join those sections together.

Figure 14A:
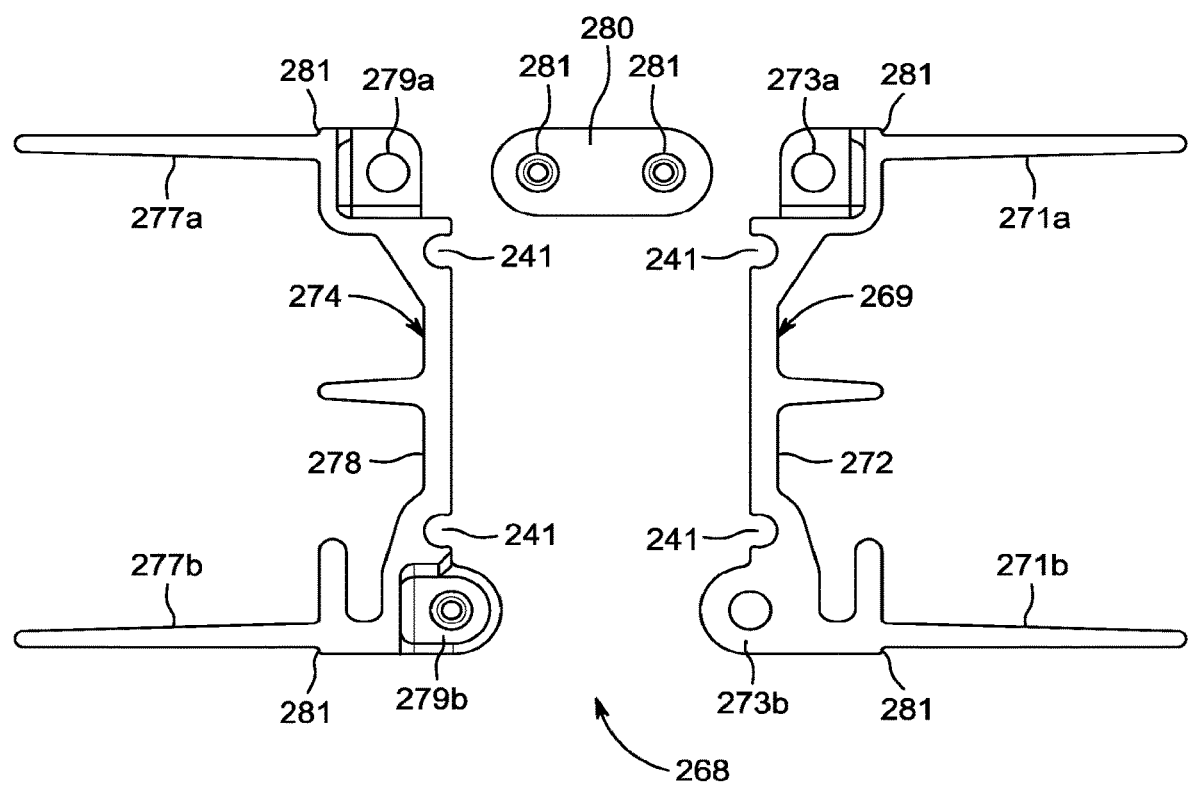
FIGS. 14A, 14B, 14C and 14D are side views of a second hinged I-beam structure in accordance with the present inventions.
Figure 14B:
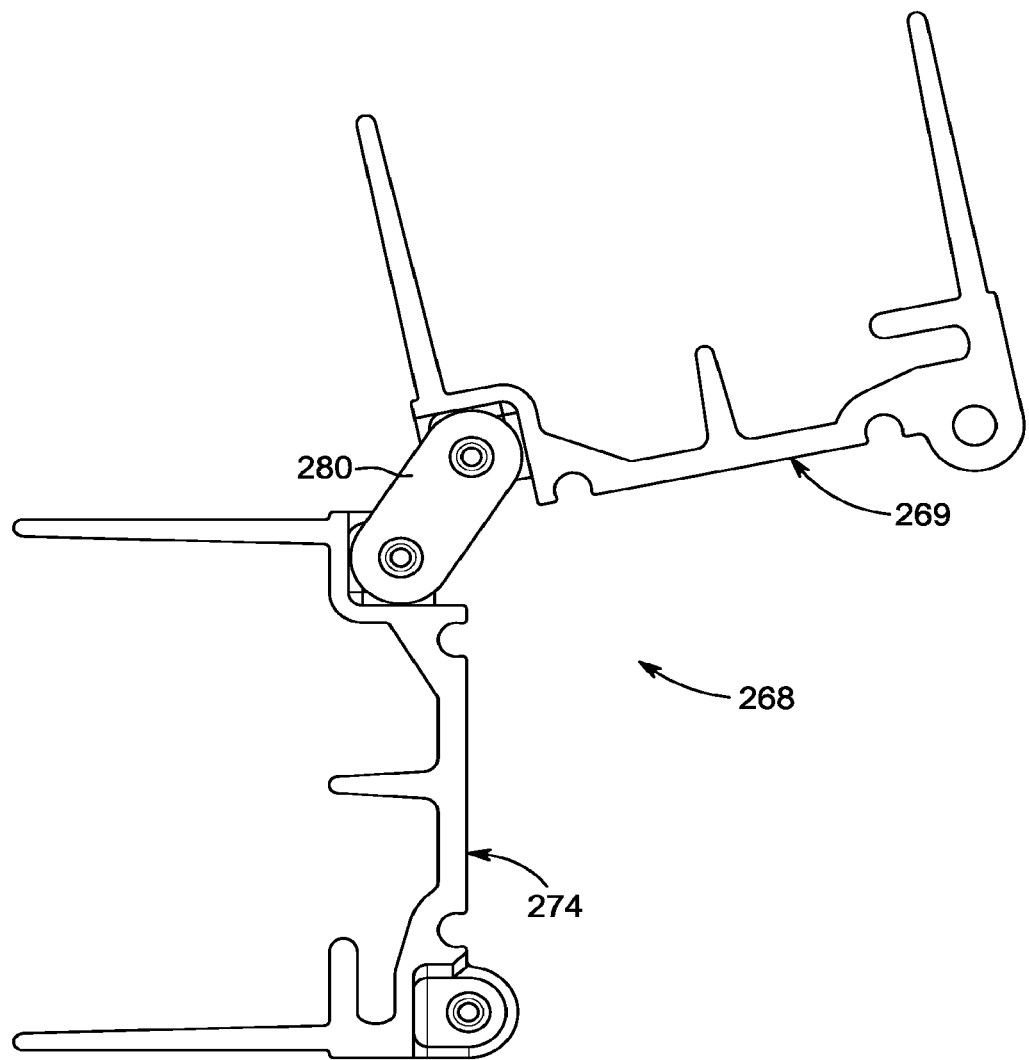

In particular, referring to FIG. 14A, first perimeter section 269 of second hinged I-beam structure 268 is defined by two spaced-apart elongate flange surfaces 271 and an elongate web surface 272. One of the flange surfaces 271, flange surface 271a, is joined to web surface 272 at a first junction and the other of the flange surfaces 271, flange surface 271b, is joined to web surface 272 at a second junction. In the case of securing first perimeter section 269 to a planar enclosure component 155 comprising two structural layers separated by foam panels, flange surfaces 271a, 271b are spaced apart by a distance approximately equal to the thickness of the foam panels of the planar enclosure component 155 over which first perimeter section 269 will be positioned and to which it will be secured, so that first perimeter section 269 thereby forms a C-channel in cross-section.

Comparable to first perimeter section 269, second perimeter section 274 (shown edge-on in profile in FIG. 14A) of second hinged I-beam structure 268 is defined by two spaced-apart elongate flange surfaces 277 and an elongate web surface 278. One of the flange surfaces 277, flange surface 277a, is joined to web surface 278 at a third junction and the other of the flange surfaces 277, flange surface 277b, is joined to web surface 278 at a fourth junction. In the case of securing second perimeter section 274 to a planar enclosure component 155 also comprising two structural layers separated foam panels, flange surfaces 277a, 277b are spaced apart by a distance approximately equal to the thickness of the foam panels of the planar enclosure component 155 over which second perimeter section 274 will be positioned and to which it will be secured, so that second perimeter section 74 thereby forms a C-channel in cross-section. It is preferred that first and second perimeter sections 269 and 274 each have approximately the same shape and dimensions.

Figure 14C:
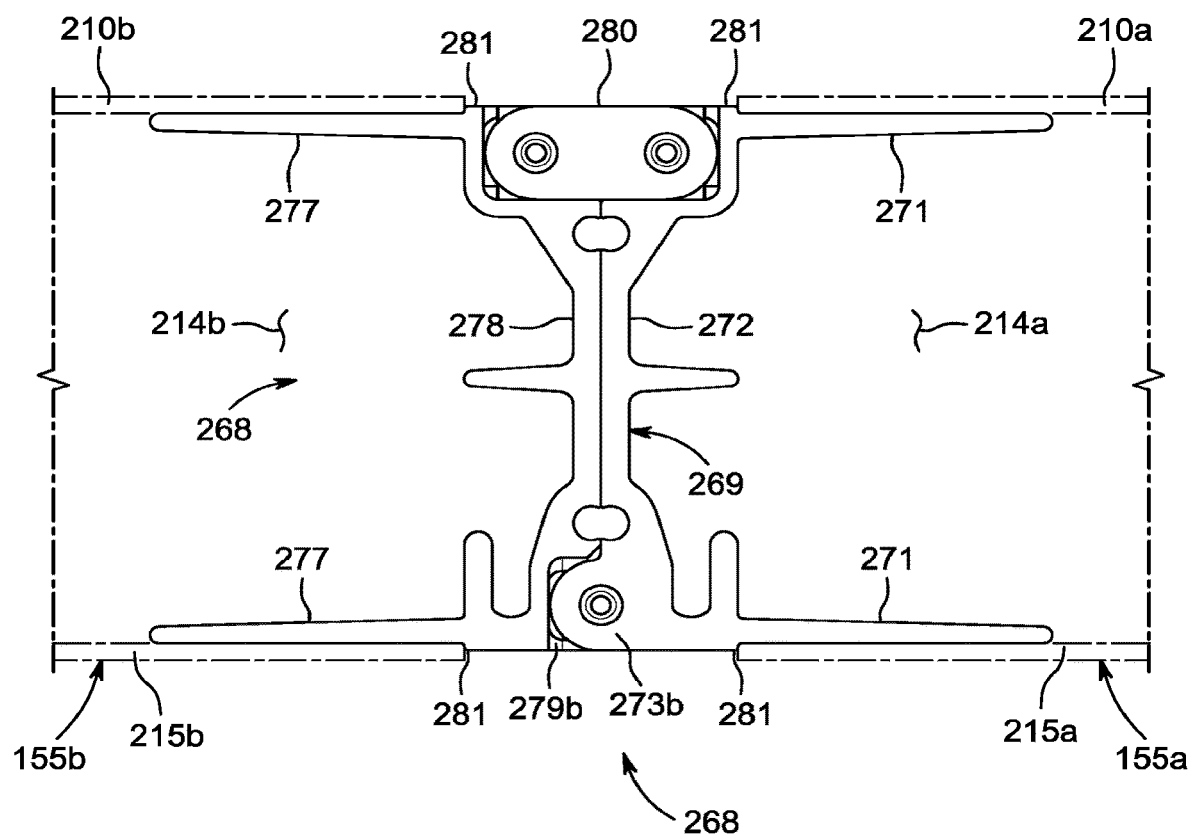
Figure 14D:
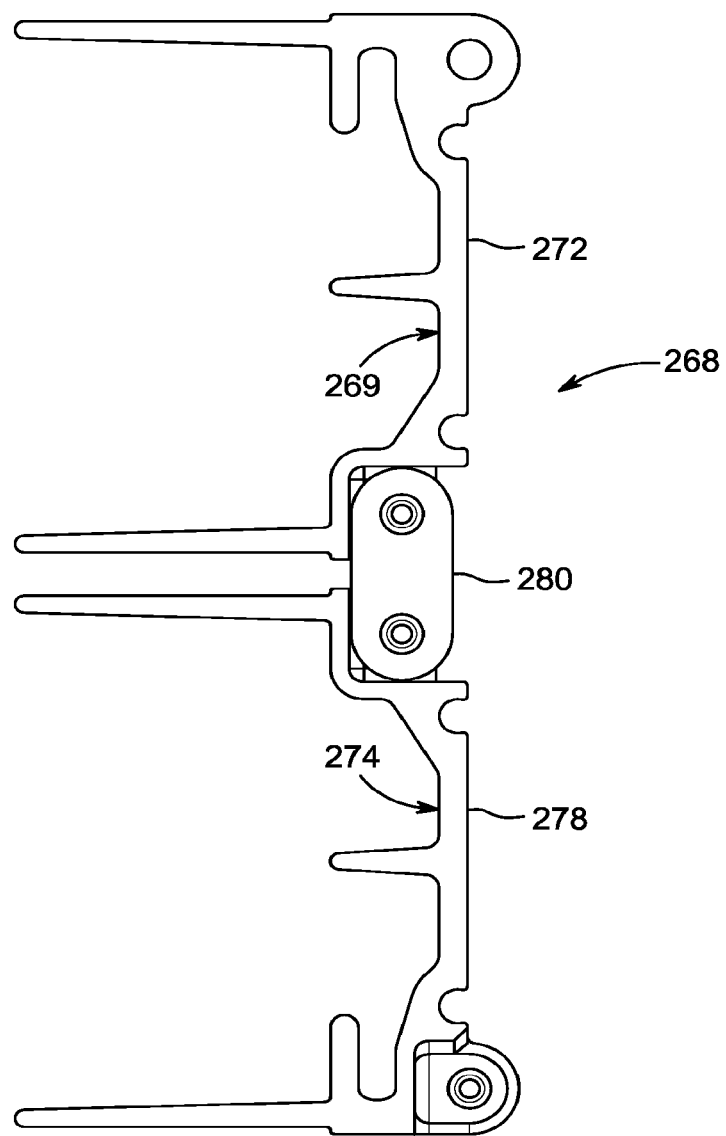
Figure 14E:
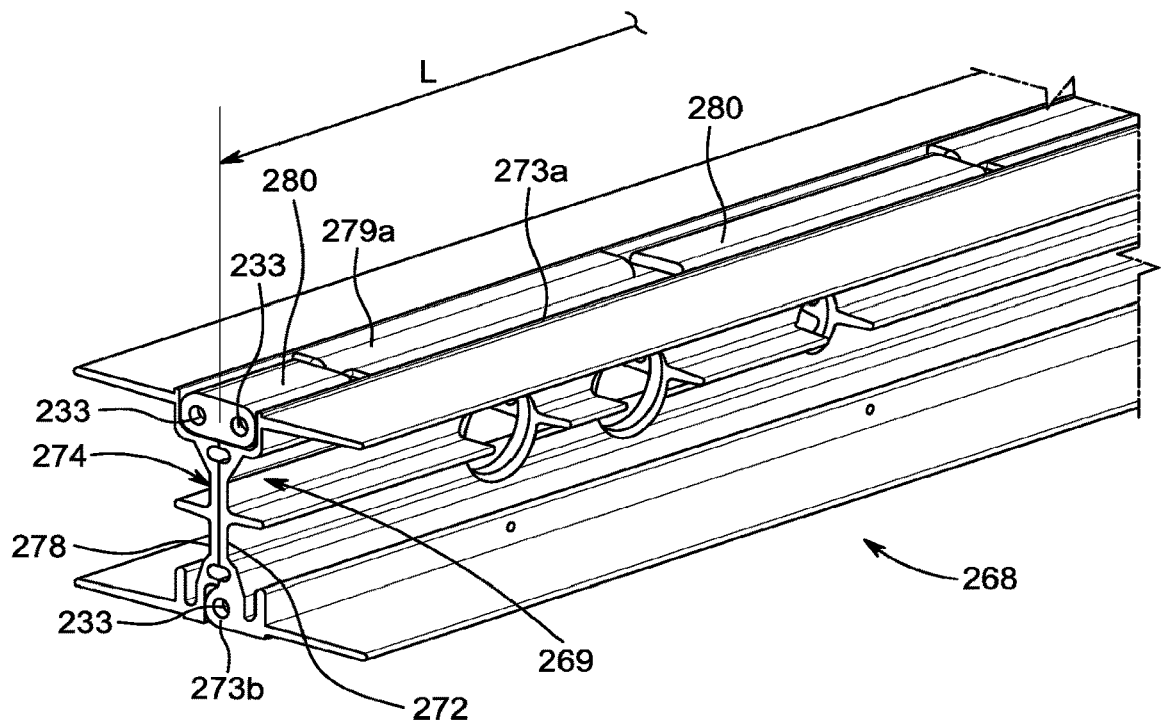
FIGS. 14E and 14F are perspective views of the second hinged I-beam structure in accordance with the present inventions.
Figure 14F:
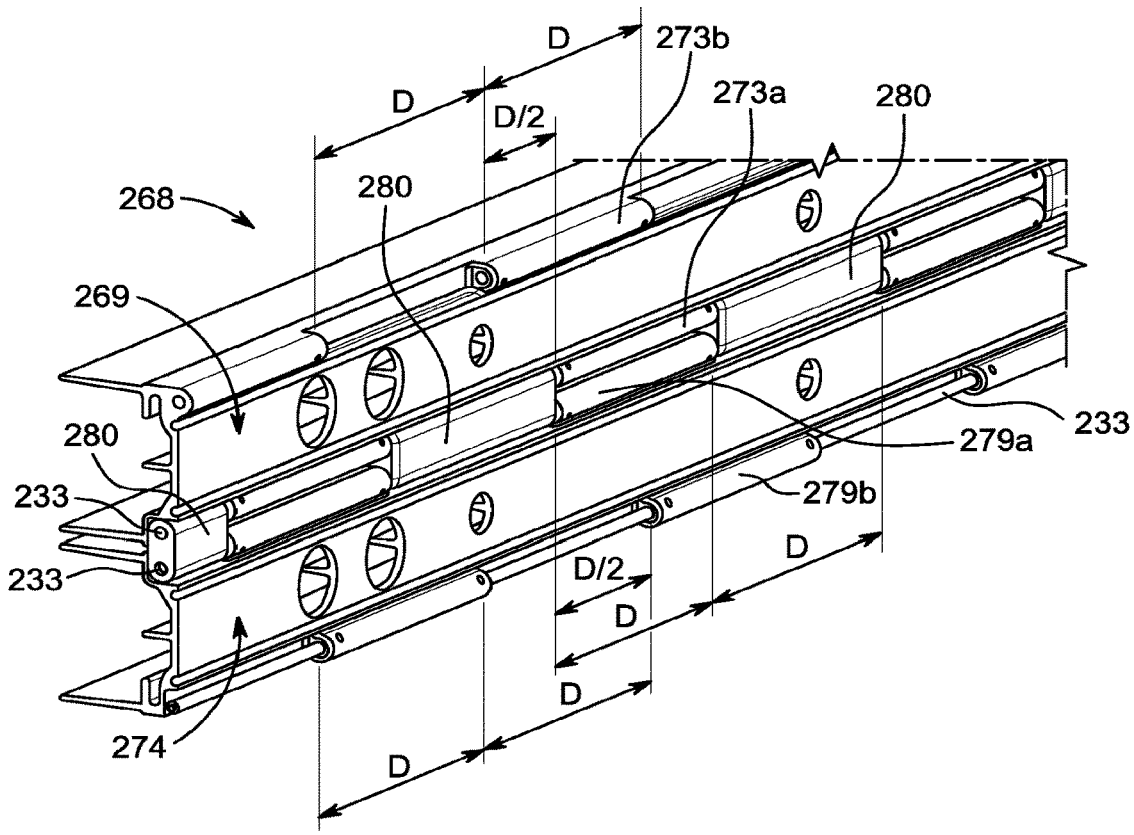

As shown in FIGS. 14E and 14F, first perimeter section 269 has a first series of hinge knuckles 273a of length L in proximity to the first junction of one of the flange surfaces 271 and web surface 272, and a second series of hinge knuckles 273b of length L formed in proximity to the second junction of one of the flange surfaces 271 and web surface 272. It is preferred that the geometry of hinge knuckles 273a and 273b be the same as each other. Likewise second perimeter section 274 has a first series of hinge knuckles 279a in proximity to the third junction of flange surface 277 and web surface 278, and a second series of hinge knuckles 279b in proximity to the fourth junction of flange surface 277 and web surface 278. It is preferred that the geometry of hinge knuckles 279a and 279b be the same as each other, and also the same as hinge knuckles 273a and 273b. It is specifically preferred that the hinge knuckles 273a and 273b of first perimeter section 269 each be of length D and be spaced-apart the same distance D, and it is specifically preferred that the hinge knuckles 279a and 279b of second perimeter section 274 also be of length D and be spaced-apart the same distance D, as shown in FIG. 14F.

As shown in FIGS. 14E and 14F, the series of hinge knuckles 273a and 279a are not intermeshed, but rather are paired in an abutting relationship. There is provided a spacer link 280, having a length of less than or approximately equal to distance D, which is positioned between each abutting hinge knuckle pair of hinge knuckles 273a and 279a. Spacer link 280 has two spaced-apart bores 281, shown in FIG. 14A, of approximately the same diameter as the hinge knuckles 273a and 279a. A first series of linearly arranged cylindrical steel rods 233 of aggregate length L are passed through hinge knuckles 273a and one of the bores 281 in each of the spacer links 280 positioned between those hinge knuckles, and a second series of linearly arranged cylindrical steel rods 233 of aggregate length L are passed through hinge knuckles 279a and the other of the bores 281 in each of the spacer links 280 positioned between those hinge knuckles. It is preferred that the first series of linearly arranged cylindrical steel rods be joined end-to-end by threaded connections, so that the steel rods 233 act as a single continuous rod that better resists tensile loading. It is also preferred that the second series of linearly arranged cylindrical steel rods 233 be joined in like manner. In one embodiment of second hinged I-beam structure 268, the first and second series of linearly arranged cylindrical steel rods 233 have a diameter of approximately 0.625 inch (1.5875 cm).

The foregoing knuckle and spacer link arrangement forms an articulated pivotable junction between first perimeter section 269 and second perimeter section 274, which is able to rotate up to one hundred and eighty degrees (180°) from a fully folded position, as shown in FIG. 14D (with the exterior faces of web surfaces 272 and 278 forming a flush face), to a fully open (unfolded) position, as shown in FIG. 14C. The positions of hinge knuckles 273b and 279b are such that, as shown in FIGS. 14C and 14E, hinge knuckles 273b intermesh with hinge knuckles 279b when second hinged I-beam structure 268 is fully open. When so intermeshed, a third series of linearly arranged cylindrical steel rods 233 of aggregate length L (see FIG. 14F) can be passed through hinge knuckles 273a and 279a to lock second hinged I-beam structure 268 in the fully opened position. Like the first and second series of linearly arranged cylindrical steel rods 233, it is preferred that the third series of linearly arranged cylindrical steel rods 233 be joined end-to-end by threaded connections, so that the steel rods 233 act as a single continuous rod that better resists tensile loading. In one embodiment of second hinged I-beam structure 268, the third series of linearly arranged cylindrical steel rods 233 has a diameter of approximately 0.625 inch (1.5875 cm).

The design of first and the second perimeter sections 269 and 274 are such that the web surfaces 272 and 278 are in contact when second hinged I-beam structure 268 is fully open, as shown in FIGS. 14C and 14E. This contacting relationship assists in weather-sealing the structure. In furtherance of this objective and as shown for example in FIG. 14A, the exterior face of each of web surfaces 261 and 265 can be provided with plural receiving slots 241, each for receiving a sealing bead (not shown), in order to form a water-resistant seal between the web surfaces. In an alternative embodiment, the sealing beads can be coextruded at the same time as the perimeter section itself, at locations that approximate the locations of receiving slots 241. As a general matter, the particular profile of the C-channel of first and second perimeter sections 269 and 274 can vary as desired to include such thickness variations, ridges and/or grooves as are appropriate for the intended application.

First and second perimeter sections 269 and 274 of second folding I-beam structure 268 be fabricated by an extrusion process, such as pultrusion, in which a suitable material (fiberglass reinforced polymer plastic, in the case of pultrusion) is drawn through an appropriately-shaped die to form a work piece generally having the web/flange structure of the perimeter sections. As part of the drawing process, cylindrical conduits can be formed in the work piece proximate the first/third and second/fourth junctions, following which sections of length D can be machined into the conduits at spaced-apart intervals of length D to form a series of hinge knuckles. Alternatively, the work piece can be drawn without such cylindrical conduits, following which tubular sections of length D are secured, for example with adhesive, at spaced-apart intervals of length D to form the series of hinge knuckles. After drawing, the work piece is sectioned into sectioned work pieces of length L to form the desired perimeter sections of second folding I-beam structure 268. Where first and second perimeter sections 269 and 274 have the same geometry, as is preferred, the sectioned work pieces are interchangeable and can serve as one or the other of first and second perimeter sections 269 and 274. However, in each case, and referring to first perimeter section 269 in FIG. 14F for exemplary purposes, hinge knuckles 273b (of length D) are not vertically aligned with hinge knuckles 273a (of length D), but rather are longitudinally displaced, relative to hinge knuckles 273a, an offset distance φ of D/2, as shown in FIG. 14F. Likewise, hinge knuckles 279b (of length D) are not located vertically aligned with hinge knuckles 279a, but rather are longitudinally displaced, relative to hinge knuckles 279a (of length D), the same offset distance φ of D/2.

Second folding I-beam structure 268 can be secured to two adjacent enclosure components 155, or to two adjacent portions of an enclosure component 155, that are intended to have a folded relationship in shipping module 100. In FIG. 14C, two adjacent enclosure components 155 are denominated 155a and 155b; and as depicted, each enclosure component 155a, 155b has a first structural layer 210a, 210b respectively, a foam panel 214a, 214b respectively, and a second structural layer 215a, 215b respectively. Second folding I-beam structure 268 has a length "L" (L being approximately equal to the length of the edges in question of the two adjacent enclosure components 155a and 155b). As seen in FIG. 14C, first and second perimeter sections 269 and 274 are dimensioned to capture between their respective flange surfaces 271, 277 the foam panels 214a, 214b of the respective enclosure components 155a, 155b, such that web surfaces 272 and 278 abut or are closely proximate to the edges of foam panels 214a, 214b, respectively. The adjacent first structural layers 210a and 210b are then respectively positioned to overlap a major portion of the upper flange surfaces 271, 277, with locating detents 281, positioned on those upper flange surfaces as shown in FIG. 14C, assisting in proper alignment and overlap of first structural layers 210a, 210b. Likewise, the adjacent second structural layers 215a and 215b are respectively positioned to overlap a major portion of the lower flange surfaces 271, 277, with locating detents 281, positioned on those lower flange surfaces as shown in FIG. 14C, assisting in proper alignment and overlap of second structural layers 215a, 215b.

First and second perimeter sections 269 and 274 can each be secured to the respective enclosure components 155 for example by adhesive applied between the overlapping regions of first and second perimeter sections 269 and 274 and the respective enclosure components 155, or by fasteners, such as screw or nail fasteners, spaced apart along the length of one or more of flange surfaces 271, 277 and web surfaces 272 and 278, and driven therethrough into the respective enclosure component 155, or by utilizing a combination of adhesive and fasteners in any manner as just described, or otherwise. Once secured to their respective enclosure components 155, the relevant components can be rotated to a fully folded state to form shipping module 100, and also rotated to a fully unfolded state upon finishing structure 150 at its intended location.

Tongue-and-Groove Hinged Structure (242)

Figure 15:
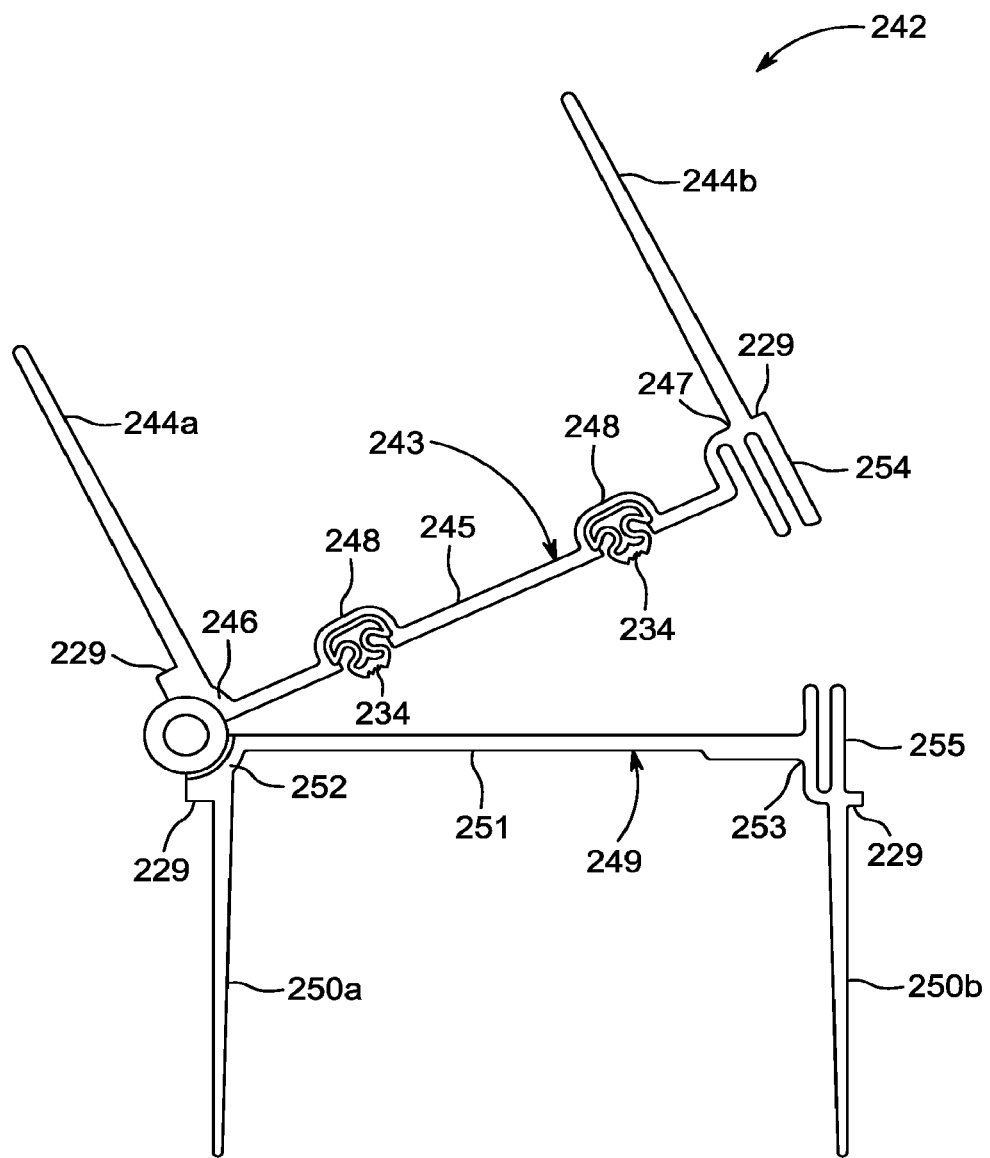
FIG. 15 is a side view of a tongue-and-groove hinged structure in accordance with the present inventions.

Tongue-and-groove hinged structure 242 is shown edge-on in profile in FIG. 15. It provides means for pivotally attaching two adjacent enclosure components 155, or two adjacent portions of an enclosure component 155, so that one can pivot through at least up to ninety degrees (90°) of arc relative to the other. Tongue-and-groove hinged structure 242 can also provide a sealing function against water ingress into and environmental exposure of the edges of the two adjacent enclosure components 155, or the two adjacent portions of an enclosure component 155, to which it is secured, and can provide a sealing function to prevent water ingress across the boundary between those two edges.

Tongue-and-groove hinged structure 242 comprises a first elongate perimeter section 243 of length "L" and a second perimeter elongate section 249 of length "L", where L is the length of each of the edges of two adjacent enclosure components 155 on which first perimeter section 243 and second perimeter section 249 will be respectively positioned in order to pivotally join those sections together.

In particular, referring to FIG. 15, first perimeter structure 243 (shown edge-on in profile in FIG. 15) of tongue-and-groove hinged structure 242 is defined by two spaced-apart elongate flange surfaces 244 and an elongate web surface 245. One of the flange surfaces 244, flange surface 244a, is joined to web surface 245 at a first junction 246, and the other of the flange surfaces 244, flange surface 244b, is joined to web surface 245 at a second junction 247. In the case of securing first perimeter section 243 to a planar enclosure component 155 comprising two structural layers separated by foam panels, flange surfaces 244a, 244b are spaced apart by a distance approximately equal to the thickness of the foam panels of the planar enclosure component 155 over which first perimeter section 243 will be positioned and to which it will be secured, so that first perimeter section 269 thereby forms a C-channel in cross-section.

Comparable to first perimeter section 243, second perimeter section 249 (shown edge-on in profile in FIG. 15) of tongue-and-groove hinged structure 242 is defined by two spaced-apart elongate flange surfaces 250 and an elongate web surface 251. One of the flange surfaces 250, flange surface 250a, is joined to web surface 251 at a third junction 252 and the other of the flange surfaces 250, flange surface 250b, is joined to web surface 251 at a fourth junction 253. In the case of securing second perimeter section 249 to a planar enclosure component 155 also comprising two structural layers separated by foam panels, flange surfaces 250a, 250b are spaced apart by a distance approximately equal to the thickness of the foam panels of the planar enclosure component 155 over which second perimeter section 249 will be positioned and to which it will be secured, so that second perimeter section 249 thereby forms a C-channel in cross-section.

Referring to FIG. 15, first perimeter section 243 has a first series of hinge knuckles formed along first junction 246, and second perimeter section 249 has a second series of hinge knuckles formed along third junction 252. The two series of hinge knuckles are intermeshed and joined by a series of linearly arranged cylindrical steel rods 233 of aggregate length L to form a pivotable junction between first perimeter section 243 and second perimeter section 249, which is able to rotate up through at least ninety degrees) (90°) of arc. It is preferred that the series of linearly arranged cylindrical steel rods 233 be joined end-to-end by threaded connections, so that the steel rods 233 act as a single continuous rod that better resists tensile loading. In one embodiment of tongue-and-groove hinged structure 242, the series of linearly arranged cylindrical steel rods 233 have a diameter of approximately 0.625 inch (1.5875 cm).

Referring again to FIG. 15, there is provided an elongate tongue-and-groove seal portion 254 (shown edge-on in profile in FIG. 15) proximate the second junction 247 of first perimeter section 243, and there is provided an elongate tongue-and-groove seal portion 255 (shown edge-on in profile in FIG. 15) proximate the fourth junction 253 of second perimeter section 249. Tongue-and-groove seal portions 254 and 255 are each aligned approximately tangent to a radius centered at first junction 246, such that they engage in a mating relationship when first and second perimeter sections 243 and 249 are rotated relative to each other such that second junction 247 and fourth junction 253 are proximate.

The particular profile of the C-channels of first and second perimeter sections 243 and 249 of tongue-and-groove hinged structure 242 can vary as desired to include such thickness variations, ridges and/or grooves as are appropriate for the intended application. Thus in FIG. 15, the exterior face of web surface 245 (i.e., the face away from the edge of the enclosure component 155 to which first perimeter section 243 is to be secured) is provided with plural receiving slots 248 for receiving one or more sealing beads 234, in order to form a water-resistant seal, with the sealing beads 234 pressing against web surface 251 when first and second perimeter sections 243 and 249 are rotated relative to each other such that elongate tongue-and-groove seal portions 254 and 255 are in a mating relationship. In an alternative embodiment, the sealing beads are coextruded with first perimeter section 243 at locations that approximate the locations of receiving slots 248. In yet another embodiment, one or more sealing beads can be provided proximate one or more of elongate tongue-and-groove seal portion 254 and elongate tongue-and-groove seal portion 255 to form a water-resistant seal when first and second perimeter sections 243 and 249 are rotated relative to each other such that elongate tongue-and-groove seal portions 254 and 255 are in a mating relationship.

First and second perimeter sections 243 and 249 of tongue-and-groove hinged structure 242 can be fabricated by an extrusion process, such as pultrusion, in which a suitable material (fiberglass reinforced polymer plastic, in the case of pultrusion) is drawn through appropriately-shaped die(s) to form the work pieces generally having the web/flange structure of the perimeter sections. The drawing process can include forming cylindrical conduits that will be the hinge knuckles, or they can be added following the drawing process in accordance with preference, as described above. Similarly, elongate tongue-and-groove seal portions 254 and 255 can be similarly fabricated, subject to the specific seal design and otherwise in accordance with preference.

Tongue-and-groove hinged structure 242 can be secured to two adjacent enclosure components 155, or to two adjacent portions of an enclosure component 155, which are intended to have a folded relationship in shipping module 100. For example, where first perimeter section 243 is to be secured to a planar enclosure component 155 comprising two structural layers separated by foam panels, a first perimeter section 243 having a length L approximately equal to the length of the edge in question of the enclosure component 155 is positioned over the edge of the foam panels, such that web surface 245 abuts or is closely proximate to the edge of the foam. The two structural layers are then positioned over the foam and to overlap a major portion of the flange surfaces 244, with locating ridge 229 positioned on the exterior of the flange surface 244 proximate first junction 246, and locating ridge 229 positioned proximate tongue-and-groove arrangement 254, assisting in proper overlap and alignment of the structural layers.

Likewise, where the associated second perimeter section 249 is to be secured to a planar enclosure component 155 comprising two structural layers separated by foam panels, a second perimeter section 249 having a length L approximately equal to the length of the edge in question of enclosure component 155 is positioned over the edge of the foam panel, such that web surface 251 abuts or is closely proximate to the edge of the foam. The two structural layers are then positioned over the foam and to overlap a major portion of the flange surfaces 250, with locating ridge 229 positioned on the exterior of the flange surface 250 proximate third junction 252, and locating ridge 229 positioned proximate tongue-and-groove arrangement 255, assisting in proper overlap and alignment of the structural layers.

First and second perimeter sections 243 and 249 can each be secured to the respective enclosure components 155 for example by adhesive applied between the overlapping regions of first and second perimeter sections 243 and 249 and the respective enclosure component 155, or by fasteners, such as screw or nail fasteners, spaced apart along the length of one or more of flange surfaces 244, 250 and web surfaces 245 and 251, and driven therethrough into the respective enclosure component 155, or by utilizing a combination of adhesive and fasteners in any manner as just described, or otherwise. Once secured to their respective enclosure components 155, the components can be rotated to a fully folded state to form shipping module 100, and also rotated to a fully unfolded state upon finishing structure 150 at its intended location.

Enclosure Component Perimeter Structure Exemplary Placements

Figure 16:
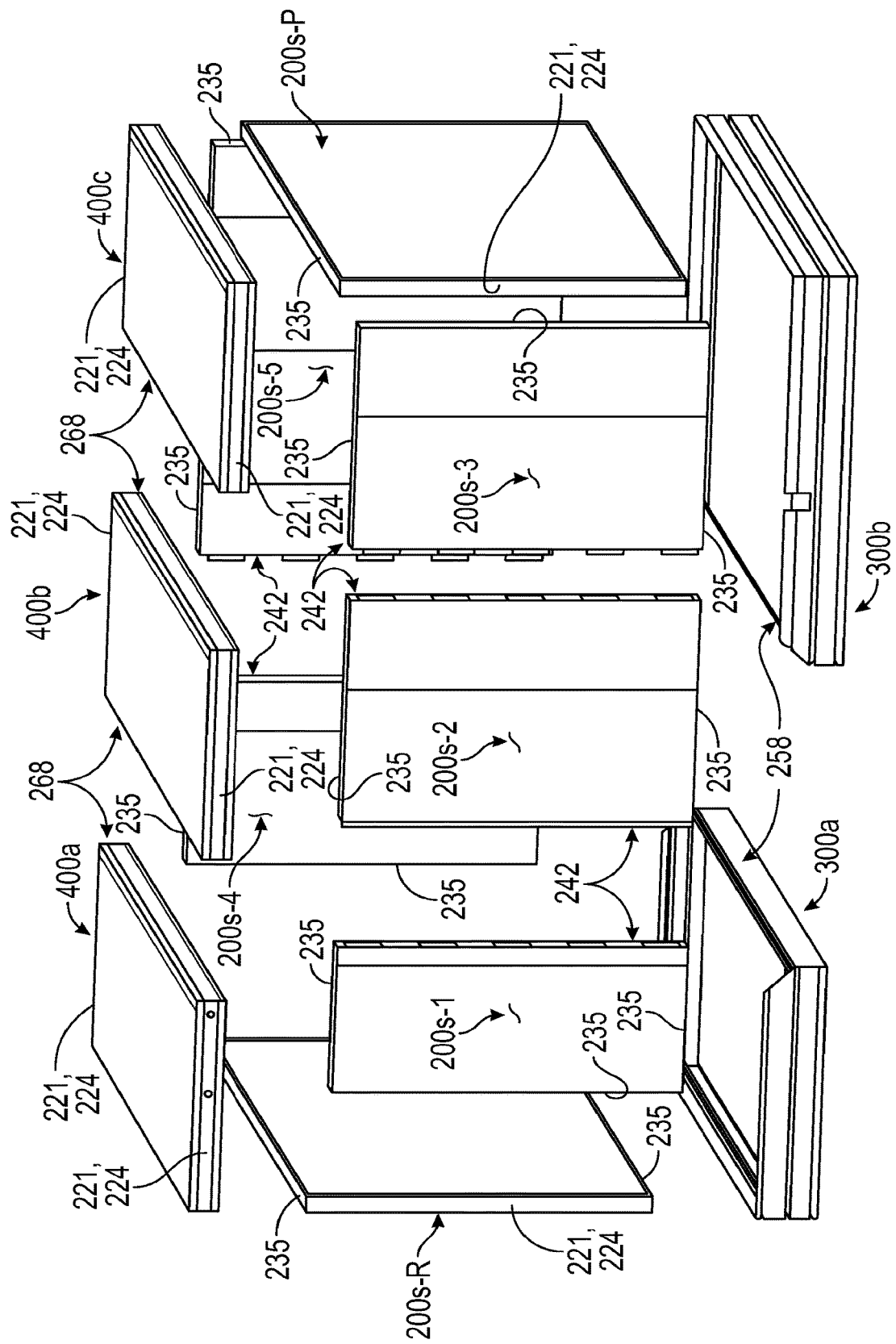
FIG. 16 is an exploded perspective view of a finished structure in accordance with the present inventions, depicting suitable locations for the enclosure component perimeter structures of the present inventions.

The exploded view in FIG. 16 of the type 2 structure 152 depicted in FIG. 1B provides exemplary placements of the enclosure component perimeter structures described herein. In particular, tongue-and-groove structures 242 can be utilized to pivotally join wall portion 200s-1 to wall portion 200s-2, to pivotally join wall portion 200s-2 to wall portion 200s-3 and to pivotally wall portion 200s-4 to wall portion 200s-5. Also as shown in FIG. 16, first hinged I-beam structure 258 can be utilized to pivotally join floor portion 300a to floor portion 300b, and second hinged I-beam structure 268 can be utilized to pivotally join ceiling portion 400a to ceiling portion 400b, and to pivotally join ceiling portion 400b to ceiling portion 400c.

As shown further in FIG. 16, abutting end cap 235 in turn can be utilized to close the top and bottom horizontal edges of wall component 200s-R, the top and bottom horizontal edges of wall portions 200s-1 through 200s-5, the top edge of wall component 200s-P, the vertical edges of wall portions 200s-1 and 200s-4 which abut the wall component 200s-R, and the two vertical edges of wall portions 200s-3 and 200s-5 which abut the wall component 200s-P. Still further, free standing end cap 221 (or reinforced end cap 224) can be utilized to close the otherwise-exposed horizontal exterior edges of ceiling portions 400a, 400b and 400c generally coinciding with first longitudinal edge 406, first transverse edge 408, and second transverse edge 410 of ceiling component 400, and the two otherwise-exposed vertical edges of wall component 200s-P, as shown in FIG. 16.

Enclosure Component Relationships and Assembly for Transport

For ease of transport and maximum design flexibility, it is preferred that there be a specific dimensional relationship among enclosure components 155.

FIG. 2A shows a top schematic view of the type 1 structure 151 shown in FIG. 1A, and includes a geometrical orthogonal grid for clarity of explaining the preferred dimensional relationships among enclosure components 155. The basic length used for dimensioning is indicated as "E" in FIG. 2A; the orthogonal grid overlaid in FIG. 2A is 24E long and 12 E wide, and illustrates the relative dimensions of the components.

More particularly, in FIG. 2A the two long wall components 200a are approximately 24E long, and the two short wall components 200*b* are approximately 12E long. Each of ceiling portions 400*a*, 400*b* and 400*c* is 24E long and 4E wide. The two floor portions 300*a* and 300*b* of type 1 structure 151 are shown in FIGS. 2A and 3A. Each of floor components 300*a* and 300*b* is 24E long; whereas floor component 300*a* is approximately 4E wide and floor component 300*b* is approximately 8E wide.

The shipping module 100 for type 1 structure 151, shown edge-on in FIG. 3A, generally includes a fixed space portion 102 defined by ceiling component 400*a*, floor component 300*a*, long wall component 200*a*-R and two first wall portions 200*b*-1 of short wall components 200*b*. As shown in FIG. 2A, the remaining two portions of short wall components 200*b*, second wall portions 200*b*-2, are folded inward and positioned against fixed space portion 102 (identified in FIG. 2A as wall portion 200*b*-2*f* when so folded and positioned). The three ceiling portions 400*a*, 400*b* and 400*c* of type 1 structure 151 are shown deployed in FIG. 1A. FIG. 3A, the shipping module 100 for type 1 structure 151, depicts ceiling components 400*b* and 400*c* stacked on top of the ceiling component 400*a* that in part defines fixed space portion 102. Long wall component 200*a*-P, shown in FIGS. 2A and 3A, is pivotally secured to floor portion 300*b* at the location of horizontal axis 105, and is vertically positioned against the outside of second wall portions 200*b*-2. In turn, floor portion 300*b* is vertically positioned proximate to fixed space portion 102, with long wall component 200*a*-P pending (i.e., hanging) from floor portion 300*b* between floor portion 300*b* and second wall portions 200*b*-2.

Sizing the enclosure components 155 of type 1 structure 151 according to the dimensional relationships disclosed above yields a compact shipping module 100, as can be seen from the figures. Thus shipping module 100, when dimensioned according to the relationships disclosed herein using an "E" dimension (see FIG. 2A) of approximately 19.5 inches (49.5 cm), and when its components are stacked and positioned as shown in FIG. 3A, has an overall length of approximately 39 feet (11.89 meters), an overall width of approximately 8.5 feet (2.59 meters) and an overall height of approximately 12.7 feet (3.87 meters). These overall dimensions are approximately the same or less than a typical shipping container.

Similarly, FIG. 2B shows a top schematic view of the type 2 finished structure 152 shown in FIG. 1B, and includes a geometrical orthogonal grid for clarity of explaining the preferred dimensional relationships among its enclosure components 155. The basic length used for dimensioning is indicated as "E" in FIG. 2B; the orthogonal grid overlaid in FIG. 2B is approximately 8E long and 8E.

More particularly, in FIG. 2B the four wall components 200*s* are approximately 8E long, and each of ceiling portions 400*a*, 400*b* and 400*c* is approximately 8E long and 2.67E wide. The two floor portions 300*a* and 300*b* of finished structure 152 are shown in FIGS. 2B and 3B. Each of floor components 300*a* and 300*b* is 8H long; whereas floor component 300*a* is approximately 3E wide and floor component 300*b* is approximately 5E wide.

The shipping module 100 for type 2 structure 152, shown edge-on in FIG. 3B, also generally includes a fixed space portion 102 defined by ceiling component 400*a*, floor component 300*a*, wall component 200*s*-R, wall portion 200*s*-1 and wall portion 200*s*-4. As show in FIG. 2B, second wall portion 200*s*-2 is folded inward and positioned generally against fixed space portion 102, whereas third wall portion 200*s*-3 is folded outward and positioned generally against second wall portions 200*s*-2 (wall portions 200*s*-2 and 200*s*-3 are respectively identified in FIG. 2B as portions 200*s*-2*f* and 200*s*-3*f* when so folded and positioned); so as to form an accordion fold having as its elements fixed space portion 102, second wall portion 200*s*-2 and third wall portion 200*s*-3. Fifth wall portion 200*s*-5 is folded inward and positioned generally against fixed space portion 102 (identified in FIG. 2B as wall portion 200*s*-5*f* when so folded and positioned). The three ceiling components 400*a*, 400*b* and 400*c* are shown deployed in FIG. 1B. FIG. 3B, the shipping module 100 for type 2 structure 152, depicts ceiling components 400*b* and 400*c* stacked on top of the ceiling component 400*a* that in part defines fixed space portion 102. Wall component 200*s*-P, shown in FIGS. 2B and 3B, is pivotally secured to floor portion 300*b* at the location of axis 105, and is vertically positioned against the outside of wall portions 200*s*-3 and 200*s*-5. In turn, floor portion 300*b* is vertically positioned proximate fixed space portion 102, with long wall component 200*s*-P pending from floor portion 300*b* between floor portion 300*b* and wall portions 200*s*-3 and 200*s*-5.

Sizing the enclosure components 155 of type 2 structure 152 according to the dimensional relationships disclosed above yields a compact shipping module 100, as can be seen from the figures. Thus shipping module 100 depicted in FIG. 3B, when dimensioned according to the relationships disclosed herein using an "E" dimension (see FIG. 2B) of approximately 29 inches (73.7 cm), and when its components are stacked and positioned as shown in FIG. 3B, has an overall length of approximately 19 feet (5.79 m), an overall width of approximately 8.5 feet (2.59 meters) and an overall height of approximately 12.7 feet (3.87 meters). These overall dimensions are less than a typical shipping container.

The geometrical orthogonal grid referred also provides beneficial reference points for placement of floor chases 319, wall chases 219 and ceiling chases 440. When such chases are placed for example at specific "E" intervals that coincide with the grid spacing being used, they are easily located during structure finishing.

It is preferred that the fixed space portion 102 be in a relatively finished state prior to positioning (folding) together all other of the wall, ceiling and floor portions as described above. That is, the fixed space portion 102 is preferably fitted during manufacture with all mechanical and other functionality that the structure 150 will require, such as kitchens, bathrooms, laundry rooms, HVAC closets, fireplaces, clothing closets, storage areas, corridors, etc. A temporary member 103 (shown in FIG. 3A) provides support during shipping of type 1 structure 151 and is removed after delivery (there is no comparable temporary member utilized for shipping type 2 structure 152). Preferably after fixed space portion 102 is finished to the desired state, the remaining components are folded and positioned against fixed space portion 102 as described above. The components, so folded and positioned, permit the builder, in effect, to erect finished structure 150 simply by "unfolding" (deploying) the positioned components of shipping module 100.

As exemplified by long wall component 200*a* in FIG. 5A, each of the wall, floor and ceiling components 200, 300 and 400, and/or the portions thereof, can be sheathed in protective film 177 during fabrication and prior to forming the shipping module 100. Alternatively or in addition, the entire shipping module 100 can be sheathed in a protective film. These protective films accordingly constitute a means for protecting the shipping module 100 and components 200, 300 and 400 during shipping. In addition to the protection they give to the module and its components, such protective films have the added benefit of increasing the resistance of the components to such flexural and torsional stresses as may occur during transport of the components. These protective films constitute further means for rigidifying wall component 200 to improve its robustness during transport and erection of the structure at the construction site. It is preferred that such protective films remain in place until after the shipping module 100 is at the construction site, and then removed as required to facilitate enclosure component deployment and finishing.

Shipping Module Transport

The shipping module is shipped to the building site by appropriate transport means. One such transport means is disclosed in U.S. Patent Application Publication No. US 2019/0100127 A1, filed Sep. 27, 2018, and in International Publication No. WO 2019/070485 A1; the contents of which are incorporated by reference as if fully set forth herein, particularly as found at paragraphs 0020-0035 and in FIGS. 1A-2D thereof. As an alternative transport means, shipping module 100 can be shipped to the building site by means of a conventional truck trailer or a low bed trailer (also referred to as a lowboy trailer).

Structure Deployment and Finishing

At the building site, shipping module 100 is positioned over its desired location, such as over a prepared foundation; for example, a poured concrete slab, a poured concrete or cinder block foundation, sleeper beams or concrete posts or columns. This can be accomplished by using a crane, either to lift shipping module 100 from its transport and move it to the desired location, or by positioning the transport means over the desired location, lifting shipping module 100, then moving the transport means from the desired location, and then lowering shipping module 100 to a rest state at the desired location. Particularly suitable equipment and techniques for facilitating the positioning of a shipping module 100 at the desired location are disclosed in U.S. Nonprovisional patent application Ser. No. 16/786,315 (now U.S. Pat. No. 11,220,816) entitled "Equipment and Methods for Erecting a Transportable Foldable Building Structure," having the same inventors and filed on the same date as the subject application. The contents of that U.S. Nonprovisional patent application Ser. No. 16/786,315 (now U.S. Pat. No. 11,220,816) entitled "Equipment and Methods for Erecting a Transportable Foldable Building Structure," having the same inventors and filed on the same date as the subject application, are incorporated by reference as if fully set forth herein, particularly including the equipment and techniques described for example at paragraphs 126-128 and in connection with FIGS. 11A and 11B thereof.

Following positioning of shipping module 100 at the building site, the appropriate portions of wall, floor and ceiling components 200, 300 and 400 are "unfolded" (i.e., deployed) according to the sequences described above to yield finished structure 150.

For type 1 structure 151, unfolding (enclosure component and component portion deployment) occurs in the following sequence: (1) floor portion 300*b* is pivotally rotated about horizontal axis 305 shown in FIG. 3A to an unfolded position, (2) wall component 200*a*-P is pivotally rotated about horizontal axis 105 shown in FIG. 3A to an unfolded position, (3) wall portions 200*b*-2 of short wall components 200*b* are pivotally rotated about vertical axes 191 shown in FIG. 2A to unfolded positions, and (4) ceiling portions 400*b* and 400*c* are pivotally rotated about horizontal axes 405*a* and 405*b* respectively to their unfolded positions.

For type 2 structure 152, unfolding occurs in the following sequence: (1) floor portion 300*b* is pivotally rotated about horizontal axis 305 shown in FIG. 3B to an unfolded position, (2) wall component 200*s*-P is pivotally rotated about horizontal axis 105 shown in FIG. 3B (behind perimeter board 312) to an unfolded position, (3) wall portions wall portions 200*s*-2, 200*s*-3 and 200*s*-5 are pivotally rotated about vertical axes 192, 193 and 194 respectively to unfolded positions, and (4) ceiling portions 400*b* and 400*c* are pivotally rotated about horizontal axes 405*a* and 405*b* respectively to unfolded positions. A mobile crane can be used to assist in the deployment of certain of the enclosure components 155, specifically ceiling portions 400*b* and 400*c*, floor portion 300*b*, as well as the wall component 200 (200*a*-P for type 1 structure 151, 200*s*-P for type 2 structure 152) pivotally secured to floor portion 300*b*. Alternatively, particularly suitable equipment and techniques for facilitating the deployment of enclosure components 155 are disclosed in U.S. Nonprovisional patent application Ser. No. 16/786,315 (now U.S. Pat. No. 11,220,816) entitled "Equipment and Methods for Erecting a Transportable Foldable Building Structure," having the same inventors and filed on the same date as the subject application. The contents of that U.S. Nonprovisional patent application Ser. No. 16/786,315 (now U.S. Pat. No. 11,220,816) entitled "Equipment and Methods for Erecting a Transportable Foldable Building Structure," having the same inventors and filed on the same date as the subject application, are incorporated by reference as if fully set forth herein, particularly including the equipment and techniques described for example at paragraphs 132-145 and depicted in FIGS. 12A-14B thereof.

Notably, baseboard 310 in appropriate locations functions as a "stop" to arrest the unfolding of a wall component or a wall portion at its intended deployed position. Thus for example, baseboard 310 in FIG. 3A, depicting a type 1 structure 151, arrests the unfolding of the long wall 200*a*-P shown in the figure, when long wall 200*a*-P is fully deployed in its desired vertical position. Likewise, perimeter board 312 in FIG. 3B, depicting a type 2 structure 152, performs a similar function with respect to a wall 200*s*-P, and also with respect to wall portions 200*s*-2, 200*s*-3 and 200*s*-5. Further, baseboard 310 provides a structure for securing a deployed wall component in its deployed position; thus for example, baseboard 310 is provided in FIG. 6A with plural spaced-apart apertures 311 through which fasteners may be inserted to secure long wall 200*a* in place.

Figure 17:
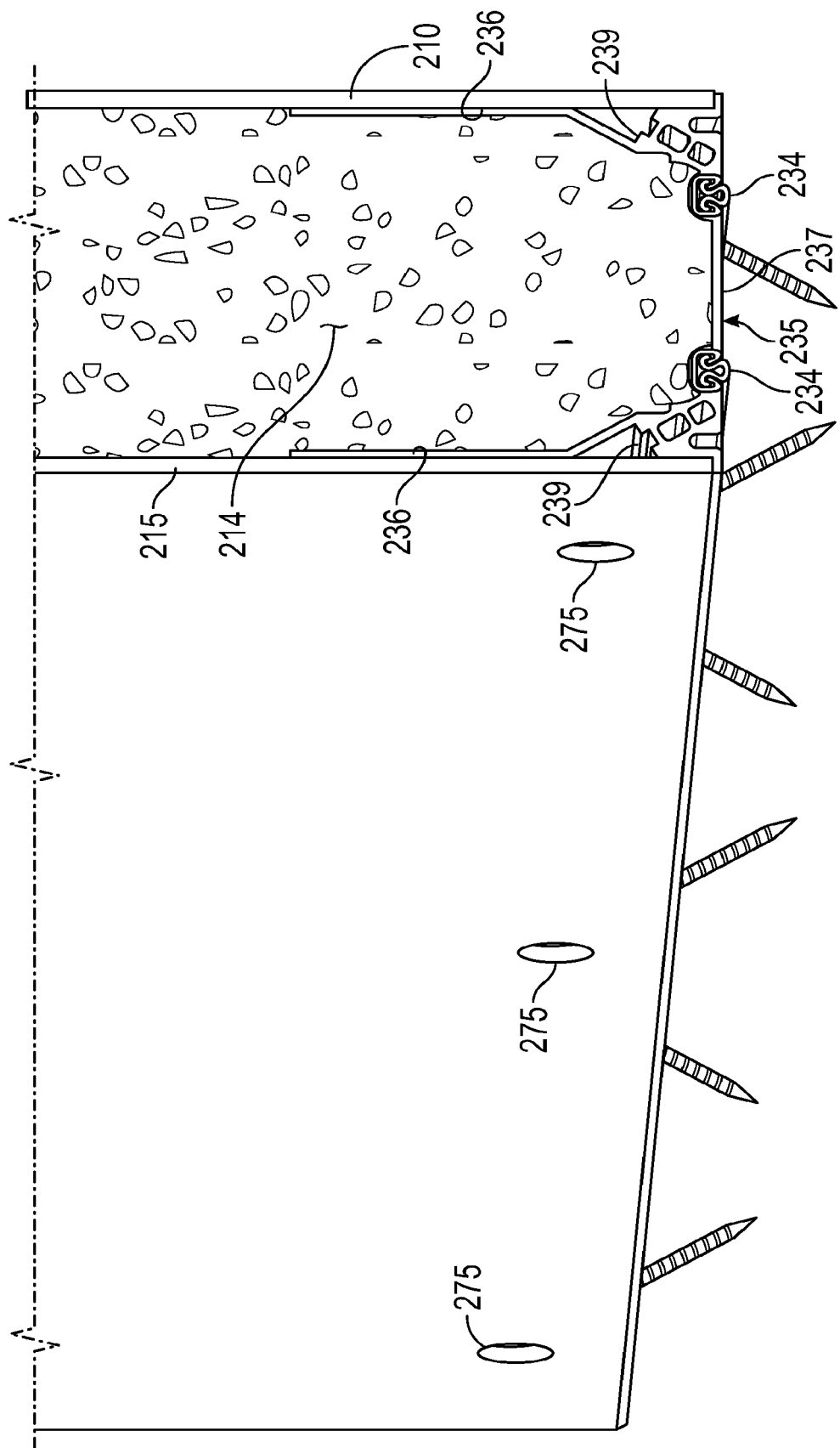
FIG. 17 is a perspective view of an enclosure component and its abutting end cap prepared in accordance with the present inventions, depicting the apertures in the structural layer for receiving fasteners.

After deployment, the enclosure components 155 are secured together to form finished structure 150, shown in FIGS. 1A and 1B. If any temporary hinge mechanisms have been utilized, then these temporary hinge mechanisms can be removed if desired and the enclosure components 155 can be secured together. If any of select enclosure component perimeter structures have been utilized—namely, abutting end cap 235, first hinged I-beam structure 258, second hinged I-beam structure 268 and tongue-and-groove hinged structure 242—then the following finishing operations are preferably performed:

Abutting end cap (235). Referring to FIG. 17, apertures 275 are cut at spaced-apart locations in any structural layer proximate the fastener shelves 239 of each utilized abutting end cap 235, either during manufacture prior to shipment of shipping module 100, or following delivery and deployment. Following deployment, fasteners, such as screw or nail fasteners, are driven down through the apertures 275 and the fastener shelves 239 of abutting end cap 235 and into the underlying enclosure component 155, as indicated in FIG. 17, thereby to fasten the enclosure components 155 utilized abutting end caps 235 to the underlying enclosure components 155. The apertures are then plugged.

First Hinged I-beam structure (258). Following unfolding, the hinge knuckles 266b and 267b are in an interlaced relationship, as shown in FIGS. 13C and 13F. Accordingly, the second series of linearly arranged cylindrical steel rods 233 can be threaded together and inserted through hinge knuckles 266b and 267b of first hinged I-beam structure 258, as shown in FIG. 13F, to lock first I-beam structure 258 in a fully open (unfolded) position. In such a locked structure, the steel rods are believed to serve as tension members (somewhat in the manner of rebar), and first hinged I-beam structure 258 substantially resists bending along its length. When so locked, first hinged I-beam structure 258 has particular utility for supporting finished structure 150 when it is placed on a foundation of multiple concrete posts or columns.

Second Hinged I-beam structure (268). Following unfolding, the hinge knuckles 273b and 279b are in an interlaced relationship, as shown in FIGS. 14C and 14E. Accordingly, the third series of linearly arranged cylindrical steel rods 233 can be threaded together and inserted through hinge knuckles 273b and 279b of second hinged I-beam structure 268 and to lock I-beam structure 268. In such a locked structure, the steel rods are believed to serve as tension members (somewhat in the manner of rebar), and second hinged I-beam structure 268 substantially resists bending along its length.

Tongue-and-groove hinged structure (242). Following unfolding, tongue-and-groove arrangements 254 and 255 of all utilized tongue-and-groove structures 242 are engaged in a mating relationship. Thus fasteners, such as screw or nail fasteners, can be driven through for example tongue-and-groove arrangements 254 and 255 to lock together in an unfolded orientation the enclosure components 155 to which tongue-and-groove structure 242 are fastened.

After deployment and securing of the enclosure components 155, one or more pre-selected chases located in wall components 200, in floor component 300 and in ceiling component 400 can be wired and connected. Prior to, during or following deployment and securing of the enclosure components 155, as desired, apertures 202, 204 for one or more doors and windows are cut at desired locations in the wall components 200, and appropriate door and window assemblies are positioned and fastened in the apertures 202, 204. Additional municipal hook-ups are made to water and sewer lines to complete structure 150, as relevant here.

The foregoing detailed description is for illustration only and is not to be deemed as limiting the invention, which is defined in the appended claims.

What is claimed is:

1. An enclosure member for a building structure, comprising:
   a planar laminate having a generally linear edge comprising a first facing layer; a layer of foam having a first face and a second opposing face; and a second facing layer; the first facing layer fastened to the first face of the layer of foam, and the second facing layer fastened to the second opposing face of the layer of foam;
   a first flange surface positioned on the planar laminate;
   a first inclined fastener shelf element joined to the first flange surface to form a first V-shaped recess extending inwardly into the planar laminate; and
   the first inclined fastener shelf element oriented to direct a leading portion of a screw or nail fastener away from the planar laminate, through the generally linear edge and into an abutting planar enclosure component;
   wherein at least one of:
   (i) the enclosure member further comprises a second flange surface, and a second inclined fastener shelf element joined to the second flange surface to form a second V-shaped recess extending inwardly into the planar laminate; or
   (ii) the enclosure member further comprises a first aperture aligned with the first V-shaped recess and a vertically oriented portion of the first flange surface, the first aperture provides access to the V-shaped recess; or
   (iii) the first facing layer is selected from the group consisting of (a) a structural layer comprising a plurality of structural panels of inorganic oxide, (b) a layer of metallic sheet, and (c) a combination of a protective layer comprising a plurality of structural panels of inorganic oxide and a layer of metallic sheet.

2. The enclosure member as in claim 1, wherein if (ii), the first aperture is formed in the first facing layer.

3. The enclosure member as in claim 1, wherein the first flange surface is disposed between the first facing layer and the first face of the layer of foam.

4. The enclosure member as in claim 1, further comprising:
   a web surface joined to the first inclined fastener shelf element, the web surface and the first flange surface spaced apart by the inclined fastener shelf element along an axis that is perpendicular to the web surface.

5. The enclosure member as in claim 1, wherein the first inclined fastener shelf element is adapted to support fasteners at an angle of less than ninety degrees relative to the generally linear edge of the planar laminate.

6. An enclosure member for a building structure, comprising:
   a planar laminate having a generally linear edge comprising a first facing layer; a layer of foam having a first face and a second opposing face; and a second facing layer; the first facing layer fastened to the first face of the layer of foam, and the second facing layer fastened to the second opposing face of the layer of foam;
   a C-shaped abutting end cap secured to the planar laminate and configured to be secured to an abutting planar enclosure component, the abutting end cap comprising:
   an elongate web surface abutting the generally linear edge of the planar laminate;
   a first inclined fastener shelf extending from a first edge of the elongate web surface oriented to direct a leading portion of a screw or nail fastener through the web surface and away from the planar laminate into the abutting planar enclosure component;
   a second inclined fastener shelf extending from a second edge of the elongate web surface and oriented to direct a leading portion of a screw or nail fastener through the web surface and away from the planar laminate into the abutting planar enclosure component; and
   a first elongate flange surface and a second elongate flange surface, the first elongate flange surface and the second elongate flange surface being spaced-apart by a distance, regions of the first and second elongate flanges are canted inward towards each other proximate the first and second inclined fastener shelve such that the first elongate flange surface is canted inward to join the first inclined fastener shelf at a first point to provide access to the first inclined fastener shelf for receipt of the screw or nail fastener by the first inclined fastener shelf and the second elongate flange surface is canted inward to join the second inclined fastener shelf at a second point to provide access to the first inclined fastener shelf for receipt of the screw or nail fastener by the first inclined fastener.

7. The enclosure member as in claim 6, wherein the distance spacing apart the first and second elongate flange surfaces adapted to receive between them at least the generally linear edge of the layer of foam.

8. The enclosure member as in claim 6, further comprising an elongate cavity wall joined to each of the first and second elongate flange surfaces, the elongate cavity wall being spaced from and generally parallel to the elongate web surface, and spanning the distance spacing apart the first and second elongate flange surfaces, to define a reinforcement channel.

9. The enclosure member as in claim 6, further comprising apertures cut at spaced apart locations in the first facing layer proximate to the first inclined fastener shelf to provide access to the first inclined fastener shelf through the first facing layer.

10. The enclosure member as in claim 9, further comprising plugs to plug the apertures.

11. The enclosure member as in claim 6, wherein the first facing layer and the second facing layer are each selected from the group consisting of (a) a structural layer comprising a plurality of structural panels of magnesium oxide, (b) a layer of metallic sheet, and (c) a combination of (i) a protective layer comprising a plurality of structural panels of inorganic oxide and (ii) a layer of metallic sheet.

12. The enclosure member as in claim 6, wherein the abutting end cap further comprises:
a receiving slot formed in and opening outwardly from an exterior surface of the elongate web surface away from the C-channel shape, the receiving slot adapted to receive a sealing head.

13. The enclosure member as in claim 6, wherein the first inclined fastener shelf is adapted to support fasteners at an angle of less than ninety degrees relative to the elongate web surface.

14. The enclosure member as in claim 6, wherein the regions of the first and second elongate flanges are canted inward at an angle of approximately thirty degrees.

15. The enclosure member as in claim 6, wherein the first inclined fastener shelf has an incline of approximately sixty degrees relative to a portion of the first elongate flange surface that is perpendicular to the elongate web surface.

16. A reinforced enclosure member for a building structure, comprising:
(a) a planar laminate having a generally linear edge comprising a first facing layer; a layer of foam having a first face and a second opposing face; and a second facing layer; the first facing layer fastened to the first face of the layer of foam, and the second facing layer fastened to the second opposing face of the layer of foam;
(b) a reinforced end cap comprising:
(1) a first elongate flange surface joined to an elongate web surface at a first junction, a second elongate flange surface joined to the elongate web surface at a second junction, the first elongate flange surface and the second elongate flange surface being spaced-apart by a distance, the web surface, the first elongate flange surface and the second elongate flange surface generally forming a C-channel shape;
(2) an elongate cavity wall joined to each of the first and second elongate flange surfaces, the elongate cavity wall being spaced from and generally parallel to the elongate web surface, and spanning the distance spacing apart the first and second elongate flange surfaces, to define a reinforcement channel between the elongate cavity wall and the elongate web surface; and
(3) a filler reinforcement within the reinforcement channel; and
(c) the reinforced end cap secured to the generally linear edge of the planar laminate, with the distance spacing apart the first and second elongate flange surfaces adapted to receive between them at least the generally linear edge of the layer of foam.

17. The reinforced enclosure member as in claim 16, wherein the first facing layer and the second facing layer are each selected from the group consisting of (a) a structural layer comprising a plurality of structural panels of inorganic oxide, (b) a layer of metallic sheet, and (c) a combination of a protective layer comprising a plurality of structural panels of inorganic oxide and a layer of metallic sheet.

18. The reinforced enclosure member as in claim 16, wherein the filler reinforcement comprises a dried slurry of magnesium oxide board pieces and epoxy adhesive.

\* \* \* \* \*